United States Patent
Karnowski et al.

(10) Patent No.: US 9,547,598 B1
(45) Date of Patent: Jan. 17, 2017

(54) CACHE PREFILL OF CACHE MEMORY FOR RAPID START UP OF COMPUTER SERVERS IN COMPUTER NETWORKS

(71) Applicant: Emulex Corporation, Costa Mesa, CA (US)

(72) Inventors: Mark J. Karnowski, Huntington Beach, CA (US); Jon Infante, Costa Mesa, CA (US)

(73) Assignee: Avego Technologies General IP (Singapore) Pte. Ltd., Singapore (SG)

( * ) Notice: Subject to any disclaimer, the term of this patent is extended or adjusted under 35 U.S.C. 154(b) by 242 days.

(21) Appl. No.: 14/588,118

(22) Filed: Dec. 31, 2014

Related U.S. Application Data

(63) Continuation-in-part of application No. 14/329,379, filed on Jul. 11, 2014.

(60) Provisional application No. 62/087,231, filed on Dec. 3, 2014, provisional application No. 61/880,919, filed on Sep. 21, 2013.

(51) Int. Cl.

| | |
|---|---|
| G06F 15/173 | (2006.01) |
| G06F 12/08 | (2016.01) |
| G06F 3/06 | (2006.01) |
| G06F 12/12 | (2016.01) |
| G06F 9/455 | (2006.01) |
| H04L 12/28 | (2006.01) |

(52) U.S. Cl.
CPC ........... *G06F 12/0833* (2013.01); *G06F 3/064* (2013.01); *G06F 3/067* (2013.01); *G06F 3/0608* (2013.01); *G06F 3/0655* (2013.01); *G06F 3/0688* (2013.01); *G06F 12/128* (2013.01); *G06F 2009/4557* (2013.01); *G06F 2009/45595* (2013.01); *G06F 2212/62* (2013.01); *G06F 2212/69* (2013.01); *H04L 12/28* (2013.01)

(58) Field of Classification Search
CPC .............. H04L 12/28; G06F 2009/4557; G06F 2009/45595
USPC ................................................. 709/223, 226
See application file for complete search history.

(56) References Cited

U.S. PATENT DOCUMENTS

| | | | |
|---|---|---|---|
| 6,622,168 B1 * | 9/2003 | Datta ................ | G06F 17/30902 707/E17.12 |
| 7,237,011 B1 | 6/2007 | St. Pierre | |
| 7,401,338 B1 * | 7/2008 | Bowen ................ | H04L 41/5035 709/200 |
| 7,644,205 B1 | 1/2010 | Overby et al. | |
| 7,836,177 B2 * | 11/2010 | Kasriel ............. | G06F 17/30902 709/206 |
| 7,940,408 B2 * | 5/2011 | Kitada ................... | G06Q 10/10 358/1.13 |

(Continued)

*Primary Examiner* — Hieu Hoang

(57) ABSTRACT

A method of communication between networked devices in a local storage area network includes forming a message for in-band communication within a local storage area network. The message includes at least one major task and one or more associated sub tasks for execution within the storage area network. The method further includes establishing a first communication link at least between a first networked device and a second networked device in response to the formation of the message; transmitting the message from the first networked device to at least the second networked device within the local storage area network; and in response to receiving the message, executing the sub tasks within the message with a processor to complete the major task and support local storage area network functionality.

19 Claims, 35 Drawing Sheets

(56) References Cited

U.S. PATENT DOCUMENTS

| | | | |
|---|---|---|---|
| 8,255,914 B1 | 8/2012 | Joyce et al. | |
| 8,904,091 B1* | 12/2014 | Guda | G06F 3/061 711/103 |
| 9,065,760 B2* | 6/2015 | Dickens | H04L 47/2441 |
| 9,432,298 B1* | 8/2016 | Smith | H04L 49/9057 |
| 2004/0064577 A1* | 4/2004 | Dahlin | H04L 29/06 709/235 |
| 2006/0129771 A1* | 6/2006 | Dasgupta | G06F 3/0605 711/162 |
| 2006/0274662 A1* | 12/2006 | Tannenbaum | H04L 41/022 370/242 |
| 2009/0024734 A1* | 1/2009 | Merbach | H04L 12/433 709/224 |
| 2009/0080428 A1* | 3/2009 | Witkowski | H04L 49/352 370/392 |
| 2009/0254677 A1* | 10/2009 | Desanti | H04L 41/12 709/242 |
| 2010/0115320 A1* | 5/2010 | Lim | G06F 1/3203 713/324 |
| 2011/0093849 A1* | 4/2011 | Chawla | H04L 41/0816 718/1 |
| 2011/0216669 A1* | 9/2011 | Chawla | H04L 12/28 370/254 |
| 2011/0261686 A1 | 10/2011 | Kotha et al. | |
| 2012/0067947 A1* | 3/2012 | Fukuda | G06K 19/0723 235/380 |
| 2013/0047161 A1* | 2/2013 | Simitsis | G06F 9/5027 718/100 |
| 2013/0053019 A1 | 2/2013 | Schilling | |
| 2013/0125127 A1* | 5/2013 | Mital | G06F 9/46 718/102 |
| 2013/0159383 A1* | 6/2013 | Tuliani | H04L 67/2842 709/203 |
| 2013/0163591 A1* | 6/2013 | Shukla | H04L 49/357 370/355 |
| 2013/0176896 A1* | 7/2013 | Shukla | H04L 12/462 370/254 |
| 2013/0275568 A1* | 10/2013 | Nguyen | H04L 41/0806 709/223 |
| 2014/0053019 A1* | 2/2014 | Holley | G06F 11/0724 714/11 |
| 2014/0089467 A1* | 3/2014 | Beck | H04L 67/02 709/219 |

\* cited by examiner

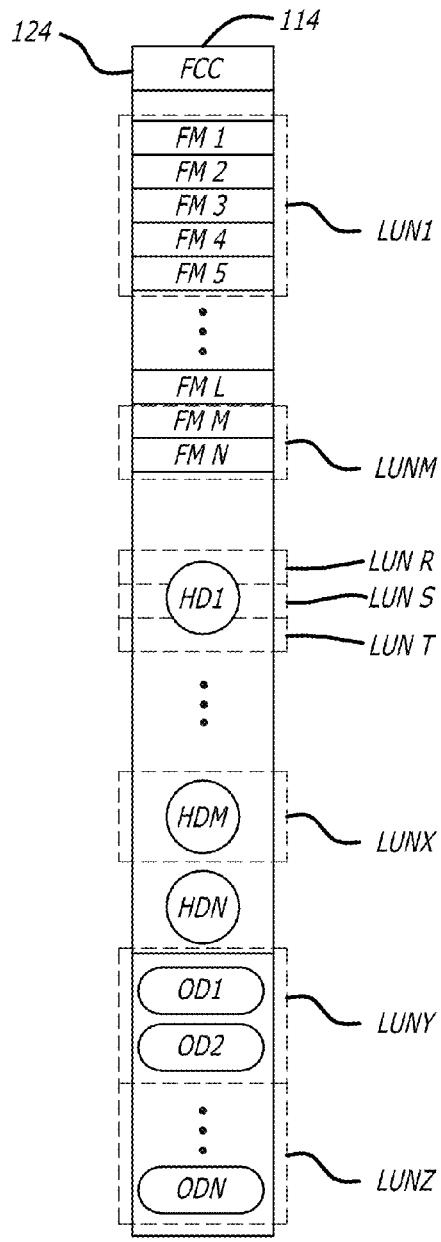
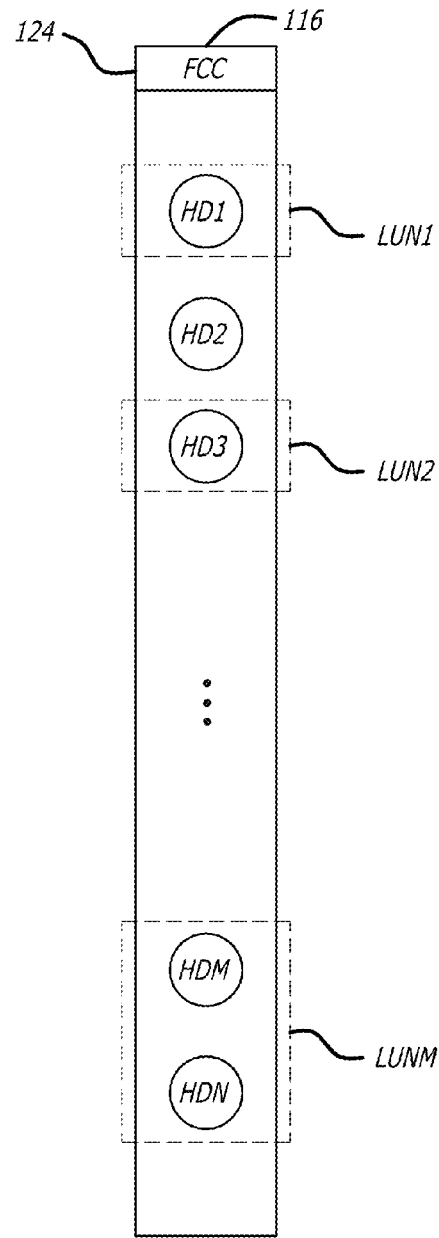
FIG. 2A
FIG. 2B
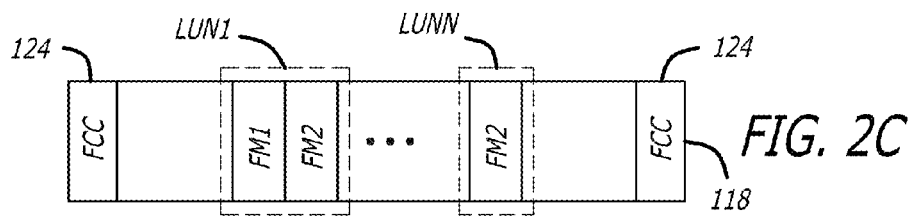
FIG. 2C

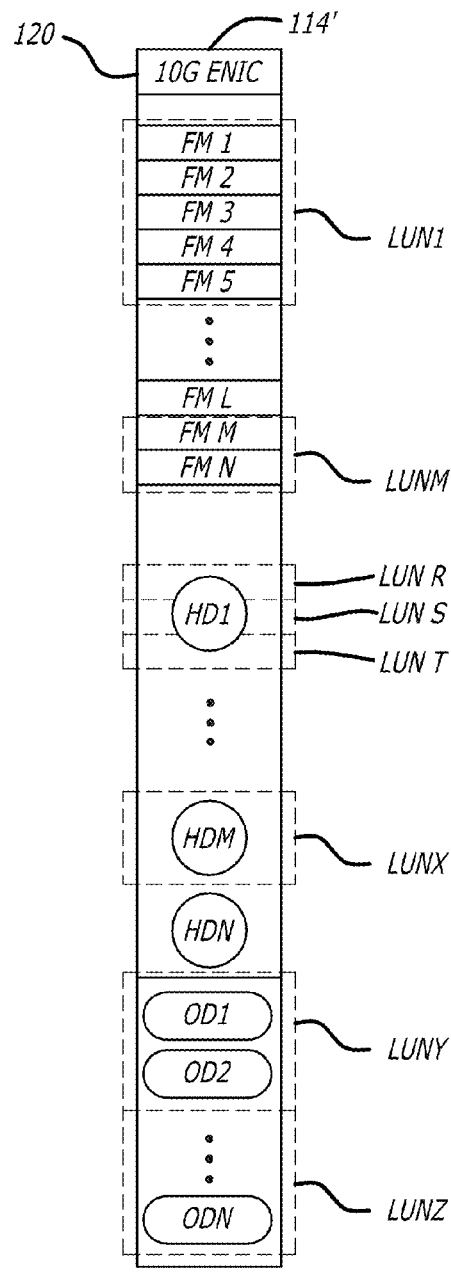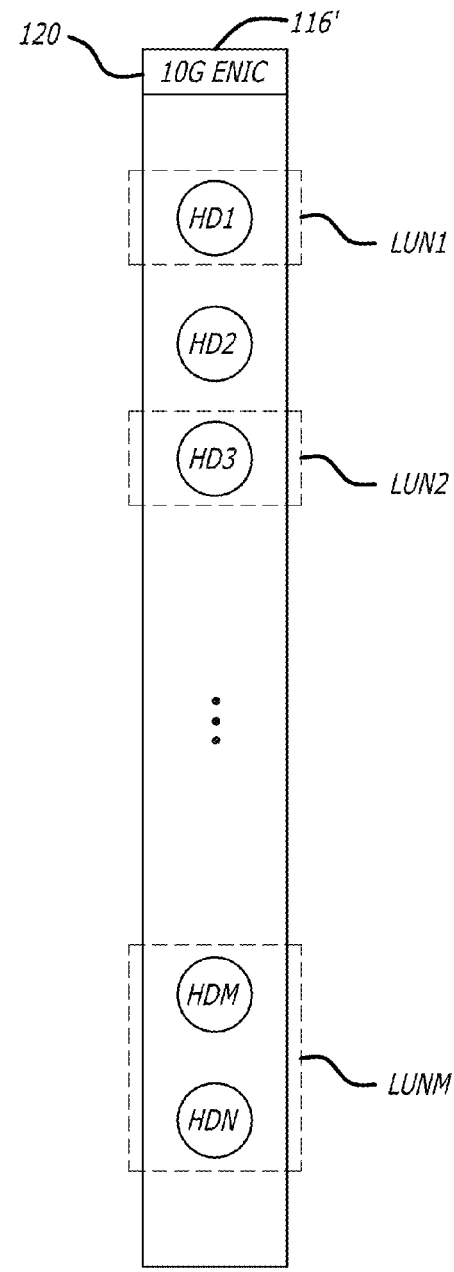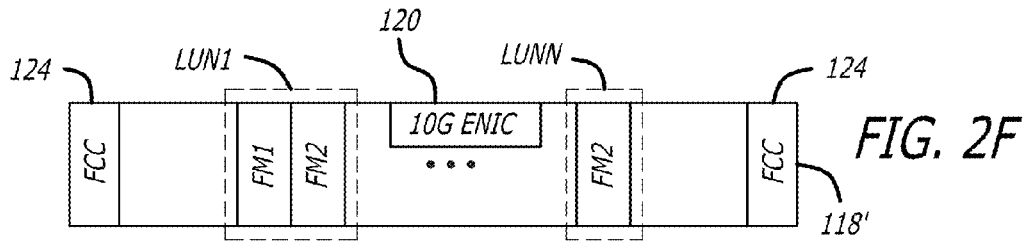
FIG. 2D
FIG. 2E
FIG. 2F

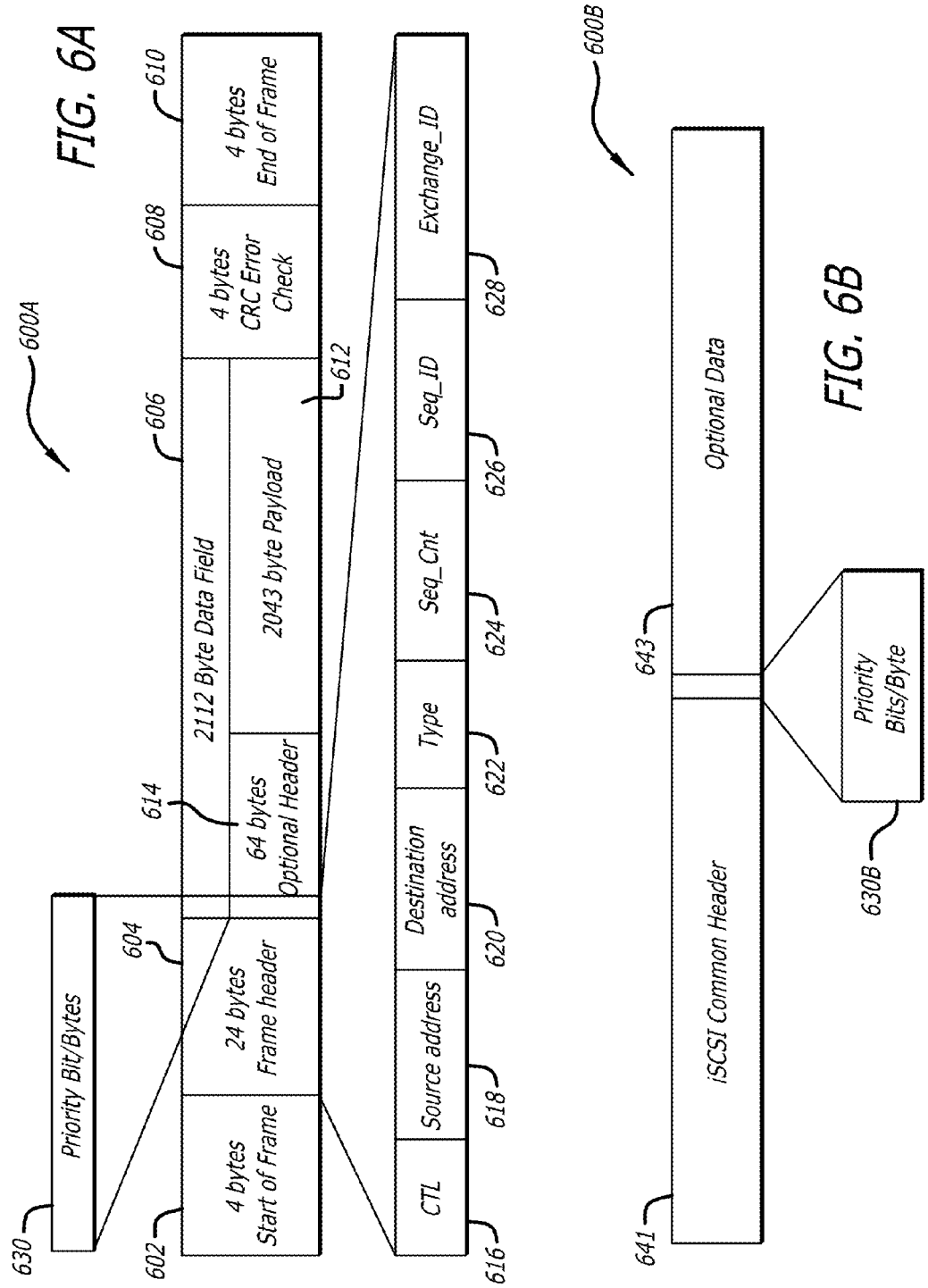

TO PORT OUTPUT QUEUE
414, 514

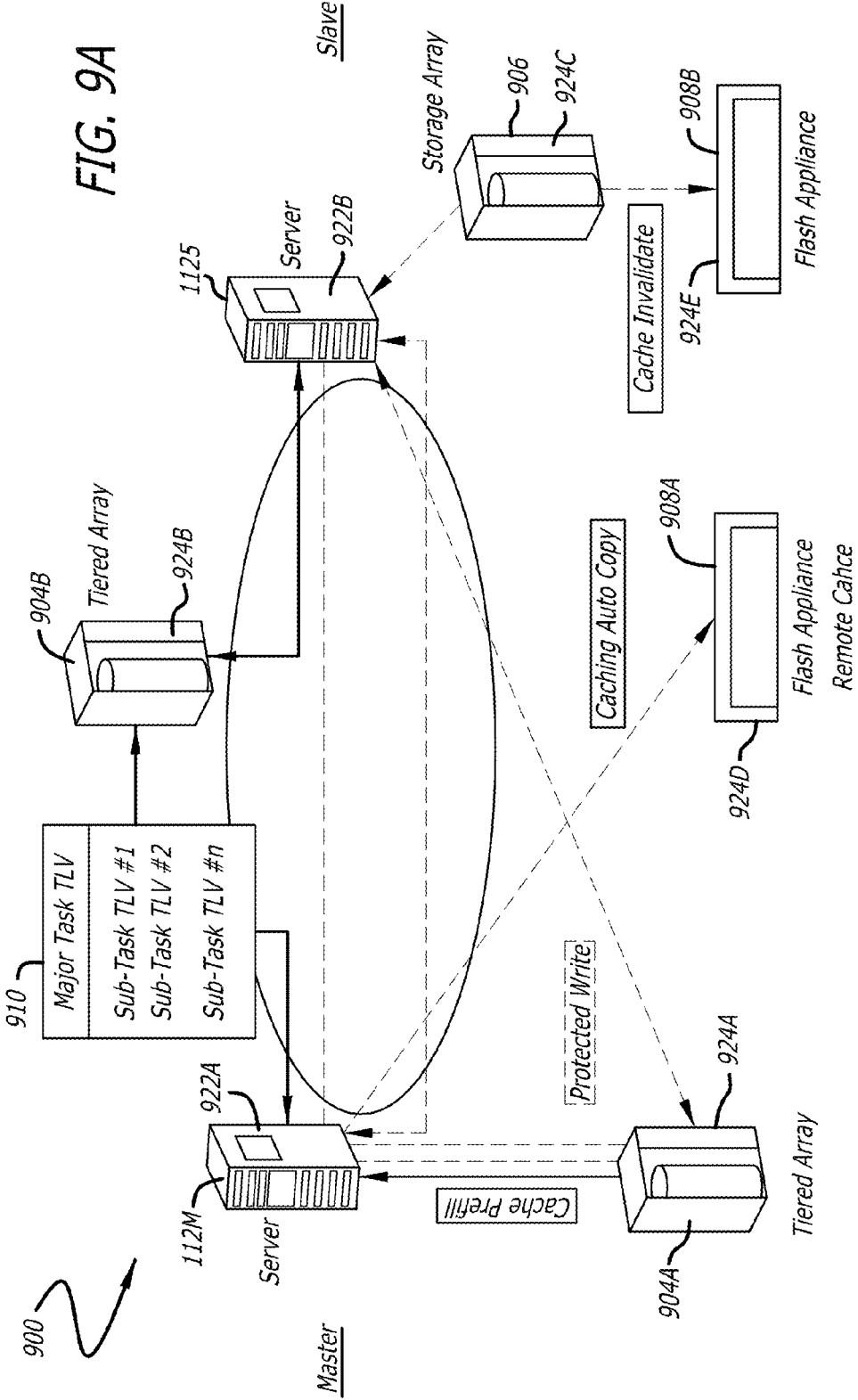

| Source Address | Destination Address | Flash Cache LUN Number | Master Memory Address | Slave Memory Address | San Memory Address | Modify Bit (Dirty Bit) |
|---|---|---|---|---|---|---|
| IP ADD 1 | IP ADD 3 | LUN 1 | MEM 1A | MEM 1B | MEM 1C | ✓ |
| IP ADD 1 | IP ADD 3 | LUN 2 | MEM 1A | MEM 1B | MEM 1C | ✓ |
| IP ADD 1 | IP ADD 3 | LUN 3 | MEM 1A | MEM 1B | MEM 1C | ✓ |
| ... | ... | ... | | | | |
| IP ADD 1 | IP ADD 3 | LUN N | MEM 1A | MEM 1B | MEM 1C | ✓ |
| IP ADD 5 | IP ADD 6 | LUN 1 | MEM 7A | MEM 7B | MEM 7C | ✓ |
| IP ADD 5 | IP ADD 6 | LUN 2 | MEM 7A | MEM 7B | MEM 7C | ✓ |
| IP ADD 5 | IP ADD 6 | LUN 3 | MEM 7A | MEM 7B | MEM 7C | |
| ... | ... | ... | | | | |
| IP ADD 2 | IP ADD 4 | LUN N | MEM 2A | MEM B | MEM 2C | ✓ |

FIG. 13A

| Source Address | Destination Address | Flash Cache LUN Number | Master Memory Address | Slave Memory Address | San Memory Address | Modify Bit (Dirty Bit) |
|---|---|---|---|---|---|---|
| IP ADD 1 | IP ADD 3 | LUN 1 | MEM 1A | MEM 1B | MEM 1C | ∨ |
| IP ADD 1 | IP ADD 3 | LUN 2 | MEM 1A | MEM 1B | MEM 1C | ∨ |
| IP ADD 1 | IP ADD 3 | LUN 3 | MEM 1A | MEM 1B | MEM 1C | I |
| ... | | | | | | |
| IP ADD 1 | IP ADD 3 | LUN N | MEM 1A | MEM 1B | MEM 1C | ∨ |
| IP ADD 5 | IP ADD 6 | LUN 1 | MEM 7A | MEM 7B | MEM 7C | ∨ |
| IP ADD 5 | IP ADD 6 | LUN 2 | MEM 7A | MEM 7B | MEM 7C | ∨ |
| IP ADD 5 | IP ADD 6 | LUN 3 | MEM 7A | MEM 7B | MEM 7C | ∨ |
| ... | | | | | | |
| IP ADD 2 | IP ADD 4 | LUN N | MEM 2A | MEM B | MEM 2C | ∨ |

FIG. 13B

| Server Address | Storage Device Address | LUN Number | Master Memory Address | Slave Memory Address | San Memory Address |
|---|---|---|---|---|---|
| IP ADD 1 | IP ADD 3 | LUN 1 | MEM 1A | MEM 1B | MEM 1C |
| IP ADD 1 | IP ADD 3 | LUN 2 | MEM 1A | MEM 1B | MEM 1C |
| IP ADD 1 | IP ADD 3 | LUN 3 | MEM 1A | MEM 1B | MEM 1C |
| | | ... | | | |
| IP ADD 1 | IP ADD 3 | LUN N | MEM 1A | MEM 1B | MEM 1C |
| IP ADD 2 | IP ADD 4 | LUN 1 | MEM 2A | MEM 2B | MEM 2C |
| IP ADD 2 | IP ADD 4 | LUN 2 | MEM 2A | MEM 2B | MEM 2C |
| IP ADD 2 | IP ADD 4 | LUN 3 | MEM 2A | MEM 2B | MEM 2C |
| | | ... | | | |
| IP ADD 2 | IP ADD 4 | LUN N | MEM 2A | MEM 2B | MEM 2C |

FIG. 14

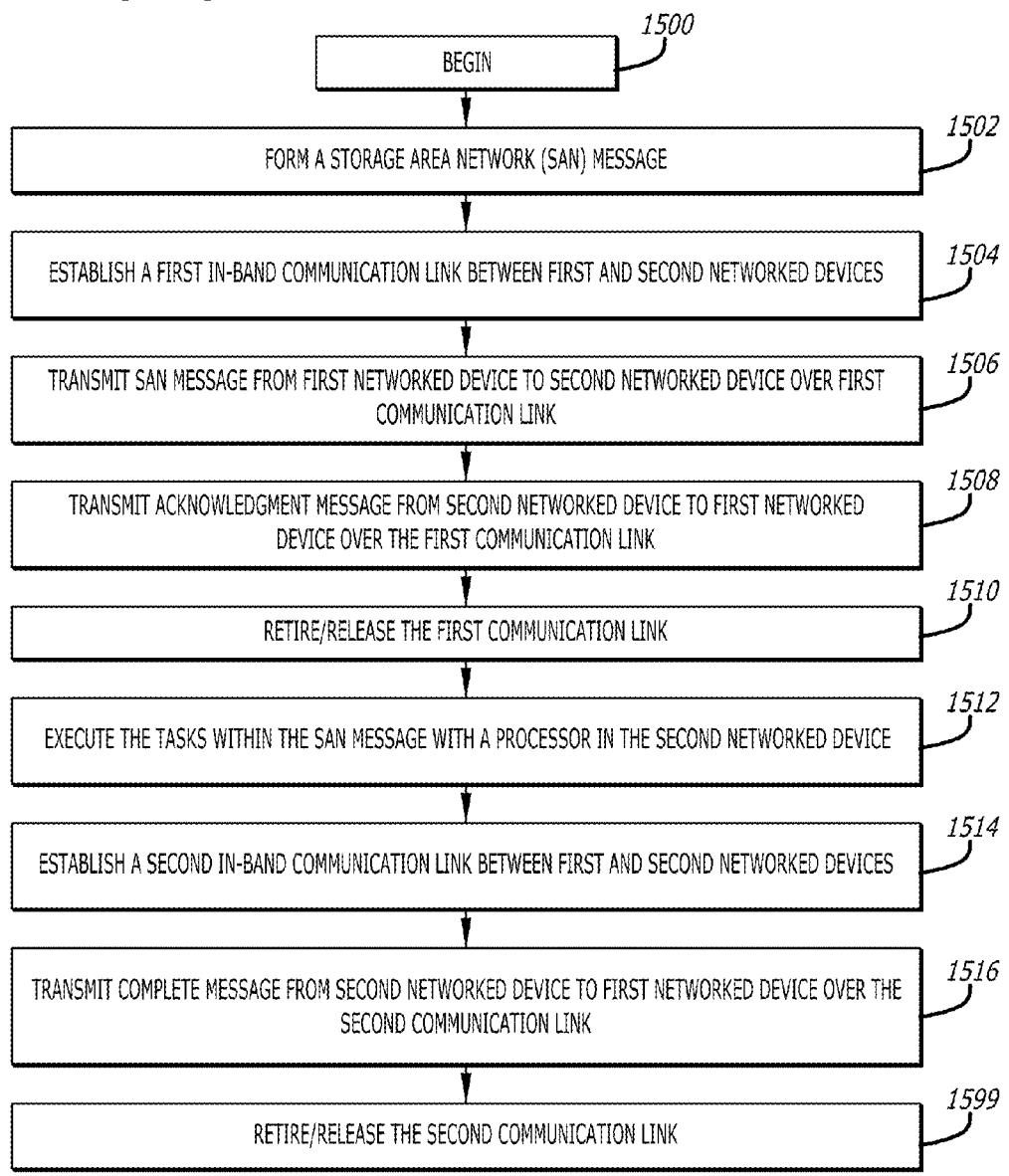

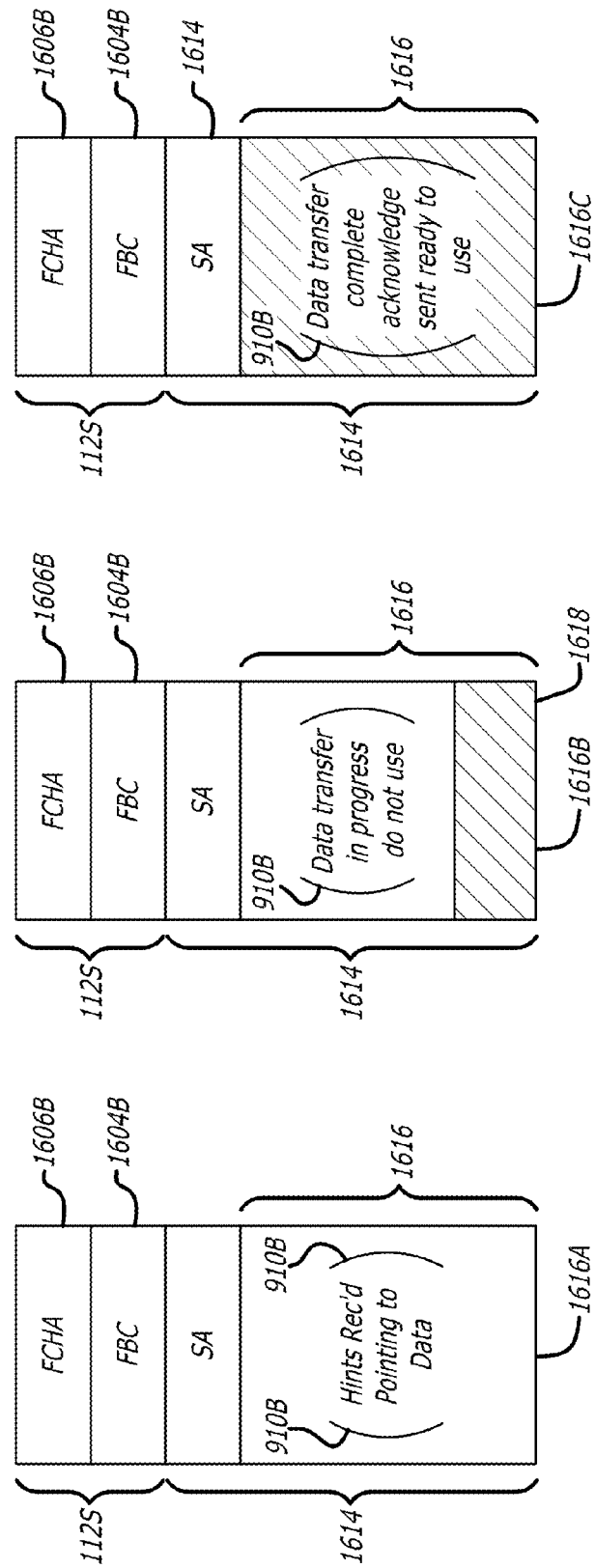

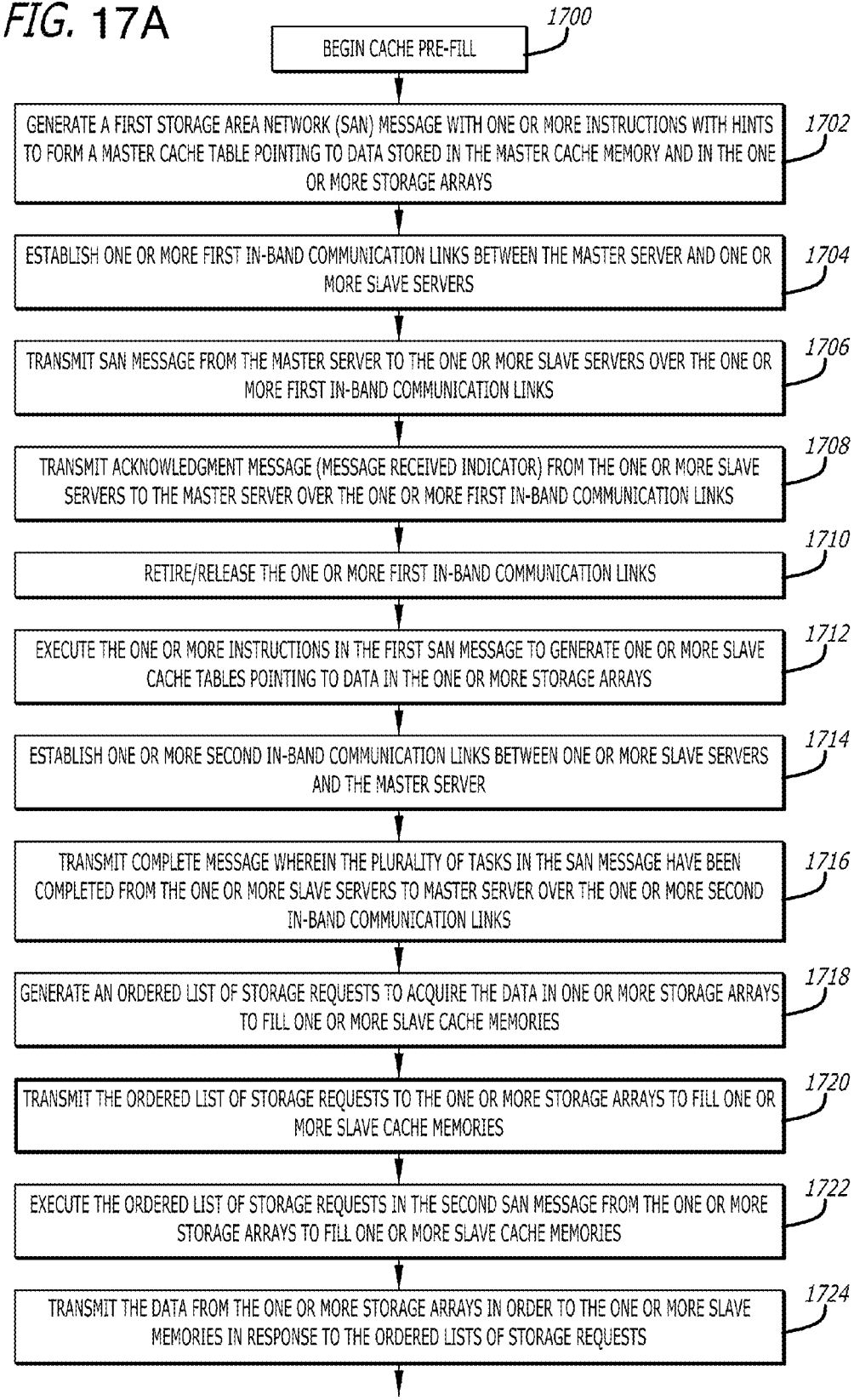

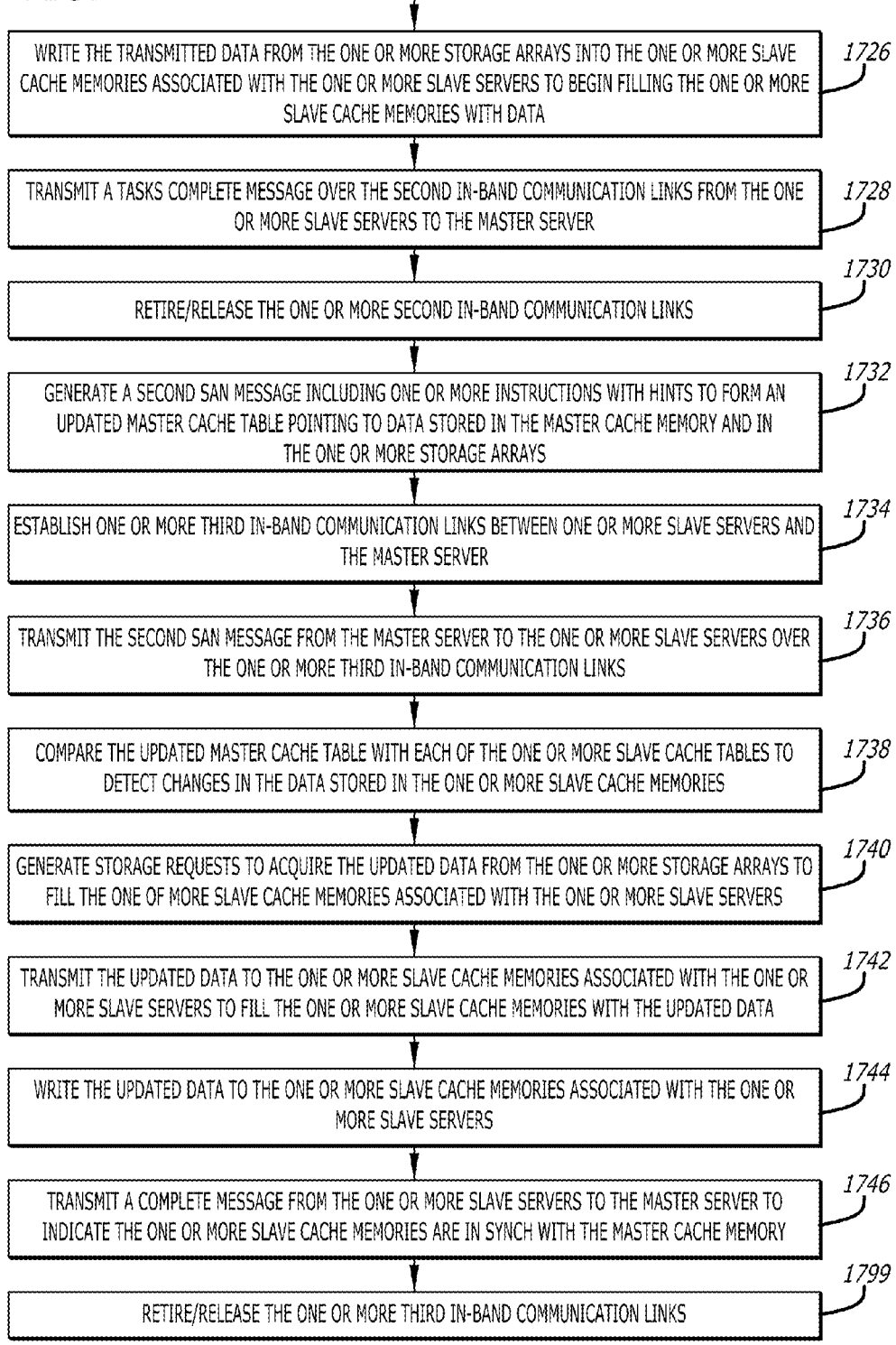

CACHE PREFILL OF CACHE MEMORY FOR RAPID START UP OF COMPUTER SERVERS IN COMPUTER NETWORKS

CROSS REFERENCE TO RELATED APPLICATION

This patent application claims the benefit of U.S. Provisional Patent Application No. 62/087,231 filed on Dec. 3, 2014 by inventors Mark Karnowski et al., entitled CACHE PREFIL, PROTECTED WRITE, CACHE INVALIDATE, AND CACHE AUTOCOPY MESSAGES FOR LOW LATENCY STORAGE NETWORKS, which is incorporated herein by reference to briefly disclose protected writes, cache invalidate, and cache autocopy messages for low latency storage networks.

This patent application also is a continuation in part and claims the benefit of U.S. patent application Ser. No. 14/329,379 filed on Jul. 11, 2014 by inventor Mark Karnowski et al., entitled MESSAGE PASSING FOR LOW LATENCY STORAGE NETWORKS. U.S. patent application Ser. No. 14/329,379 claims the benefit of U.S. Provisional Patent Application No. 61/880,919 filed on Sep. 21, 2013 by inventor Mark Karnowski, entitled PRIORITY QUEUING FOR FLASH-BASED STORAGE NETWORKS.

FIELD

The embodiments generally relate to storage networks in a data center having low latency networked storage devices.

BACKGROUND

Computer networks have become specialized in the storage of data and are often referred to as a storage network or storage area network (SAN). These storage networks have been historically built around a magnetic rotating platter often referred to as a hard disk. The network storage devices in these historical storage networks include hard disks with sophisticated controllers that provide enhanced data access services. These controllers create Logical Units (LUNs), comprised of hard disks or portions of hard disks. The controller then presents the LUNs to servers on the network for use as networked storage devices.

A fundamental aspect of this arrangement is based on the dependence on rotational media. When retrieving data from such a device, a processor waits until the platter rotates to the position where it started reading. The access latency for a single read operation on a hard drive is a random value that is a function of the physical location of the data on the platter.

The effects of this can be mitigated for sequential data, with its predictable pattern of the next read operation. Placing written data on sequential sectors of the disk of a hard drive, ensures that read operations occur with minimal rotational latency. However, a large portion of real-world data access is random in nature. The next read operation of non-sequential data is difficult to predict.

Storage area networks have been formed taking into consideration the latency of hard disk drives and the random nature of read and write operations. Numerous input/output storage requests are handled by such storage area networks.

Communicating to networked storage devices can be challenging in a storage area network. With traditional communication of commands to a network switch over Ethernet, the performance of a storage area network may be slowed.

It is desirable to improve communication and data access to networked storage devices within storage area networks.

BRIEF SUMMARY

The embodiments are summarized by the claims that follow below.

BRIEF DESCRIPTION OF THE DRAWINGS

Embodiments are described with reference to the Figures, in which like reference numerals denote like elements and in which:

FIG. 2A illustrates a functional block diagram of a tiered storage array unit with Fibre Channel cards.

FIG. 2B illustrates a functional block diagram of a hard-drive storage array unit with Fibre Channel cards.

FIG. 2C illustrates a functional block diagram of a flash appliance with Fibre Channel cards.

FIG. 2D illustrates a functional block diagram of a tiered storage array unit with Ethernet cards.

FIG. 2E illustrates a functional block diagram of a hard-drive storage array unit with Ethernet cards.

FIG. 2F illustrates a functional block diagram of a flash appliance with Ethernet cards and Fibre Channel cards.

FIG. 6A illustrates a diagram of a Fibre Channel frame with a priority field to provide a priority indication of normal priority or high priority for a storage request.

FIG. 6B illustrates a diagram of an internet small computer system interface (iSCSI) message with a priority field to provide a priority indication of normal priority or high priority for a storage request.

FIG. 9A is an exemplary diagram of an exemplary TLV message that can be passed in-band from one networked device to another.

FIGS. 13A-13B illustrate an exemplary diagram of a cache table to identify the storage requests having data stored in a flash-based cache from the storage requests having data stored elsewhere in the storage area network.

FIG. 14 illustrates an exemplary diagram of a SAN routing table to identify the networked equipment to which messages are to be passed over the cables of the storage area network.

FIG. 15 illustrates a flow chart of an exemplary process of in-band communication to communicate messages between networked devices in a local storage area network.

FIGS. 16C, 16D, and 16E are block diagrams illustrating the function operation of the record storage process with the various levels of download completion.

FIGS. 17A and 17B illustrate a flow chart of an exemplary process of in-band communication to communicate messages between networked devices in a local storage area network.

DETAILED DESCRIPTION

Figure 1A:
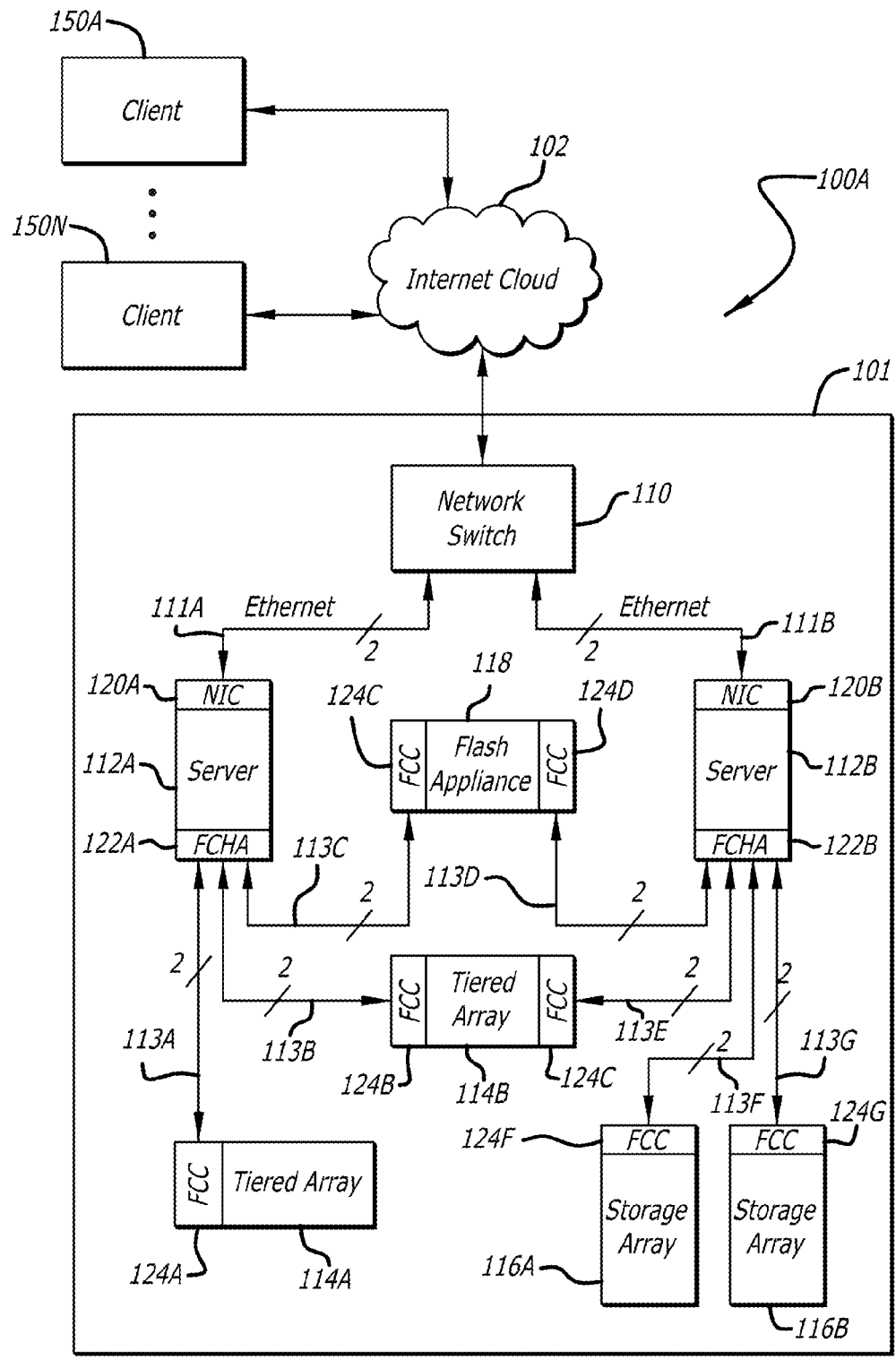
FIGS. 1A-1C illustrate functional block diagrams of a portion of a data center configured for Fibre Channel connectivity and/or Ethernet connectivity.

In the following detailed description, numerous specific details are set forth in order to provide a thorough understanding of various embodiments. However, it will be obvious to one skilled in the art that the embodiments may be practiced without these specific details. In other instances well known methods, procedures, components, and circuits have not been described in detail so as not to unnecessarily obscure aspects of the embodiments.

The embodiments include a method, apparatus and system for optimizations developed to provide better SAN functionality in local storage networks that include flash memory type of storage networking devices. Such flash memory type of storage networking devices include server resident flash memory caching, flash-equipped storage arrays, and flash based caching appliances The embodiments provide improved functions in a storage network that includes flash memory type of storage devices.

One aspect of the embodiments that optimizes a storage network is priority queuing. Priority queuing is a mechanism that is targeted at flash based storage arrays or tiered storage arrays having flash based logical units (LUNs). Flash based logical units beneficially do not require an average seek time that rotating magnetic media does (typically a number of milliseconds), and thereby can achieve lower access latency. The priority queuing model segregates the traffic of instructions, commands for storage requests (referred to as storage requests) by logical unit (LUN), into normal priority storage requests (e.g., non-priority or low priority storage requests) and high priority storage request to ensure end-to-end prioritization of the traffic of flash based storage requests in a storage network. Priority queuing adds priority queuing software drivers to the operating system software of each host server (initiator) and each storage networking device (target) in a local storage network. Priority queuing further improves the hardware with modifications to the host adapter card in each host server and the target adapter card in each storage networking device.

The embodiments relate to optimizations developed to provide better storage area network (SAN) functionally in storage area networks that include flash memory type of storage devices. More particularly, the embodiments relate to improved functionality in a storage network that include flash memory based networked devices.

Some embodiments provide various offload functionality in a storage array networking (SAN) end-point device to provide improved function in a storage network that contains flash memory based networked storage devices.

Although solid state drives (SSDs) address many of the problems with magnetic hard disks in traditional storage networks, flash memory technology is still more expensive on a per-bit basis than magnetic media, and it cannot entirely replace random access memory (RAM) for cache purposes. Therefore, storage devices with flash memory technology have been deployed according to several use cases:

Networked storage arrays have been designed to incorporate flash-based devices, such as solid state storage drives (SSDs), and are therefore able to present flash-based logical units (LUNs) of storage capacity to the local storage network. Some storage arrays employ only flash such as a flash storage appliance. Some networked storage arrays support multiple types of storage media combining flashed based SSDs and magnetic storage devices, for example, to provide logical units of storage capacity for each type of storage media forming a tiered storage array. With a tiered storage model of a tiered storage array, flash-based LUNs may be used for the many data types where minimizing access latency is critical, and rotational magnetic or optical media and their associated LUNs are used for bulk storage. A tiered storage array with the different types of LUNs, allows IT storage administrators to make appropriate cost and performance tradeoffs as they design their storage networking systems.

A second use for flash memory in network storage arrays involves the use of flash-based memory devices within a server to cache I/O requests. Since the cost per bit of flash memory is much lower in costs than random access memory (RAM). Accordingly, larger amounts of flash memory can be used to form flash based cache memory arrays in a server to store in cache large amounts of data in the flash cache memory array. Larger flash based cache memory arrays can reduce access times to critical and frequently-used data thereby significantly enhancing the performance of software applications executed by a server. This use case employs a Caching Filter Driver that resides in the Server's Operating System I/O Stack, with the ability to intercept write data requests, and if deemed appropriate by the filter driver's caching algorithm, write a copy of the data to the local flash-based cache. When the same data is read by the server, the algorithm pulls the data from its cache instead of the external storage, realizing a significant performance benefit.

A third use case is similar to the caching function in the second use case above, but with the flash-based devices of several servers aggregated into a network device, such as a storage appliance. This provides a similar function, but with inherently better support for a centralized management scheme, which is generally desirable for network deployments. The fundamental functional difference for this third use case is that the act of writing data to the cache is carried out over the network, as opposed to a local operation.

Priority Queuing

A priority queuing feature allows for high priority storage requests to take precedent over normal priority storage requests in the storage arrays and storage appliances for the different type of storages arrays in a tiered storage array that may include flash-based storage and rotating media storage, for example. The priority queuing feature provides a method whereby operations targeting flash-based LUNs are sent with high priority, and employ special routing mechanisms to avoid being stuck behind I/O requests targeted at slower rotating media. The priority queuing feature provides an end-to-end solution to ensure optimized handling of flash traffic in a server, a storage array, and intervening network devices.

Referring now to FIG. 1A, a block diagram of a data center computer network 100A is illustrated. The data center computer network 100A can include a network switch 110, one or more servers 112A-112B, one or more tiered storage appliances 114A-114B, one or more storage array appliances 116A-116B, and one or more flash appliances 118 coupled together as shown forming a local storage area network (LAN) 101. One or more clients 150A-150N may interface with the data center computer network 100A over a wide area network 102, such as the internet 102. The one or more clients 150A-150B may desire one or more server functions of the servers 112A-112B for software applications and/or storage capacity provided by the storage arrays or appliances 114A-114B,116A-116B,118 to store data.

The network switch 110 in the data center is coupled to the wide area network (WAN) 102 such as the internet or world wide web. This allows data to be communicated between the servers/storage arrays in the data center 100A and the one or more remotely located clients 150A-150N over the WAN 102.

A pair of servers 112A-112B, also referred to as storage initiators, include Ethernet cards 120A-120B and Fibre Channel host adapter cards 122A-122B, respectively. The Ethernet cards 120A-120B couple the servers in communication with the network switch 110 via Ethernet cables 111A-111B. The servers 112A-112B further include Fibre Channel host adapter cards 122A-122B, respectively.

In one embodiment, a target network device (also referred to herein as a storage target) includes a pair of Fibre Channel cards (FCC) 124A-124B installed to receive signals, including a storage request, from the servers 112A-112B via wires or cables, such as Fibre Channel cables 113C-113D. The target network device may be one of the tiered storage arrays 114A-114B, the storage arrays 116A-116B, or the flash appliance 118 (referred to collectively as storage array appliances). Fibre Channel cards 124A,124B,124E,124F, 124G may be installed in the storage array appliances 114A,114B,116A-116B,118.

The Fibre Channel host adapters (FCHA) 122A-122B in the servers 112A-112B and the Fibre Channel cards in the storage array appliances 114A-114B,116A-116B,118 along with the respective cables, couple the servers in communication with the storage array appliances and other storage devices in the storage area network. The Fibre Channel host adapters may differ somewhat from the Fibre Channel cards because the server is an initiator and storage array appliances are targets.

In some embodiments, the couplings between servers 112A-112B and the storage array appliances are via Fibre Channel cables 113A,113B,113E,113F,113G that terminate at one end of the Fibre Channel cards 124A,124B,124E, 124F,124G of the storage array appliances 114A,114B, 116A,116B.

Figure 1B:
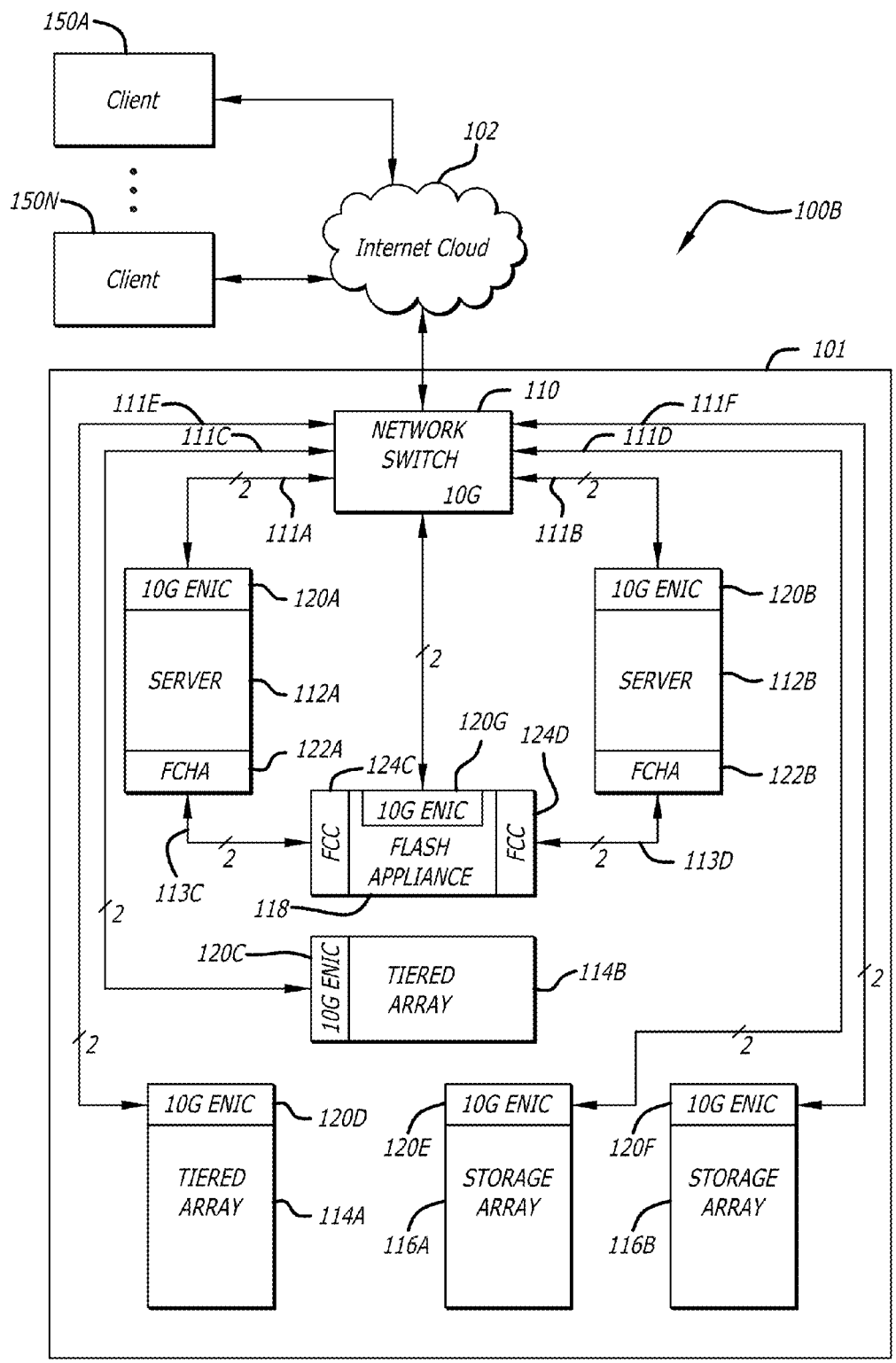
Figure 1C:
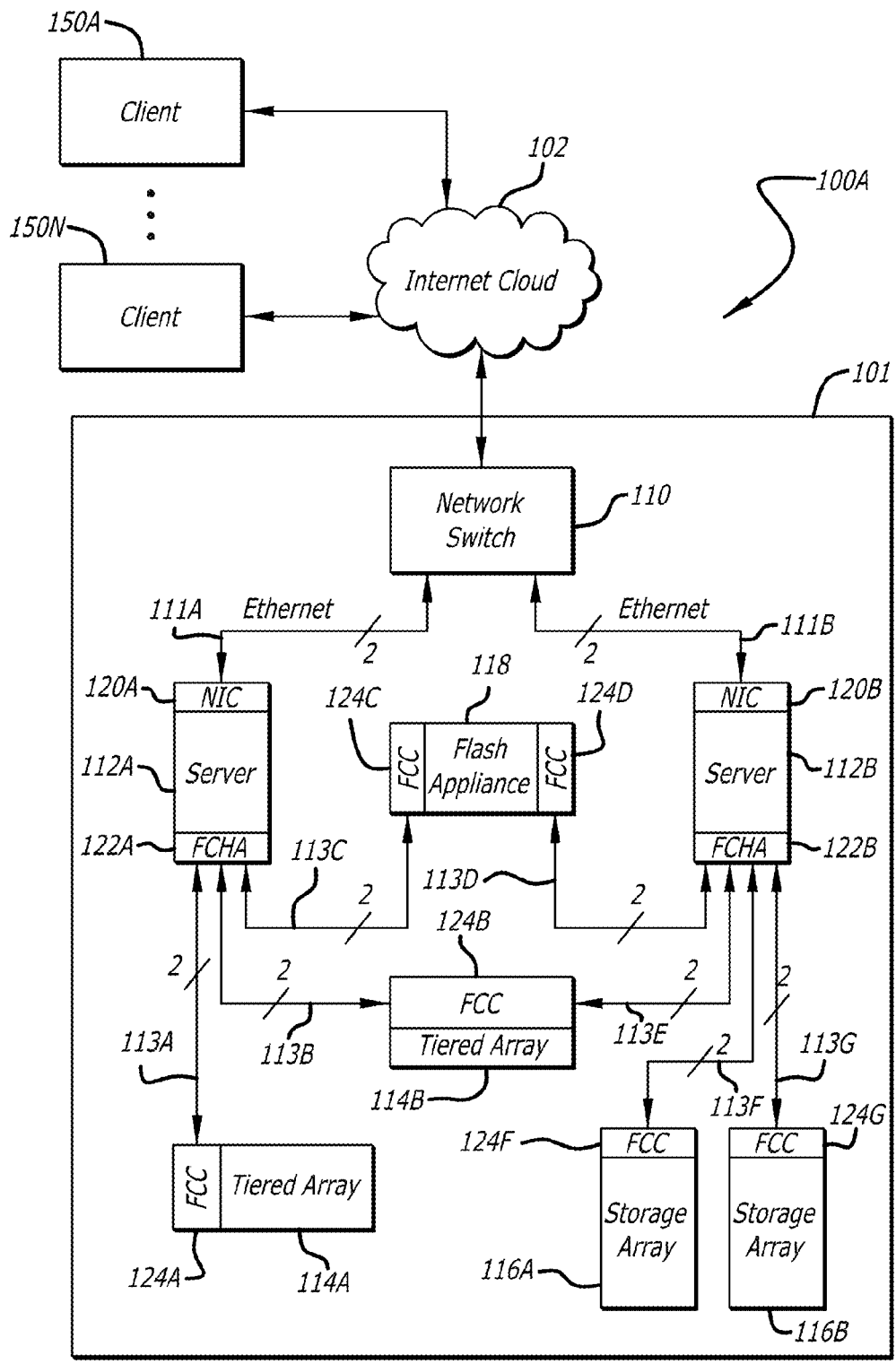

FIG. 1C illustrates a functional block diagram of a data center computer network 100C. The data center computer network 100C is a modification to the data center computer network 100A in that the tiered array 114B includes a Fibre Channel controller 124B with multiple connections 113B, 113E to multiple servers 112A-112B so that it can pass messages between networked devices within the storage area network. Message passing is described further herein.

Referring now to FIG. 1B, a functional block diagram of a data center computer network 100B is illustrated having a number of Ethernet cable connections to support Fibre Channel over Ethernet communication protocol. The data center computer network 100B can include a network switch 110, one or more servers 112A-112B, one or more tiered storage appliances 114A-114B, one or more storage array appliances 116A-116B, and one or more flash appliances 118 coupled together as shown forming a local area network (LAN) 101.

The network switch 110 is coupled to a wide area network (WAN) 102 such as the internet or World Wide Web. This allows data to be communicated between the servers in the data center 100B and remotely located clients (not shown) over the WAN 102.

A pair of servers 112A-112B, also referred to herein as storage initiators, is coupled to the network switch 110 via Ethernet cables 111A-111B terminating in Ethernet cards 120A-120B installed on servers 112A-112B. The servers 112A-112B further have Fibre Channel host adapter cards 122A-122B respectively installed into them. The Fibre Channel host adapters 122A-122B installed in servers 112A-112B may differ somewhat from the Fibre Channel cards 124C-124D because the server is an initiator and the storage array appliances are targets. In some embodiments, a flash appliance device 118 includes a pair of Fibre Channel cards 124C-124D installed to receive signals, including a storage request, from the servers 112A-112B via wires or cables, such as Fibre Channel cables 113C-113D. The target network device may be one of the tiered storage arrays 114A-114B, the storage arrays 116A-116B, or the flash appliance 118 (referred to collectively as storage array appliances). Ethernet cards 120A-120G may be installed in the storage array appliances 114A,114B,116A,116B, 118 to receive signals, including storage requests, from the servers 112A-112B via wires or cables, such as Ethernet cables 111C-111F terminating in Ethernet cards 120A-120F.

One of ordinary skill in the art will recognize that the Fibre Channel host adapters and Fibre Channel cards can support Fibre Channel over Ethernet (FCOE) as well as other communication protocols over either copper and/or optical cables. One of ordinary skill in the art will also recognize that aspects of the embodiments may be extended to high-speed wireless communication protocols between pairs of wireless receivers/transmitters.

Priority Storage Requests and Logical Units of Storage Capacity

Referring now to FIG. 2A, a block diagram of a tiered storage array unit 114 representing the tiered storage arrays 114A-114B is illustrated. Each tiered storage array unit 114 includes one or more Fibre Channel cards (FCC) 124 installed that employ aspects of the embodiments to receive and send signals, including normal priority storage requests (e.g., non-priority storage requests) and high priority storage requests via wires and/or cables interconnecting the local storage area network.

Each tiered storage array unit 114 further includes flash memory storage devices FM1-FMN to provide a portion of its storage capacity. Each tiered storage array unit 114 further includes at least one different type of storage media, such as one or more hard disk drives HD1-HDN and/or one or more writeable optical disks OD1-ODN.

The storage capacity in a storage array may be logically assigned based on the type of media and/or the type of storage service that is desired for a given function or application. For example, logical unit 1 (LUN 1) is uniformly assigned to a plurality of flash memory storage devices FM1-FM5. Logical unit X (LUN X) may be uniformly assigned to one or more hard disk storage devices HDN. Logical unit Z (LUN Z) may be uniformly assigned to one or more optical disk storage devices ODN. Logical unit M (LUN M) may be assigned to flash memory storage FMN-FML. Logical unit Y (LUN Y) may be assigned to optical disk storage OD1-OD2. Storage capacity in a given storage media may also be split up to a plurality of LUNs. For example in FIG. 2A, hard disk storage device HD1 has its capacity split up to support LUN R, LUN S, and LUN T.

According to one aspect, the storage requests include a higher priority indication or a normal priority indication as to whether or not a high or higher priority storage request has been made that is to be treated with higher priority than a normal priority storage request. The type of storage requests may be given to functions based on the expected storage service provided and the underlying media providing such storage capacity. For example, LUN 1 having the plurality of flash memory storage devices FM1-FM5 may be assigned to functions and applications that expect a fast storage performance in comparison with the LUN X, for example. In this case, storage requests may be high priority storage requests to match the faster storage service provided by the flash memory storage devices FM1-FM5. LUN X and LUN Z have slower storage devices assigned to them such that storage requests may be normal priority storage requests to match the slower storage service provided by the hard disk and optical disk storage devices.

Referring now to FIG. 2B, a block diagram of an exemplary hard-drive storage array unit 116 represents the storage arrays 116A-116B of FIG. 1A and FIG. 1B. Each hard-drive storage array unit 116 of FIG. 2B includes one or more Fibre Channel cards (FCC) 124 installed to receive and send signals, including normal priority storage requests and high priority storage requests, via wires and cables of the local storage area network.

The hard-drive storage array unit 116 may include a uniform media type, such as a plurality of hard disk drives HD1-HDN. The storage array unit may include alternatively a plurality of optical disk drives OD1-ODN, for example. The storage capacity in the storage array 116 may be logically assigned based on the desired capacity for a given function or application. For example, logical unit 1 (LUN 1) may be assigned to portions of a first hard drive HD1. Logical unit 2 (LUN 2) may be assigned to the entire capacity of the third hard drive HD3. Logical unit M (LUN M) may be assigned to a plurality of hard drives HDM-HDN.

Traditional hard drives are typically slower to execute storage requests than flash memory devices. Accordingly, the storage requests that the storage array unit 116 may be expected to receive are normal priority storage requests to match the slower storage service provided by the hard disk drives or optical disk storage devices. However, improvements in hard drives, such as faster rotational speeds, or hybridization by adding flash memory to a hard disk drive can improve the storage performance so that a faster storage service performance is provided. In this case, the storage array unit with such improved performance hard drives may be expected to receive high priority storage requests.

FIG. 2C illustrates a flash appliance 118 with one or more Fibre Channel cards (FCC) 124. The Fibre Channel cards (FCC) 124 can prioritize signals, including high priority storage requests and normal priority storage requests, sent or received from the initiators (servers) and the targets (storage array appliances) into their respective priority queue or normal queue for delivery schedule management. The flash appliance 118 further includes a plurality of flash memory storage devices FM1-FMN to provide a fast storage array.

The storage capacity in the flash memory appliance 118 may be logically assigned based on the amount of storage capacity and storage service that is desired for a given function or application. For example, logical unit 1 (LUN 1) is uniformly assigned to a plurality of flash memory storage devices FM1-FM2. Logical unit N (LUN N) may be assigned to one flash memory storage device FMN. Other logical units may be assigned to a fraction of a flash memory storage device, or to a whole and/or plurality, as needed.

With the flash appliance 118 having nothing but faster flash memory storage devices, the expected storage requests that the flash applicant may receive are high priority storage requests. However, if a function assigned to a LUN in the flash appliance only needs normal priority, that LUN may be expected to receive normal priority storage requests, even though its storage devices are faster than hard disk drives or optical disk storage devices.

FIGS. 2D, 2E, and 2F illustrate similar networked devices to those illustrated respectively in FIGS. 2A, 2B, and 2C but with high speed Ethernet network interface cards 120 in place of or in addition to Fibre Channel cards 124. In this case, the storage network (e.g., storage network 101 of FIGS. 1A and 1B) supports a Fibre Channel over Ethernet (FCoE) protocol and the network storage devices 114A-114B,116A-116B,118 can directly couple to the network switch 110 as shown in FIG. 1B.

FIG. 2D illustrates a tiered storage array unit 114' with one or more high speed (e.g., 10G) Ethernet cards ENIC 120 installed to receive and send signals, including storage requests over wire and cables, from the local storage network 101 of FIG. 1A and FIG. 1B. FIG. 2E illustrates a hard-drive storage array unit 116' with one or more high speed Ethernet cards 120 installed to receive and send signals, including storage requests via wires and cables, from the local storage network. FIG. 2F illustrates a flash appliance 118' with one or more Fibre Channel cards 124 and/or one or more high speed Ethernet cards 120 advantageously enabled to prioritize the signals, including storage requests, sent or received from the initiators (servers) and the targets (storage array appliances) into their respective priority queue or normal queue for delivery schedule management. The logical units may be similarly defined as described previously with reference to FIGS. 2A-2C.

Figure 2G:
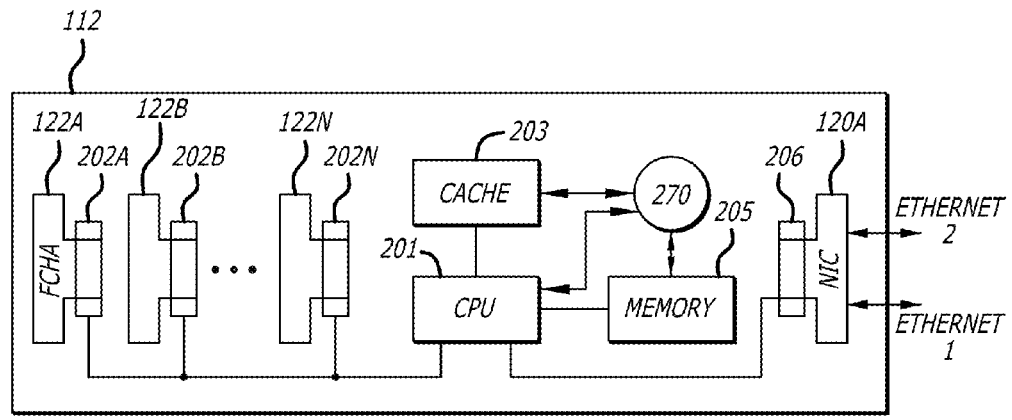
FIG. 2G is a functional block diagram of a server with Fibre Channel and Ethernet adapter cards for data communication over various types of interfaces.

Referring now to FIG. 2G, a block diagram of a server 112 that is exemplary of the servers 112A-112B is illustrated. Each server 112 includes one or more Fibre Channel host adapters (FCHA) 122A-122N operatively coupled with sockets 202A-202N and a high speed Ethernet card 120 operatively coupled with socket 206 for data communications over various types of interfaces with various communication protocols. The high speed Ethernet card 120, for example, may communicate with networked storage devices using a Fibre Channel over Ethernet (FCoE) communication protocol, or another protocol. The one or more Fibre Channel host adapters (FCHA) 122A-122N may communicate with networked storage devices using a Fibre Channel (FC) communication protocol, such as small computer system interface (SCSI). Each server 112 further includes one or more processors 201, a cache memory 203, and scratch pad memory 205 coupled together as shown. Each server 112 may further include another larger storage device 270, such as a hard disk drive or a solid state storage drive (SSD) to store software instructions of software drivers and software applications for execution by the one or more processors to perform various functions described herein. The one or more processors 201 may be multi-processors having multiple processor cores in one package that can be assigned to certain server functions. A portion of the cache memory 203 may be allocated and assigned to each processor 201 for use. The cache memory 203 may be a flash based cache memory (FBC) that is non-volatile to retain is data in the event of power down or a catastrophic power failure.

Figure 2H:
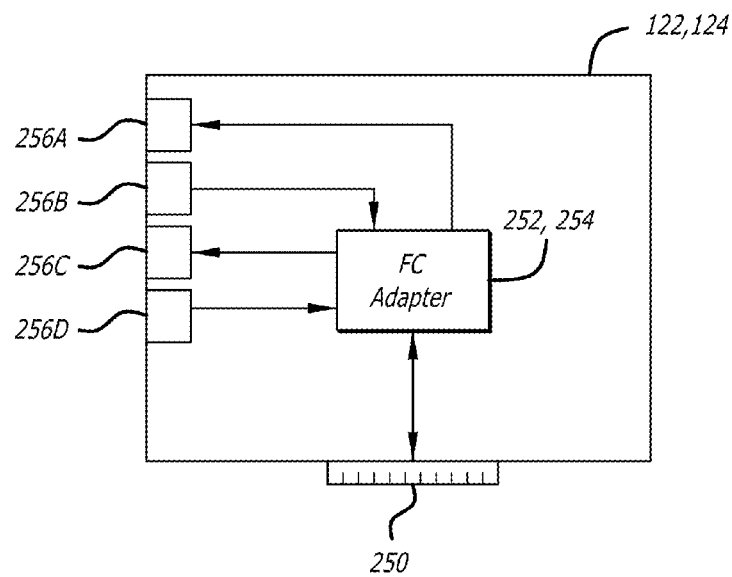
FIG. 2H illustrates a functional block diagram of an adapter card with an adapter integrated circuit.

Referring now to FIG. 2H, a functional block diagram of an adapter card 122, 124 is shown. The adapter card 122,124 may be a Fibre Channel host adapter of a server 122, also referred to as an initiator of storage requests. The adapter card 122,124 may be a Fibre Channel card of a networked storage device, also referred to as a target. In either case, the adapter card 122,124 includes a Fibre Channel (FC) module 252,254 that can prioritize storage requests. The Fibre Channel module 252,254 can be an integrated circuit. The Fibre Channel module 252,254 is coupled between the bus connector 250, such as a PCI or PCIe connector, and a plurality of cable connectors 256A-256D. The bus connector 250 is used to plug the adapter card into a socket of the server or the networked storage device. The cable connectors 256A-256D are used to couple to a wire cable or an optical cable so that the server or the networked storage device may communicate to each other within the local storage network 101 or to clients over a wide area network 102.

Figure 2I:
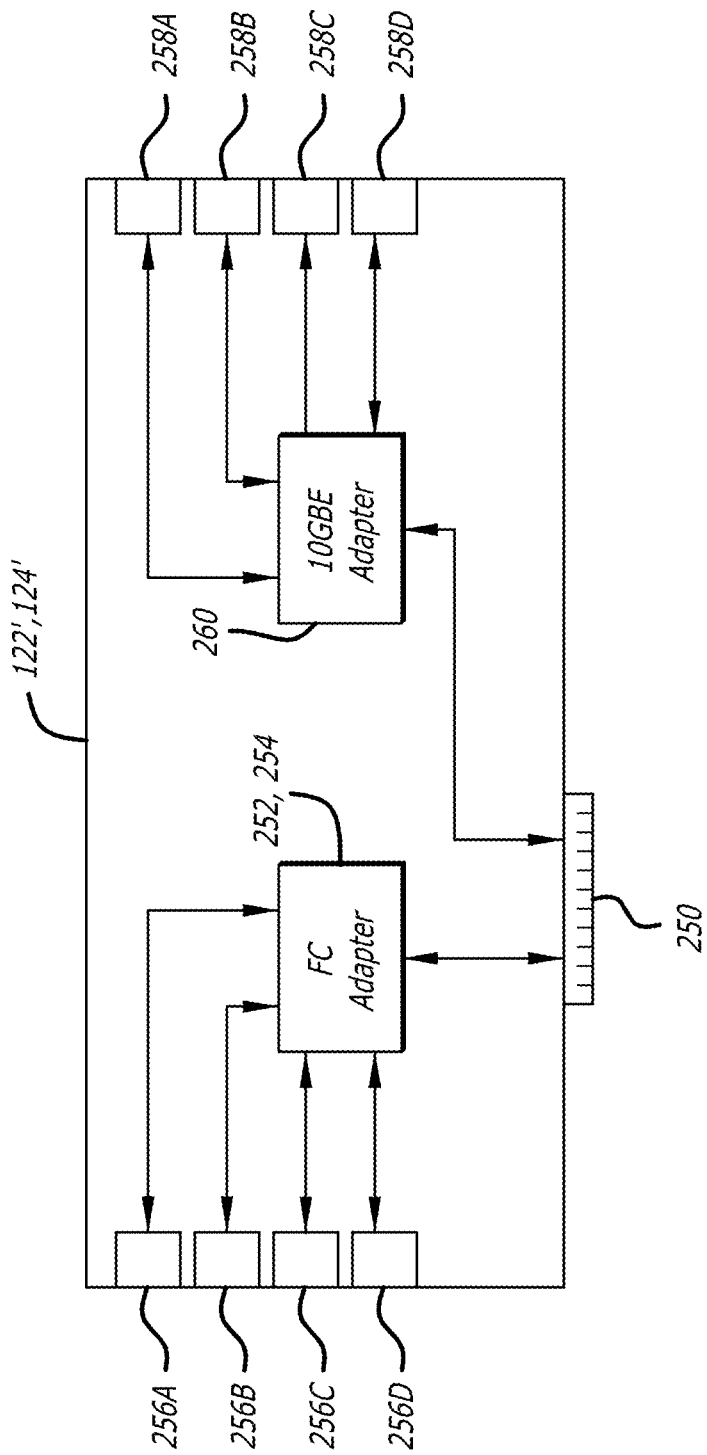
FIG. 2I illustrates a functional block diagram of an adapter card with adapter integrated circuits employing aspects of the embodiments for communication over Fibre Channel or Ethernet.

Referring now to FIG. 2I, a functional block diagram of an alternate embodiment of an adapter card 122',124' is shown. Similar to the adapter card 122,124, the adapter card 122',124' includes a Fibre Channel adapter 252,254 coupled between cable connectors 256A-256D and the bus connector 250. The adapter card 122',124' may further include an Ethernet adapter 260 coupled between the bus connector 250 and Ethernet connectors 258A-258D to communicate with a Fibre Channel over Ethernet (FCoE) protocol using a high speed Ethernet physical interface. One of ordinary skill in the art will recognized that other protocols may be used to communicate high and normal priority storage requests over cables between adapter cards and network equipment. If the high speed Ethernet physical interface is all that is needed, the Fibre Channel adapter circuit 252,254 and the cable connectors 256A-256D may be eliminated from the adapter card. The bus connector 250 is used to plug the adapter card 122' or 124' into a socket of the server or the networked storage device. The cable connectors 256A-256D and/or Ethernet connectors 258A-258D are used to couple to a wire cable or an optical cable so that the server or the networked storage device may communicate to each other within the local storage network 101 or to clients over a wide area network 102.

According to one aspect, the Fibre Channel adapter 252, 254 and/or Ethernet adapter 260 are implemented as integrated circuits and the high priority storage requests and the normal priority storage requests are communicated by servers and the networked storage devices over the wires or cables in the local storage network 101 coupled to the adapter cards 122, 124 through the adapter integrated circuits 252,254 and/or 260.

Figure 3:
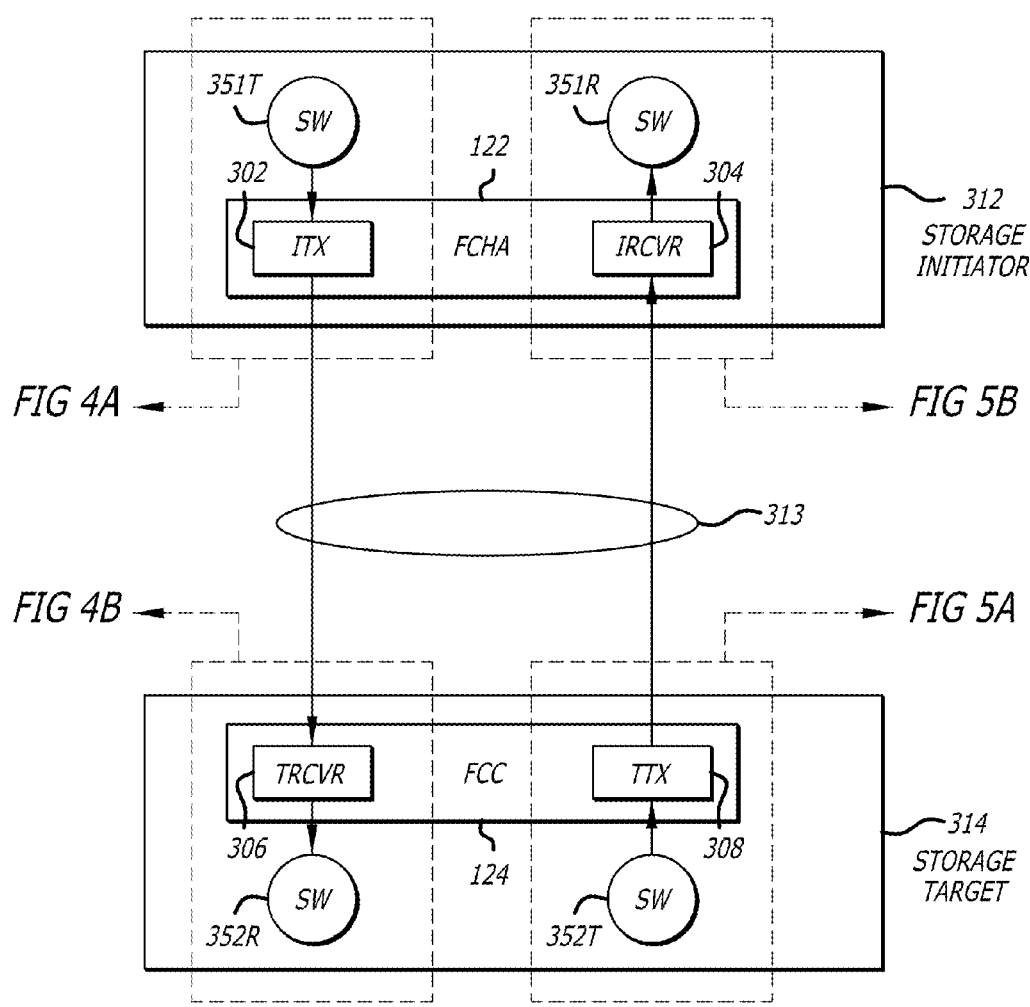
FIG. 3 illustrates a functional block diagram of the interface between a storage initiator (such as a server) and a storage target (such as a storage array) for the transmission and reception of storage requests and acknowledgements.

Priority Storage Requests and Priority Acknowledgments Communicated Between Networked Devices FIG. 3, illustrates a communication interface over wires or cables 313 between a networked storage initiator 312 (such as a server 112 of FIG. 1A and FIG. 1B) and a networked storage target 314 (such as a storage array 114, 116, 118). The storage initiator 312 is configured with a Fibre Channel host adapter card (FCHA) 122 as well as transmit software driver 351T and receive software driver 351R. The networked storage target 314 is configured with a Fibre Channel card (FCC) 124 as well as a transmit software driver 352T and a receive software driver 352R.

The Fibre Channel host adapter (FCHA) card 122 for the initiator 312 includes the adapter integrated circuit 252 (see e.g., FIGS. 2H-2I). The adapter integrated circuit 252 includes an initiator transmit module (ITX) 302 and an initiator receive module (IRCVR) 304. The initiator transmit module 302 is provided to send signals, including high priority storage requests and normal priority storage requests, over the network via the wires or cables 313. The initiator receive module 304 is provided to receive return signals, including high priority storage requests and normal priority storage requests, from the network (e.g., 101) over the wires or cables 313.

The Fibre Channel card 124 for the target 314 includes the adapter integrated circuit 254 (e.g., FIGS. 2H-2I). The adapter integrated circuit 254 includes a target receive circuit 306 and a target transmit circuit 308. The target receive circuit 306 is provided to receive signals, including high priority storage requests and normal priority storage requests, from the initiator 312 over the network via wires or cables 313. The target transmit circuit 302 is provided to send signals, including responses to the high priority storage requests and normal priority storage requests, over the network through the wires or cables 313 to the initiator 312.

Signals, including storage requests, are initiated by and originate from the initiator 312. The storage target 314 receives the signals and acts upon them if they are for its logical units of storage capacity. The initiator 312 initiates Fibre Channel signals, including high priority storage requests and normal priority storage requests, and transmits them to the storage target 314. The storage target 314 receives the Fibre Channel signals and acts on those that are directed to its logical units. In response to receiving a storage request directed to one or more of its logical units, the storage target 314 executes the storage request whether it is to store data or to read data from its logical units of storage capacity. After execution, the storage target 314 then transmits a Fibre Channel signal, including a high priority acknowledgment or normal priority acknowledgement, to the initiator 312 acknowledging with or without data (depending upon a read or write) that the storage request was executed and completed. If the storage request was a high priority storage request, the acknowledgement and data, if any, are likewise returned with a high priority indication. If the storage request was a normal priority storage request, the acknowledgement and data, if any, are likewise returned to the initiator by the storage target with a normal priority indication.

To distinguish normal priority storage requests from high priority storage requests, a priority indicator is set in a given network communication protocol to communicate I/O high priority storage requests and I/O high priority acknowledgements through the local storage network. An I/O high priority storage request traverses the storage network with high priority in comparison with normal priority storage requests. In one embodiment, Fibre Channel frames are used to communicate storage requests and acknowledgments. Various digital signal communication protocols may be used to form storage requests (high priority storage request signals and normal priority storage request signals) with a priority indicator for communication within the local storage network between storage initiator and storage target, such as internet small computer system interface (iSCSI), ATA-over-Ethernet (AoE), Fibre Channel over Ethernet (FCoE), Fibre Channel over IP (FCIP), HyperSCSI SCSI over Ethernet frames instead of IP, iSCSI Extensions for RDMA (iSER), Internet Fibre Channel Protocol (iFCP), Internet Storage Name Service (iSNS).

Referring now momentarily to FIG. 6A, a diagram of data fields in a Fibre Channel frame 600A of a Fibre Channel signal is illustrated. According to another aspect, the Fibre Channel frame 600A includes a priority field 630 of one or more bits or bytes to identify whether or not a storage request is a high priority storage request to be handled with high priority or a normal priority storage request to be handled with normal priority. If the frame 600A includes an acknowledgement, the priority field 630 indicates whether or not the acknowledgement is a high priority acknowledgement to be handled with high priority or a normal priority acknowledgement to be handled with normal priority. The priority field 630 may be a part of an optional header field 614 in the Fibre Channel frame 600A.

The Fibre Channel frame 600A includes a start of frame field 602, a frame header field 604, a multi-byte data field 606, the optional header field 614, a multi-byte payload field 612, an error check field 608, and an end of frame field 610. The frame header field 604 includes a control field 616, a source address field 618, a destination address field 620, a type identifier field 622, a sequence control field 624, a sequence identifier field 626 and an exchange identifier field 628.

The multi-byte data field 606 may be a field of 2112 bytes. The multi-byte payload field 612 of the frame 600A is 2048 bytes. The optional header field 614 may be formed of 64 bytes in the frame, one of which may include a priority bit or priority byte as the priority field 630. After the data fields, a cyclic redundancy check field 608 is provided in the frame 600A. The cyclic redundancy check field 608 provides for error control checks and possible correction of an error that is found. The frame 600A further includes an end of frame designator 610 identifying its end.

Referring now momentarily to FIG. 6B, a diagram of data fields in an iSCSI message or protocol data unit (PDU) 600B of an iSCSI signal is illustrated. According to another aspect, the iSCSI message 600B includes a priority field 630B of one or more bits or bytes to identify whether or not a storage request is a high priority storage request to be handled with high priority or a normal priority storage request to be handled with normal priority. If the iSCSI message 600B includes/comprises an acknowledgement, the priority field 630B indicates whether or not an acknowledgement is a high priority acknowledgement to be handled with high priority or a normal acknowledgement to be handled with normal priority.

The priority field 630B may be a part of an optional header field in the iSCSI message 600B. The priority field 630B may be set similar to the priority field 630A of the Fibre Channel frame 600A to provide a priority indicator. The iSCSI message 600B further includes an iSCSI control header 641 and an optional data field 643 as shown in FIG. 6B.

Figure 6C:
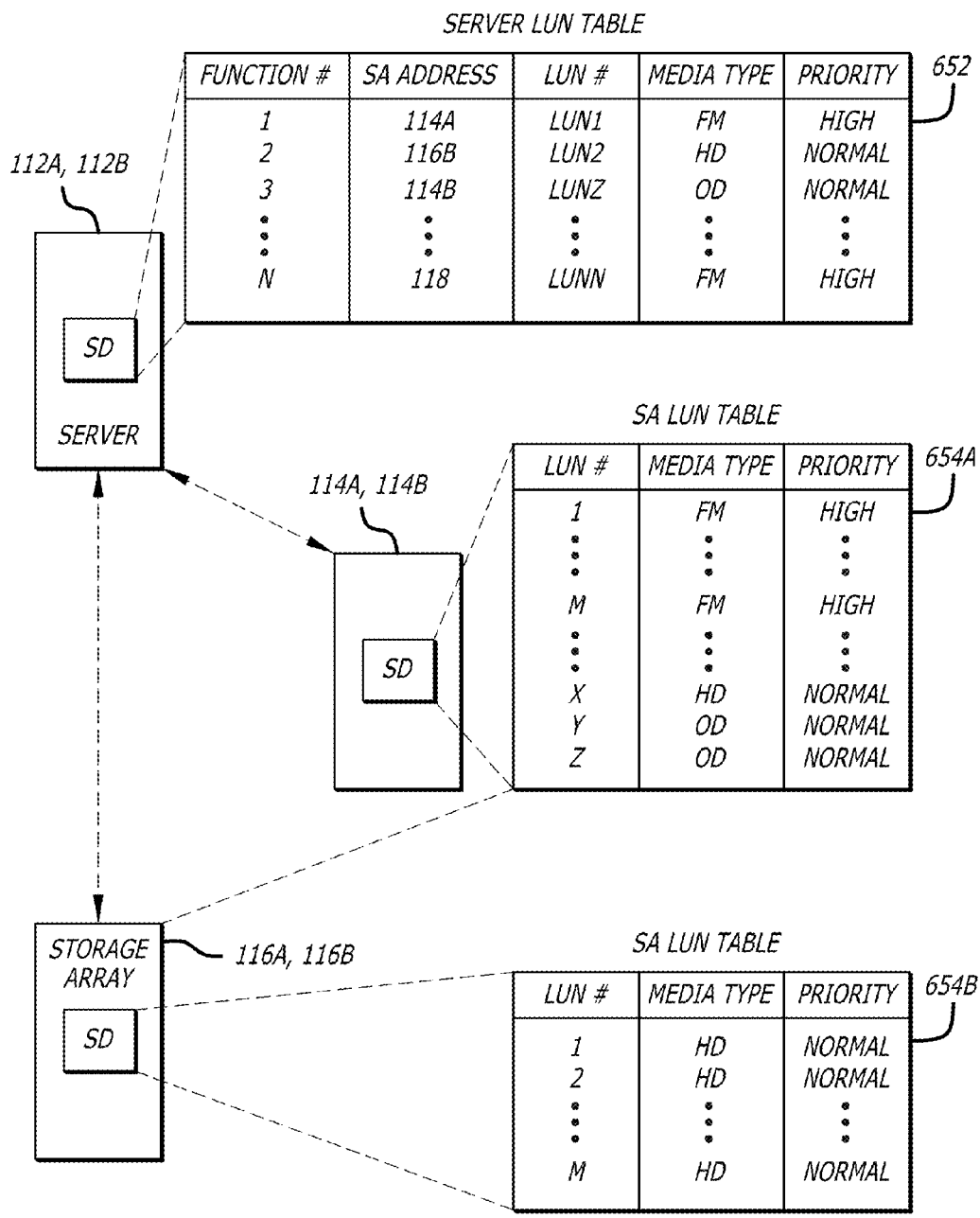
FIG. 6C illustrates a diagram of LUN tables for servers and storage arrays to identify high priority storage requests and normal priority storage requests based on the LUN number.

Referring now to FIG. 6C, instead of or in addition to a priority bit or byte in a frame or message, LUN tables may be tabulated and stored in a storage device SD within each server 112A,112B, and each storage array 114A-114B, 116A-116B, 118 within the local storage network 101 of FIGS. 1A-1B. Server LUN table 652, for example, may be stored in a storage device (SD) in the server 112A-112B. Storage array LUN tables 654A-654B, for example, may be stored in a storage device (SD) in the storage arrays 114A-114B,116A-116B. The storage device may be a hardware device such as memory, a local hard drive, or a cache memory. Alternatively, the tables may be software based and stored in the server or storage array where a software driver can gain access.

The server LUN table 652 includes rows to identify the server function number with a storage array address and LUN number. In the same row, the media type and priority of a storage request can also be stored and/or associated with the given LUN number and storage array address that are assigned to the server function. For example, server Function #1 is assigned LUN 1 in the storage array associated with storage array (SA) address 114A. The LUN 1 in the storage array with address 114A has a flash memory media type and a high priority storage request. Thus, the server 112A,112B knows that storage requests to this LUN in this storage array are treated as high priority storage requests.

To complement the server LUN table 652, each storage array in the local storage network also stores a storage array (SA) LUN table 654A-654B. The SA LUN table 654A-654B includes rows to identify the LUN numbers assigned to the media type therein and the priority of a storage requests that are expected for the given LUN number. The LUN numbers identify the assigned storage capacity within the storage device and the addresses therein where data can be stored. In table 654A for example, LUN 1 in the storage array 114A,114B is associated with a flash memory media type and is expected to receive high priority storage requests. LUN Z on the other hand is associated with an optical disk (OD) media type and is expected to receive normal priority storage requests.

With server LUN tables and storage array LUN tables stored in the networked devices in a local storage network representing the available storage capacity therein, the hardware and software drivers in each can determine whether or not a storage request is a high priority storage request for fast media types, such as flash memory based storage, or a normal priority storage request for slower media types, such as hard disk drive based storage.

Figure 4A:
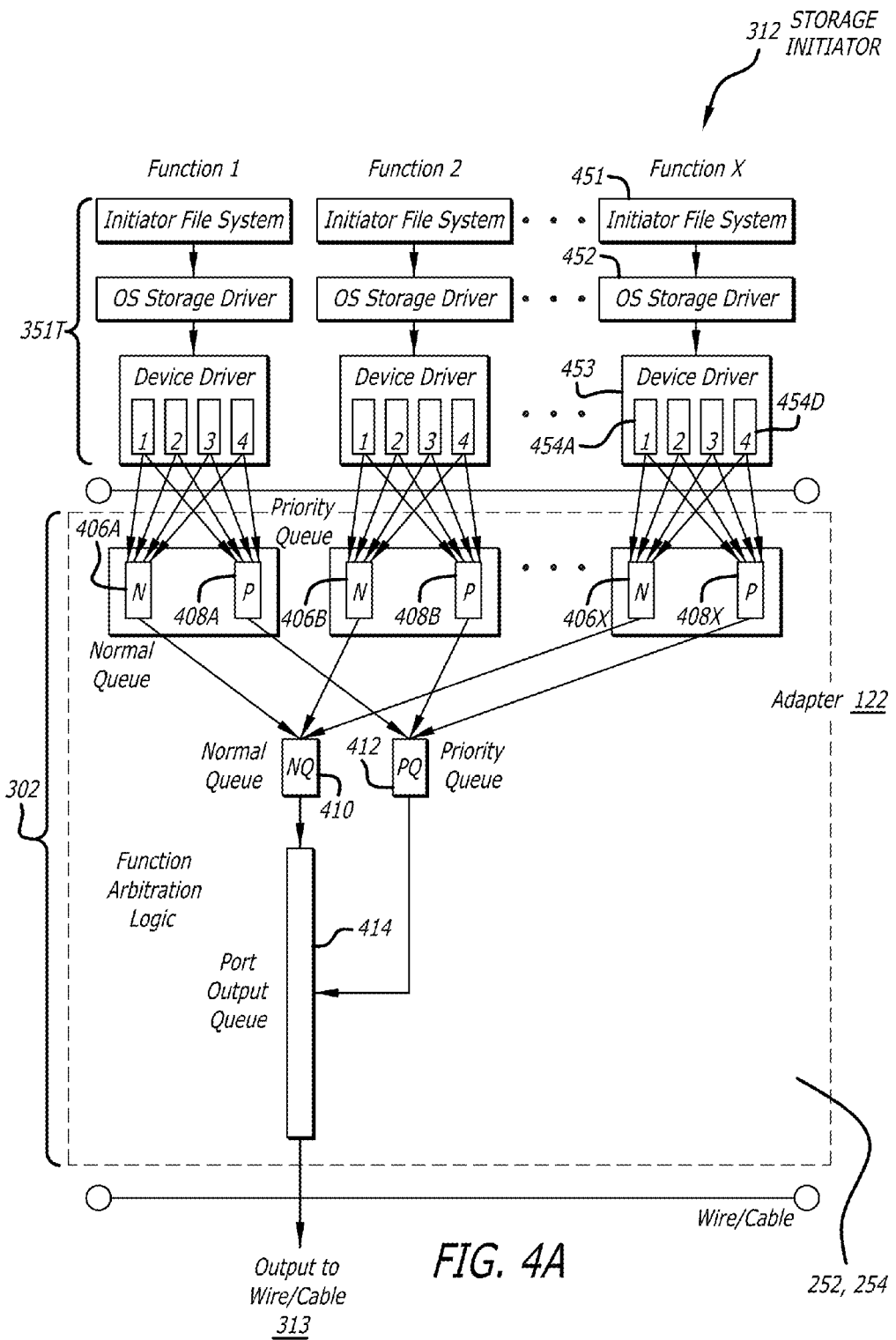
FIG. 4A illustrates a functional block diagram of the transmission of storage requests by the storage initiator onto the wire/cable of the storage area network.

Referring now to FIG. 4A, a functional block diagram of portions of the storage initiator 312, such as a server 112, are shown. Generally in the initiator 312 and the I/O adapter 122, I/O storage requests flow through a series of queues where they are held until they can be serviced. The queues are typically implemented with finite depths, such that congestion or delay in servicing the head of the queue can cause it to fill up. A queue that is full of storage requests creates back pressure on the queues above it. This back pressure condition is known as head of line blocking. Head of the line blocking can negatively impact the performance of a server due to increased access latency and lower transactions per second.

Previously, I/O storage requests for both flash-based media (also referred to as low latency media) and rotational media (also referred to as high latency media) traversed the same queue. Storage requests for rotational media with slower access times in front of flash based storage requests can create a head of line blocking situation. In a head of line blocking situation, flash based storage requests in the same queue end up being blocked by rotational media based storage requests that are in front of the flash based storage requests. It is desirable to eliminate head of line blocking of storage requests for low latency media so that the benefits of low latency media (such as flash based storage) in a storage area network can be realized.

An advantageous solution is to provide pairs of parallel queues, normal priority queues in parallel with high priority queues, at various communication layers of the network communication paths to ensure that flash-based I/O storage requests are not subjected to head of line blocking by rotational media I/O storage requests.

In FIG. 4A, the storage initiator 312, such as a host server 112 (e.g., of FIGS. 1A and 1B), may execute instructions with its processor to provide a plurality of peripheral component interconnect (PCI) functions, Function 1 through Function N. A function may be a virtual operating system, for example. For each function, the transmit software driver 351T provides a file system 451, an operating system storage driver 452, and a device driver 453.

The device driver 453 forms one or more LUN queues 454A-454D for the one or more LUNs that may be assigned to each given function of the server. Each LUN has its own queue to hold an order of a plurality of I/O storage requests. The device driver 453 has knowledge of the one or more LUNs that are assigned to the given function and thus its priority. For example, a LUN that is assigned to a flashed based storage device, e.g., LUN 1 in the tiered array 114 (e.g. of FIGS. 1A, 1B, 2A and 2D), have priority I/O storage requests (also referred to as high priority storage requests).

The device driver executed by a processor in the storage initiator further sets the priority indicator (e.g., prioritization bits or byte) or not, of each storage request as they are stored into the one or more LUN queues. Each of the one or more LUN queues 454A-454D may store one or more normal priority storage requests and one or more high priority storage requests. To properly handle each, the one or more normal priority storage requests and the one or more high priority storage requests are sorted out from the LUN queues 454A-454D by binning them into a normal work queue 406X and a priority work queue 408X for each function, Function 1,2, . . . X. For each function, the device driver causes the normal work queue 406X and the priority work queue 408X to be formed in the transmit circuit of the adapter integrated circuit. The I/O priority (e.g. SSD) storage requests are directed from the LUN queues into the high priority queues. The I/O normal priority (e.g. HDD) storage requests are directed from the LUN queues into the normal queues.

Within the Fibre Channel host adapter 122, for each function, the initiator transmit module 302 includes normal work queues 406A-406X to store normal priority storage requests for transmission and priority work queues 408A-408X to store high priority storage requests for transmission. Accordingly, the normal work queues 406A-406X and the priority work queues 408A-408X are in communication with the LUN queues 454A-454D of each function to receive the high priority storage requests and the normal priority storage requests.

If a storage server or other networked storage device supports one function, there are fewer storage requests and the queuing model can be simplified. However most networked devices, such as a server, support multiple simultaneous PCI functions. Accordingly, the plurality of storage requests coming from the plurality of work queues need to be arbitrated by function arbitration logic. The priority and normal queuing model is thus carried into the function arbitration logic for the transmit circuit of the adapter circuit. Accordingly, high priority storage requests from each of the functions are routed to a priority arbitration queue (PAQ) 412 in accordance with a function arbitration method. The normal priority storage requests from each of the functions are routed to a normal arbitration queue (NAQ) 410 in accordance with a similar function arbitration method.

Thus, the initiator transmit module 302 within the adapter integrated circuit 252,254 further includes the normal arbitration queue 410, the priority arbitration queue 412, and a port output queue 414 coupled together as shown. The normal arbitration queue 410 and the priority arbitration queue 412 are coupled through the arbitration logic to the respective normal work queues 406A-406X and the priority work queues 408A-408X.

Arbitration logic within the transmit module 302 reads out the high priority storage requests one at a time from the priority work queues 408A-408X for each function in a logical arbitrated manner. The high priority storage requests are received into the priority arbitration queue 412. The arbitration method performed by the arbitration logic may be a round robin arbitration, for example, going from one function to the next function of the priority work queues 408A-408X to place high priority storage requests from each function into the priority arbitration queue 412 with an arbitrated order. Other known arbitration methods, algorithms, and logic may be used to obtain an arbitrated order of storage requests in the priority arbitration queue 412.

Similarly, the arbitration logic within the transmit module 302 reads out the normal priority storage requests one at a time for each function from the normal work queues 406A-406X and stores them into the normal arbitration queue 410 in a logical arbitrated manner. The arbitration for the normal priority storage requests may also be a round robin type of arbitration going from one function to the next function to receive normal priority storage requests one at a time from each of the normal work queues 406A-406X for each function to place them into the arbitrated order within the normal arbitration queue 410. Other known arbitration methods, algorithms, and logic may be used to obtain an arbitrated order of storage requests in the normal arbitration queue 410.

Figure 8C:
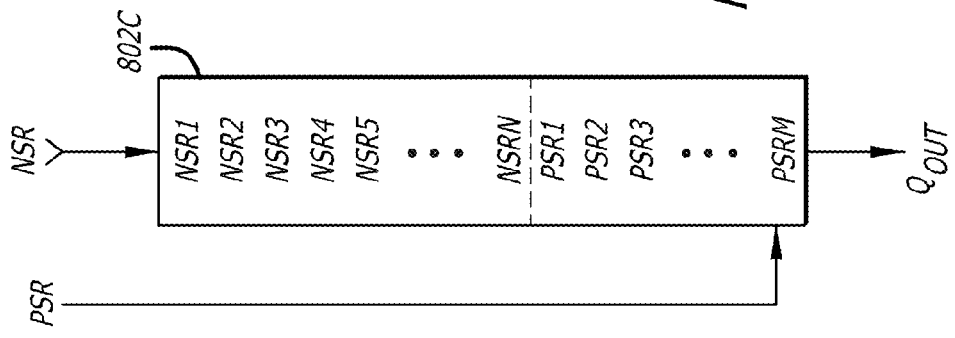
FIGS. 8A, 8B and 8C are block diagrams illustrating the operation of the port output queue processing normal priority storage requests and high priority storage requests.
Figure 8B:
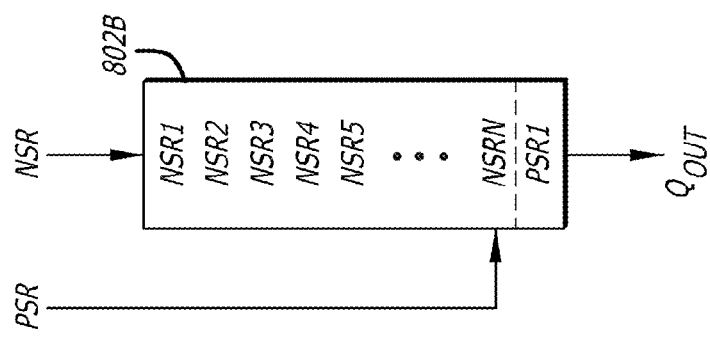
Figure 8A:
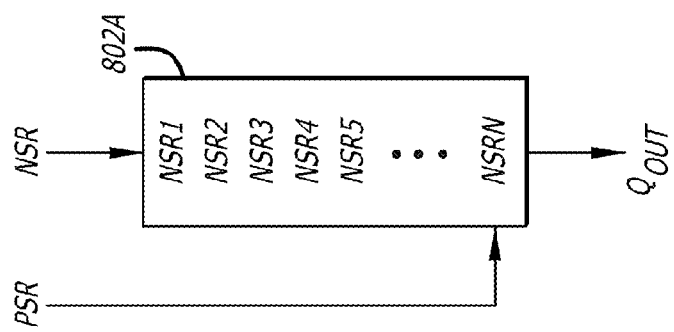

With two queues, the normal arbitration queue 410 and the priority arbitration queue 412, a further decision is made as to which storage requests from which queue are going to be transmitted out of the storage initiator 312 into the local storage network for service by the storage target. One method of accomplishing this is to provide a large queue with an order that can be varied. Another method provides a variable length queue to provide some elasticity to receive high priority storage requests near the front of the queue and to receive normal priority storage requests at the end of the queue. FIGS. 8A-8C, described further herein, illustrate the functionality of such an output queue. In any case, the output queue 414 is provided such that high priority storage requests from the priority arbitration queue 412 are placed near the front of the queue of storage requests so that they are transmitted out onto the wire or cables of the local storage network as soon as possible. With the normal priority storage requests and the high priority storage requests in an order within the final output queue 414, they are ready to be transmitted out through the output port and onto the wires or cables 313 of the storage network 101.

Each of one or more normal priority storage requests from the normal arbitration queue 410 are inserted in order into the bottom of the output queue 414. The normal priority storage requests are eventually shifted out from the top of the output queue 414. Each of the one or more high priority storage requests from the priority arbitration queue 412 are placed into the output queue 414, in front of the normal priority storage requests so that the high priority storage requests are output sooner to the storage target 314.

The top or output terminal of the port output queue 414 is coupled to wires or cables 313 so that the normal priority and/or high priority storage requests are sent over the local storage network to the various storage targets in the local storage network, such as the storage target 314.

Figure 4B:
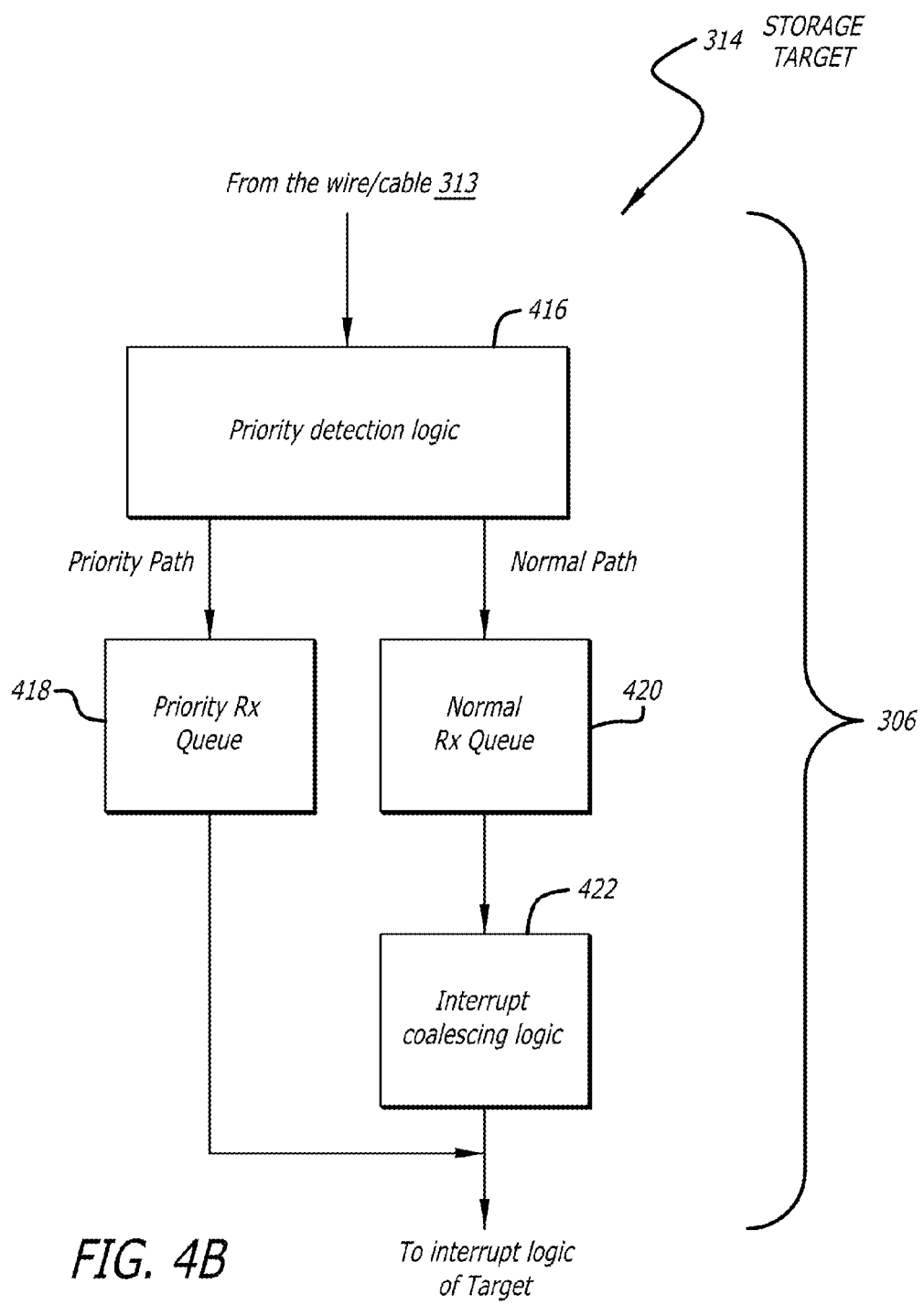
FIG. 4B illustrates a functional block diagram of the reception of storage requests by the storage target from the wire/cable of the storage area network.

Referring now to FIG. 4B, a functional block diagram of the target receive module 306 of FIG. 3 is now described. The target receive module 306 is within the adapter integrated circuit that is mounted on the Fibre Channel card. The Fibre Channel card is in turn plugged into the storage target 314 of FIG. 4B. Thus, the target receive module 306 depicted in FIG. 4B is within the storage target 314 that receives normal priority and high priority storage requests for the LUNs of its storage array.

The target receive module 306 includes priority detection logic 416, a priority receive queue 418, a normal receive queue 420, and interrupt coalescing logic 422 coupled together as shown. The priority detection logic 416 receives the normal priority and high priority storage requests for the given storage target from the wire or cable 313 of the local storage network. For each storage request that is received, the priority detection logic 416 determines whether or not it is a normal priority storage request or a high priority storage request. The priority detection logic 416 may determine this in various ways given that it knows what type of LUNs are available within the given storage target.

One method of determining that a storage request is a high priority storage request or a normal priority storage request is to inspect the LUN number that is associated with the storage request. For example, if the storage request is for LUN 1 of the tiered storage array 114' in FIG. 2D, the priority detection logic 416 knows this is directed to flash memory devices FM1-FM4 and that it is a high priority storage request. If on the other hand, the storage request is for LUN X of the tiered storage array 114', the priority detection logic 416 knows this is directed to a hard disk drive HDD and that it is a normal priority storage request.

Another method of determining that a storage request is a high priority storage request or a normal priority storage request is to parse and read the priority indicator associated with storage request that is used to prioritize the storage requests. For example, the bits or bytes of the Fibre Channel frame 600A in FIG. 6A are parsed to read the priority indicator 630. If the bits or bytes of the priority indicator are set to indicate high priority, the storage request is determined to be a high priority storage request. If the bits or bytes of the priority indicator are set to indicate normal or low priority, the storage request is determined to be a normal priority storage request.

After the priority detection logic 416 determines that a storage requests is either a normal priority storage request or a high priority storage request, the storage request may take two different paths, a normal priority path or a high priority path, within the target receive module 306. A high priority storage request is sent to the priority receive queue 418 for storage awaiting execution in order. A normal priority storage request is sent to the normal receive queue 420 for storage awaiting execution in order. The priority receive queue 418 and the normal receive queue 420 act as first in first out buffers (FIFO).

To obtain service of a storage request, an interrupt is generated for interrupt logic of the storage target 314 to alert it that a storage request is pending. The interrupt logic of the storage target 314 processes the interrupts in order and provides the requested storage service for the given LUN of a known storage capacity within its storage array.

Accordingly, the next normal priority storage request output from the normal receive queue 420 is typically coupled to the interrupt coalescing logic 422. The interrupt coalescing logic 422 postpones generation of an interrupt signal until several normal priority storage requests are available for the storage target 314. With several normal priority storage requests pending, the receive software driver 352R can more efficiently handle the storage requests. However, coalescing several normal priority storage requests together may increase the latency of the service to such normal priority storage requests. This extra latency may be small compared to the latency of the storage media that is to be accessed at the given LUN by the normal priority storage requests.

Because a lower latency is important for LUNs associated with flash memory devices, the interrupt coalescing logic 422 is often not used for high priority storage requests. The high priority storage requests bypass the interrupt coalescing logic 422 and immediately generate an interrupt signal to alert the storage target that service of the high priority storage request is requested as soon as possible. In this manner, high priority storage requests from the priority receive queue 418 are serviced with a higher priority than the normal priority storage requests from the normal receive queue 420.

After the storage service of a storage request is completed, an acknowledgement or response is sent from the storage target 314 to the storage initiator 312 to indicate that the requested storage service is complete. The acknowledgement or response may further indicate where data may be available for reading by the storage initiator, if a read storage request was being serviced by the storage target. Furthermore, the acknowledgement or response indicates that it is either a high priority acknowledgement or a normal priority acknowledgment (priority response or normal response) for service of a high priority storage request or a normal priority storage request, respectively. In this manner, the priority acknowledgement associated with a high priority storage request is treated with high priority as it traverses the network back to the storage initiator from the storage target. Accordingly, after the storage target is ready to respond to a storage request (e.g., with read data for a read storage request), similar logic and queues may be provided in the target transmit module 308 of the adapter integrated circuit in the storage target 314 and the initiator receive module 304 of the adapter integrated circuit in the storage initiator 312, to avoid head of line blocking of a high priority acknowledgment or a high priority response.

Figure 5A:
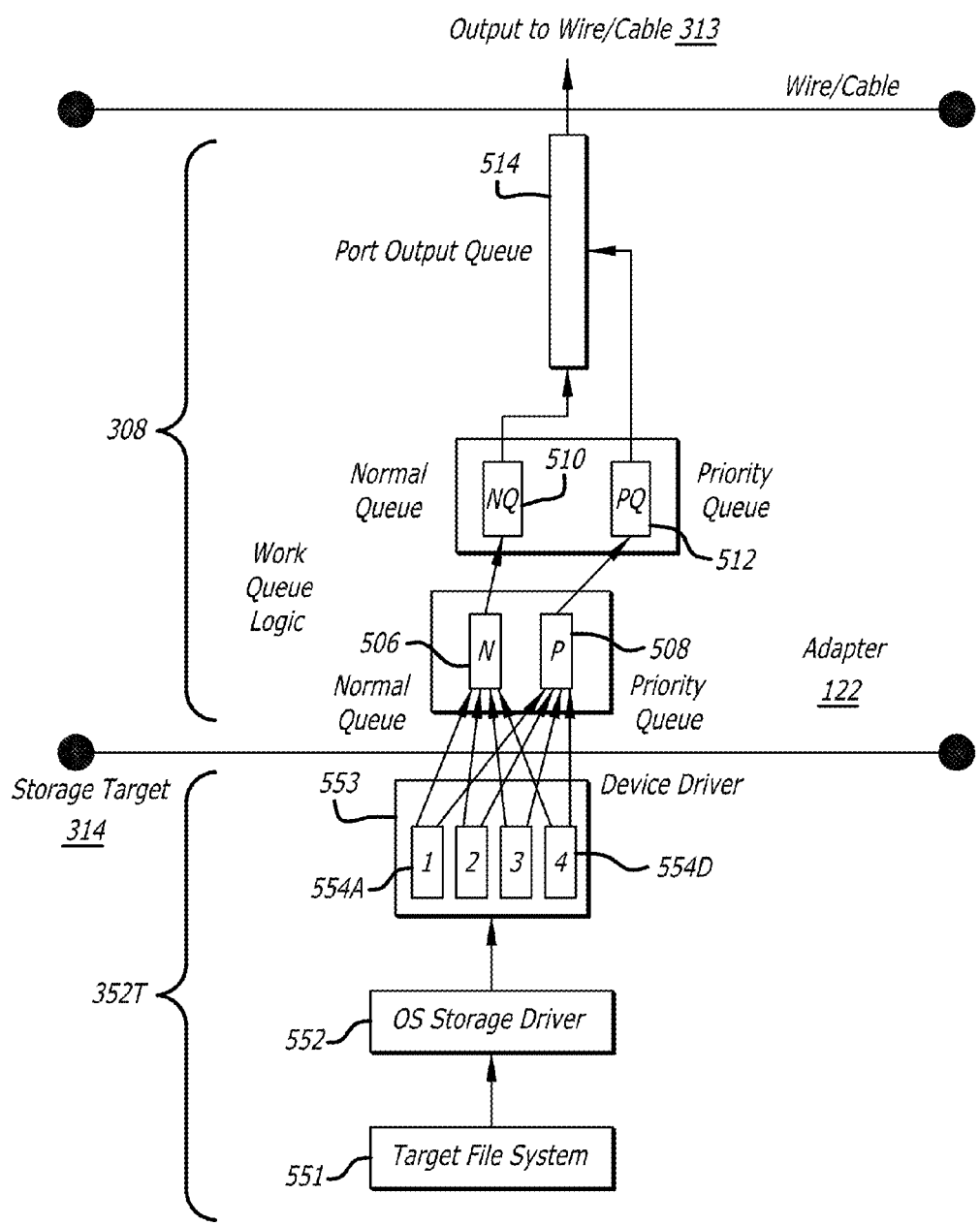
FIG. 5A illustrates a functional block diagram of the transmission of acknowledgments by the storage target onto the wire/cable of the storage area network.

Referring now to FIG. 5A, a functional block diagram of a portion of the storage target 314, including a target transmit module 308 and a transmit software driver 352T, is illustrated. The transmit software driver 352T includes the target file system 551, the operating system storage driver 552, and the device driver 553.

The device driver 553 forms one or more LUN queues 554A-554D for the one or more LUNs that may be assigned to storage capacity in the storage array. Each LUN has its own queue to hold an order of a plurality of I/O storage requests. The device driver 553 has knowledge of the one or more LUNs and the type of storage media to which they are assigned and thus its priority. For example, a LUN that is assigned to a flashed based storage device, e.g., LUN 1 in the tiered array 114, has higher priority I/O storage requests.

The device driver 553 executed by a processor in the storage target further sets the priority indicator (e.g., prioritization bits or byte) or not of each storage request as they are stored into the one or more LUN queues 554A-554D. Each of the one or more LUN queues 554A-554D may store one or more normal priority storage requests and one or more higher priority storage requests. To properly handle each, the one or more normal priority storage requests and the one or more higher priority storage requests are sorted out from the LUN queues 554A-554D by binning them into a normal work queue 506 and a priority work queue 508 that may be formed by the device driver in the transmit module 308 of the adapter integrated circuit. The I/O high priority storage requests are directed from the LUN queues 554A-554D into the priority work queue 508. The I/O normal priority storage requests are directed from the LUN queues 554A-554D into the normal work queue 506.

As there is only one function performed by the storage target, there are not a plurality of functions generating acknowledgements or responses to storage requests. Accordingly, the transmit module 308 in the storage target 314 is simplified from that of the transmit module 302 in the initiator 312. Arbitrating amongst a plurality of functions is not necessary. Accordingly, a normal function arbitration queue 510 and a priority function arbitration queue 512 may be a part of or extensions of the normal work queue 506 and the priority work queue 508, respectively, in the work queue logic 521 of the transmit module 308.

The normal work queue 506 stores normal priority acknowledgements in a queue for transmission and the priority work queue 508 stores high priority acknowledgements in a queue for transmission. With a simplified circuit, the normal work queue 506 and the priority work queue 508 are in direct communication with the port output queue 514 to transmit the high priority acknowledgements and the normal priority acknowledgements.

Between the normal queue 506,510 and the priority queue 508,512, a decision is made as to which acknowledgements from which queue are going to be transmitted out of the storage target 314 onto the local storage network to the storage initiator. The port output queue 514 is provided, similar to the output queue 414 discussed herein, to prepare the normal priority and high priority storage requests in an order therein so that they are ready to be transmitted out through the output port and onto the wires or cables 313 of the storage network.

The port output queue 514 may be a large queue that receives acknowledgements with an order of the priority acknowledgments that can be varied. In an alternate embodiment, the port output queue 515 is a multiplexing variable length queue to provide some elasticity to receive priority acknowledgements near the front of the queue and to receive normal acknowledgements at the end of the queue. FIGS. 8A-8C, described further herein, illustrate the functionality of such a port output queue. In any case, the port output queue 514 is provided such that high priority acknowledgements from the priority queue 508,512 are placed near the front of the queue of normal priority and high priority acknowledgements so that they are transmitted out onto the wire or cables of the local storage network as soon as possible. With the normal priority and high priority acknowledgements in an order within the final output queue 514, they are ready to be transmitted out through the output port and onto the wires or cables 313 of the storage network.

Each of one or more normal priority acknowledgements from the normal queue 506,510 are inserted in order into the bottom of the output queue 514. The normal priority acknowledgements are eventually shifted out from the top of the output queue 514. Each of the one or more high priority acknowledgements from the priority queue 508,512 are placed into the output queue 514, in front of the normal priority acknowledgements so that the high priority acknowledgements are output sooner to the initiator 312.

The top or output terminal of the port output queue 514 is coupled to wires or cables 313 so that the normal priority and/or high priority acknowledgements can be sent over the local storage network to the various storage initiators in the local storage network, such as the storage initiator 312, to indicate their execution. The storage initiator 312 includes an initiator receiver circuit 304 to receive and process the normal priority and/or high priority acknowledgements received off of the wires or cables 313 from the storage targets in the local storage network that process its storage requests.

Figure 5B:
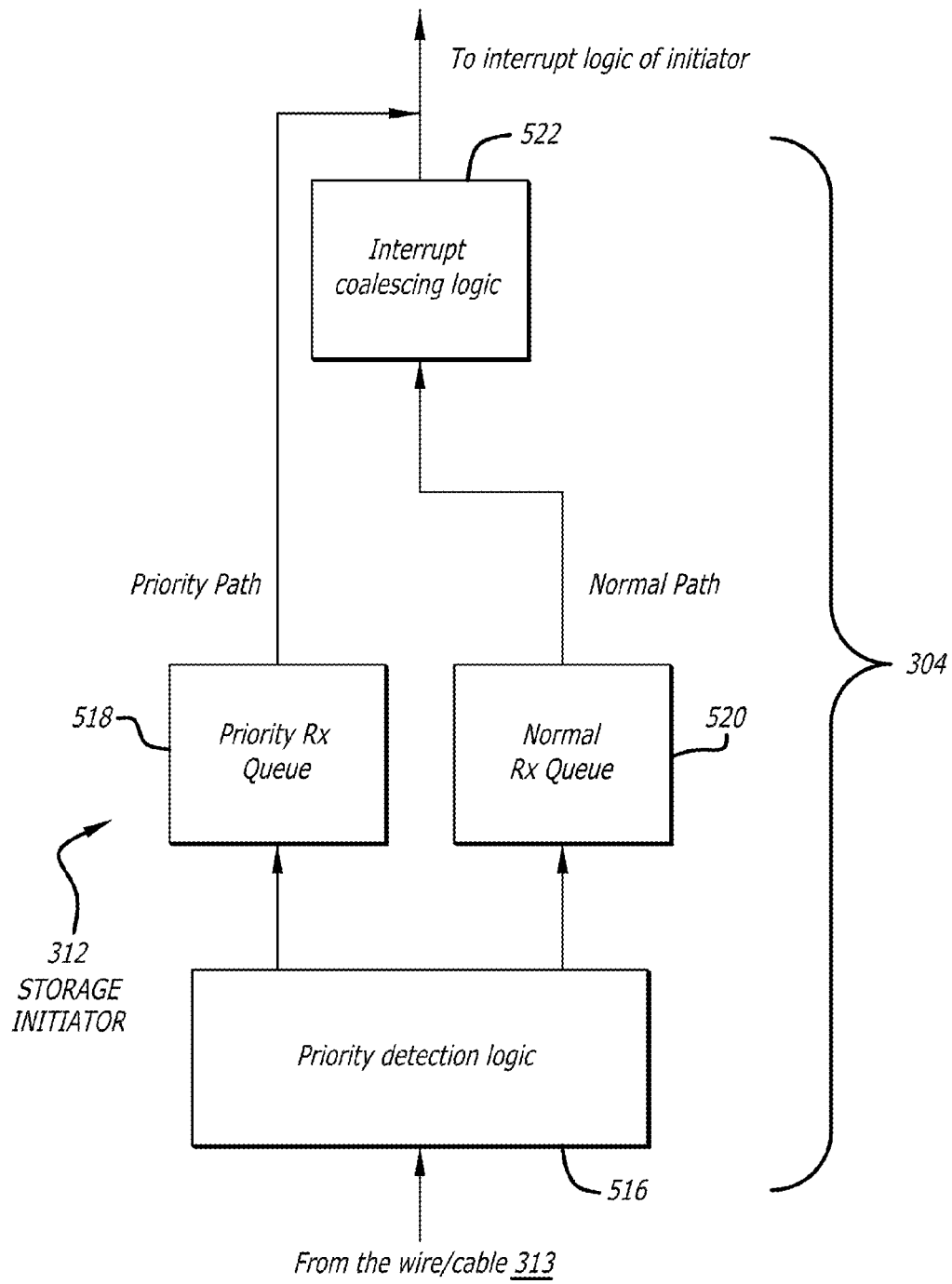
FIG. 5B illustrates a functional block diagram of the reception of acknowledgements by the storage initiator from the wire or cable of the storage area network.

Referring now to FIG. 5B, a functional block diagram of the initiator receiver module 304 is shown. The initiator receiver module 304 of FIG. 5B is very similar to the target receiver module 306 shown in FIG. 4B except for the signals that are processed. The initiator receiver module 304 processes received acknowledgments or responses while the target receiver module 306 processes storage requests.

The initiator receiver module 304 includes priority detection logic 516, a priority receive queue 518, a normal receive queue 520, and interrupt coalescing logic 522 coupled together as shown. The priority detection logic 516 receives the normal priority and high priority acknowledgments from various storage targets in the local storage network over the wire or cable 313. For each acknowledgment that is received, the priority detection logic 516 determines whether or not it is a normal priority acknowledgment or a high priority acknowledgment. The priority detection logic 516 may determine this in various ways if it knows what type of LUNs are available within the given storage target from which the acknowledgment was received.

One method of determining whether an acknowledgment is a high priority acknowledgment or a normal priority acknowledgment is to inspect the LUN number that is associated with the acknowledgment. For example, if the acknowledgment is for LUN 1 of the tiered storage array 114' in FIG. 2D, the priority detection logic 516 knows the original storage request was directed to flash memory devices FM1-FM4 and that it is a high priority acknowledgment. If on the other hand, the acknowledgment is for LUN X of the tiered storage array 114', the priority detection logic 516 knows this is directed to a hard disk drive HDD and that it is a normal priority acknowledgment.

Another method of determining that an acknowledgment is a high priority acknowledgment or a normal priority acknowledgment is to parse and read the priority indicator associated with the acknowledgment. For example, the bits or bytes of the Fibre Channel frame 600A in FIG. 6A are parsed to read the priority indicator 630. If the bits or bytes of the priority indicator are set to indicate high priority, the acknowledgment is determined to be a high priority acknowledgment. If the bits or bytes of the priority indicator are set to indicate normal or low priority, the acknowledgment is determined to be a normal priority acknowledgment.

After the priority detection logic 516 determines that an acknowledgment is either a normal priority acknowledgment or a high priority acknowledgment, the acknowledgment may take two different paths, a normal path or a priority path, within the initiator receive module 304. A high priority acknowledgment is sent to the priority receive queue 518 for storage requests awaiting execution in order. A normal priority acknowledgment is sent to the normal priority receive queue 520 for storage awaiting execution in order. The priority receive queue 518 and the normal receive queue 520 act as first in first out buffers (FIFO).

To obtain service of an acknowledgment, an interrupt is generated for interrupt logic of the storage initiator 312 to alert it that an acknowledgment is pending. The interrupt logic of the storage initiator 312 processes the interrupts in order and processes the acknowledgment. This may be as simple as informing a given function that its data was stored. Alternatively, data may have been directly memory accessed into memory and is waiting for a given function to be granted access with its starting memory location.

Accordingly, the next acknowledgment output from the normal priority receive queue 520 is typically coupled to the interrupt coalescing logic 522. The interrupt coalescing logic 522 postpones generation of an interrupt signal until several normal priority acknowledgments are available for the storage initiator 312. With several normal priority acknowledgments pending, the receive software driver 351R (e.g., FIG. 3) can more efficiently handle the acknowledgments. However, coalescing several normal priority acknowledgments together may increase the latency of the service to such normal priority acknowledgments.

Because a lower latency is important for LUNs associated with flash memory devices, the interrupt coalescing logic 522 is not used for higher priority acknowledgments. The higher priority acknowledgments bypass the interrupt coalescing logic 522 and immediately generate an interrupt signal to alert the storage initiator that service of the higher priority acknowledgment is requested as soon as possible. In this manner, higher priority acknowledgments from the priority receive queue 518 are serviced with a higher priority than the normal priority acknowledgments from the normal priority receive queue 520.

Exemplary Work, Arbitration, and Output Queues

The work queues and output queues in the modules can be implemented in different ways. Exemplary implementations of the work queues and output queues are now shown and described.

Figure 7A:
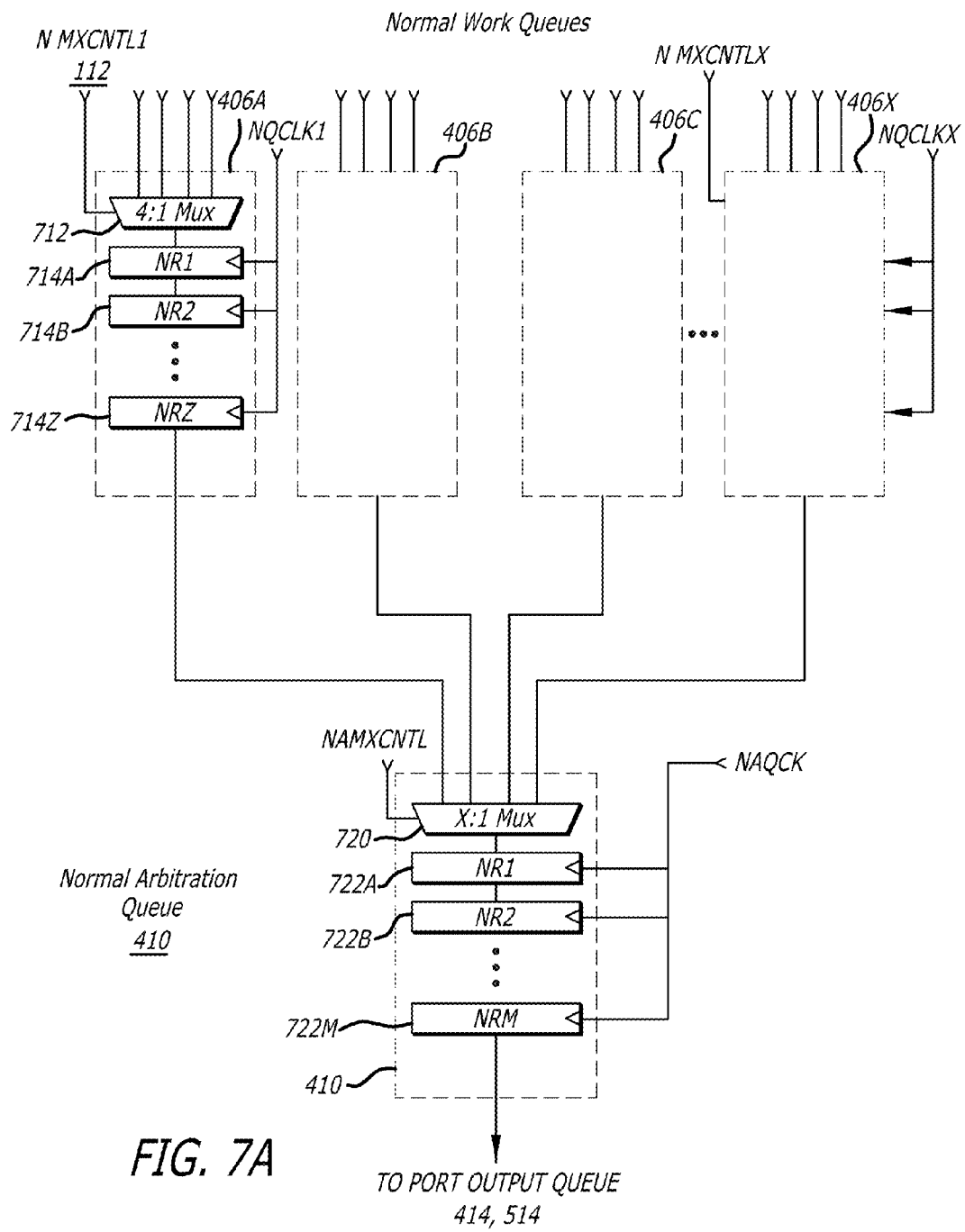
FIG. 7A illustrates a functional block diagram of an example implementation of normal queues for processing normal priority storage requests.

Referring now to FIG. 7A, a functional block diagram illustrates exemplary normal work queues 406A-406X coupled to an exemplary normal function arbitration queue 410 within the transmit module 302 for processing normal priority storage requests.

Each normal work queue 406A-406X (collectively referred to as 406) includes a four to one multiplexer 712 (assuming four logical units (LUNs) per function) and a plurality of clocked registers NR1-NRX, 714A-714X coupled in series together to form a shift register and receive a plurality of normal priority storage requests in a first in first out mode (FIFO). The first clocked register 714A has its input coupled to the output of the multiplexer 712. The output of the last clocked register 714X is coupled to the normal function arbitration queue 410. A normal queue clock NQCLK (NQCLKA-NQCLKX one clock for each normal work queue) is used to periodically clock the plurality of registers 714A-714Z and shift in a normal priority storage request while shifting out the last normal priority storage request from register 714Z. A first set of multiplexer control signals MXCNTL1 are used to control the four to one multiplexer 712 to selectively receive normal priority storage requests from the outputs of each of the four LUN queues 454A-454D to which the inputs of the multiplexer 712 are coupled.

The normal arbitration queue 410 includes an X to one multiplexer (X:1 Mux) 720 with X inputs to receive an output from each of the X normal work queues 406A-406X. A second set of multiplexer control signals MXCNTL2 are used to control the X to one multiplexer (X:1 Mux) 720 to selectively receive normal priority storage requests from the outputs of each of the X normal work queues. Arbitration logic can generate the multiplexer control signal MXCNTL2 in accordance with how storage requests from each of the functions is to be arbitrated in order. In one embodiment, a round robin arbitration is performed such that the multiplexer 720 can receive a storage request from one normal work queue to the next and back around again from work queue 406X to work queue 406A repeatedly. The normal arbitration queue 410 further includes a plurality of M clocked registers NR1-NRM 722A-722M coupled in series together as shown. The plurality of M clocked registers 722A-722M are each clocked by an arbitration queue clock AQCK. The first clock register 722A has its input coupled to the output of the multiplexer 720. The output of the last clocked register 722M is coupled to the normal priority storage request input of the port output queue 414, 514.

The storage requests generated by the device driver 453 (see e.g. FIG. 4A) are stored in the 4 per logical unit LUN queues for each function. The multiplexer 712 in each of the normal work queues 406A-406X selectively groups, consolidates or funnels the normal priority storage request from each LUN queue of each function into a clocked shift register formed by the registers 714A-714Z.

The normal priority storage requests in each of the normal work queues 406A-406X are further selectively grouped, consolidated or funneled down into a shift register by the multiplexer 720 in a function arbitrated order.

The normal queue clocks NQCLKA-NQCLKX of the normal work queues 406A-406X, the arbitration queue clock AQCK, and the sets of multiplexor control signals are selectively controlled to provide an ordered output of normal priority storage requests from the output of the last clocked register 722M in the normal arbitration queue 410.

Figure 7B:
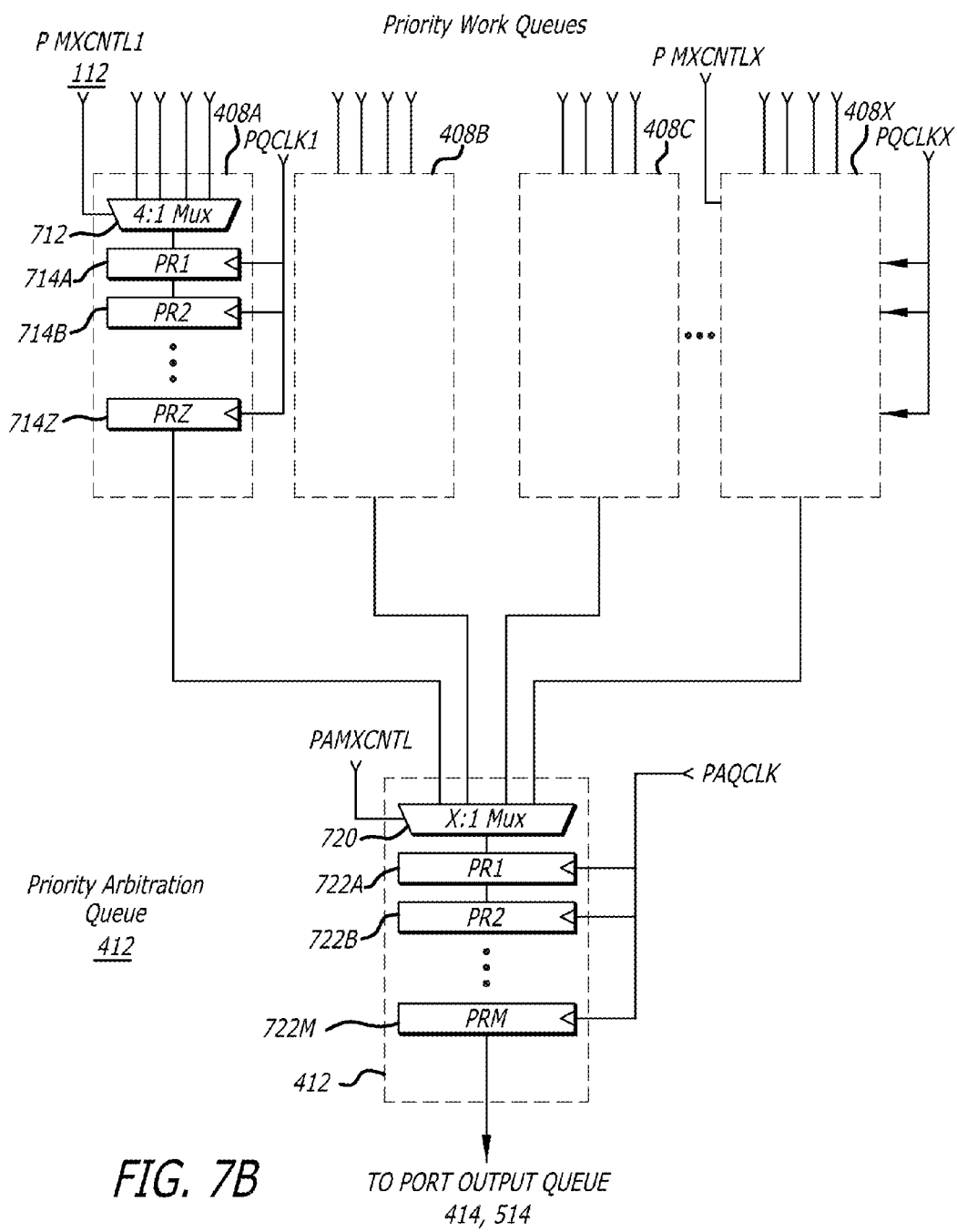
FIG. 7B illustrates a functional block diagram of an example implementation of priority queues for processing high priority storage requests.

Referring now to FIG. 7B, a functional block diagram illustrates exemplary priority work queues 408A-408X coupled to an exemplary priority arbitration queue 412 within the transmit module 302 (e.g., ITX of FIG. 3) for processing higher priority storage requests. The exemplary priority work queues 408A-408X coupled to the exemplary priority arbitration queue 412 within the transmit module 302 are constructed and function similar to the exemplary normal work queues 406A-406X coupled to an exemplary normal arbitration queue 410 described previously. There is a difference in the connection to priority work queues 408A-408X and the output of the priority arbitration queue 412 to the priority storage request input of the multiplexing variable length shift register 703 shown in FIG. 7C. For example, the output of the last clocked register 722M in the higher priority arbitration queue 412 is coupled to the higher priority storage request input of the port output queue 414,514. Furthermore, the control signals and clock signals to the multiplexers and registers may be generated differently due to the higher priority handling of the higher priority storage requests. The discussion regarding the exemplary normal work queues 406A-406X and the exemplary normal arbitration queue 410 applies to the priority work queues 408A-408X and the priority arbitration queue 412 and is thus incorporated herein by reference for reasons of brevity.

Figure 7C:
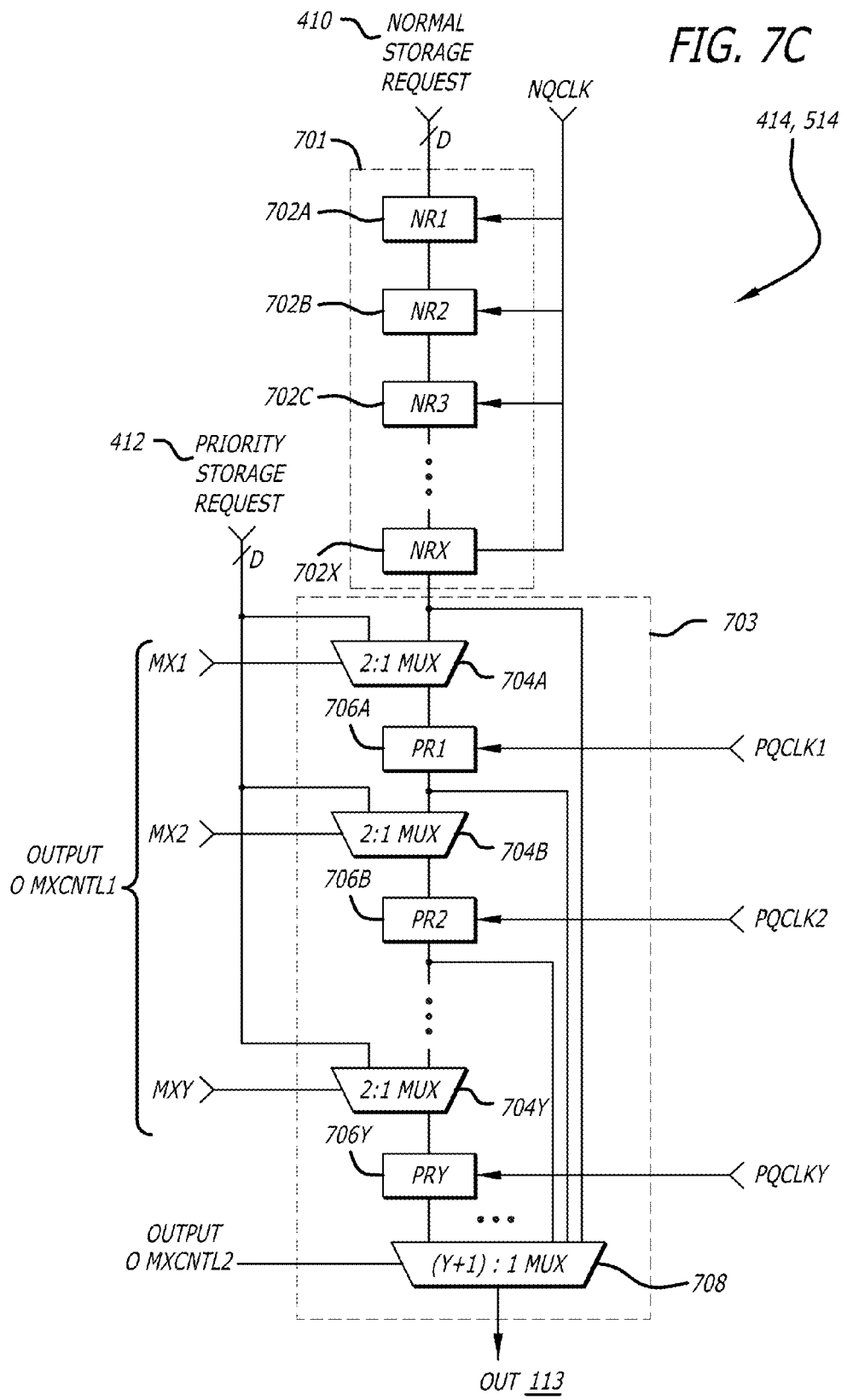
FIG. 7C illustrates a functional block diagram of an example implementation of a port output queue.

Referring now to FIG. 7C, a functional block diagram illustrates an exemplary port output queue 414, 514 within the transmit module 302, 308. FIG. 7C illustrates a constant length shift register 701 coupled to a multiplexing variable length shift register 703. The combination of the two shift registers that forms overall a multiplexing variable length shift register with a minimal length of X registers and a maximum length of X+Y registers.

The constant length shift register 701 includes a plurality of X clocked registers NR1-NRX, 702A-702X coupled in series together to form a constant length shift register of X registers. The X clocked registers NR1-NRX, 702A-702X receive a plurality of normal priority storage requests in a first in first out mode. The first clocked register 702A has its input coupled to the output of the normal arbitration queue 410. The output of the last clocked register 702X is coupled to an input of a two to one multiplexer 704A in the multiplexing variable length shift register 703.

The multiplexing variable length shift register 703 includes a plurality of Y multiplexed-registers 704A/706A-704Y/706Y coupled in series together. Each of the multiplexers 704A-704Y is a two to one multiplexer (2:1 MUX) having one data input coupled to the high priority storage request input. The multiplexer 704A has a second data input coupled to the output of the last clocked register 702X in the constant length register 701. The other two-to-one multiplexers (2:1 MUX) 704B-704Y each have a second data input coupled the output of the prior clocked register (PR1-PRY) 706A-706X. The data output of each multiplexer 704A-704Y is coupled to the data input of each matched clocked register 706A-706Y. Each of the two-to-one multiplexers 704A-704Y has a control or select input coupled to a respective control signal MK1-MKY (collectively OMX-CNTL1) to select one of the two input signals at its output.

The multiplexing variable length shift register 703 further includes an (Y+1) to one multiplexer ((Y+1):1 MUX) 708 having an input coupled to the output of each of the plurality of Y multiplexed-registers 704A/706A-704Y/706Y and one additional input coupled to the output of the last register 702X in the constant length shift register 701. The (Y+1) to one multiplexer 708 has a plurality of control inputs to receive a plurality of control signals OMXCNTL2 so that one of the Y+1 inputs can be selected as its output signal. The storage request (or acknowledgement) output from the multiplexer 708 is driven out onto the wire or cable 313.

A normal queue clock NQCLK is used to periodically clock the plurality of registers 702A-702X to shift in a normal priority storage request into register 702A while shifting out the last normal priority storage request from register 702X. The mux control signals MK1-MKY are used to vary the length of the variable length shift register and to insert high priority storage requests in front of normal priority storage requests in the output queue. In conjunction with the mux control signals MK1-MKY, the priority queue clocks PQCLK1-PQCLKM, one for each respective register 706A-706Y, are used to independently clock one or more of the plurality of registers 706A-706Y to shift in a high priority storage request while shifting out a high priority storage request from one of the registers 706A-706Y. For example, to store a high priority storage request into register 706A, the mux control signal M1 selects the high priority storage request input and the register 706A is clocked by the priority clock signal PQCLK1. If a high priority storage request in register 706Y is to be shifted out, the mux control signals OMXCNTL2 into the multiplexer 708 are set to select the output from register 706Y as the output from the queue. If no high priority storage requests are in the queue, the mux control signals OMXCNTL2 into the multiplexer 708 are set to select the last normal priority storage request output from the register 702N.

Control logic (not shown) is used to generate the mux control signals and the clock signals to control the port output queue to shift in the normal priority storage requests from the normal arbitration queue 410 as well as shift in the high priority storage requests from the priority arbitration queue 412 in order ahead of the normal priority storage requests. Control logic is further used to generate the mux control signals and clocks to shift out high priority storage requests stored in the registers 706A-706Y ahead of the normal priority storage requests stored in the registers 702A-702X. Control logic is further used to synchronize the generation of the multiplexer control signals and the clock signals so that a balance is obtained between shifting out storage requests and shifting in storage requests so that there is no overflow of the port output queue. Control logic may be further responsive to the number of high priority storage requests, the number of normal priority storage requests, and a waiting time of each.

Referring now to FIGS. 8A-8C, block diagrams illustrate the functionality of the port output queue 414,514 that may be implemented by the multiplexing variable length shift register. The port output queue stores normal priority and high priority storage requests in order for processing.

In FIG. 8A, the variable length shift register 802A has normal priority storage requests NSR1-NSRN stored therein from front to back. The normal priority storage request NSRN is ready to be shifted out onto the wire or cables in the local storage network. No high priority storage requests are stored in the variable length shift register 802A.

In FIG. 8B, the variable length shift register 802B has a plurality of normal priority storage requests NSR1-NSRN and one high priority storage request PSR1 stored therein. The one high priority storage request PSR1 was inserted into the variable length shift register before the last normal priority storage request NSRN causing it to grow slightly. In this manner, the high priority storage requests can be processed before the normal priority storage request NSRN in the queue. The high priority storage request PSR1 disrupts the process flow of the normal priority storage requests NSRN-NSR1 until it has been completed.

In FIG. 8C, the variable length shift register 802C has the same plurality of normal priority storage requests of NSR1-

NSRN as before. However, the variable length shift register 802C also has a plurality of high priority storage requests PSR1-PSRM stored in front of the plurality of normal priority storage requests of NSR1-NSRN. The plurality of high priority storage requests PSR1-PSRM are shifted out of the variable length shift register 802C for processing before the plurality of normal priority storage requests of NSR1-NSRN. The variable length shift register 802C illustrates its growth in length to store the plurality of high priority storage requests PSR1-PRSM in front of the normal priority storage requests NSR1-NSRN. The normal priority storage requests are not processed until the high priority storage requests have all been shifted out.

The block diagram of the circuits for handling the acknowledgements in the transmit circuit 308 (e.g., TTX of FIG. 3) is simpler than that shown in FIGS. 7A-7C. A single normal work queue (e.g., normal work queue 406A illustrated in FIG. 7A) and a single priority work queue (e.g., priority work queue 408A illustrated in FIG. 7B) can be directly coupled to the variable length shift register (the port output queue shown in FIG. 7C.

Priority queuing allows priority to faster resources such as flash based storage arrays that provide flash based logical units of storage capacity. Flash based storage arrays do not have an average seek time that rotating media does (typically a number of milliseconds). Thus, flash based storage arrays have lower access latency. Accordingly, the priority queuing model segregates the traffic of storage requests by logical unit and storage type. Logical units with flash based or faster memory storage capacity enjoy end-to-end prioritization of their storage requests and acknowledgements. One of ordinary skill recognizes additional embodiments of priority queuing including, for instance, a spectrum of priorities in addition to high, normal and/or low priority storage requests and/or acknowledgements.

Message Passing

Another aspect of optimizing a storage area network includes message passing.—In-band message passing allows networked devices, including network drives with flash based cache, to coordinate and communicate using in band mechanisms over the storage area network. In this manner, latencies are avoided that might otherwise be induced when another network (and associated software stack) is used to send messages to networked storage devices in a storage area network.

The message passing feature provides for in-band communication over the storage area network between servers and networked storage devices that have a storage capacity. The messages are passed in-band because they are communicated over the same high speed communication channel that the associated data is communicated over. If the messages were instead to be passed over Ethernet cables through the Ethernet switch, a slower communication channel, the messages would be communicated out-of-band because the associated data is not communicated over the same communication channel.

Message passing and its execution is facilitated through the storage area network (SAN) adapter cards, such as the Fibre Channel host adapters 122,122' and the Fibre Channel controllers 124,124' (see e.g., FIGS. 1A through 4B), and the instructions in software/firmware executed by the processor therein. Thus, the message may be referred to herein as a storage area network (SAN) message. The message that is to be passed is often stored in a storage device in the storage area network adapter card before it is transmitted or executed by the processor. The SAN message may be of a variable size comprising a plurality of data fields including one or more major tasks and one or more sub-tasks associated with each of the one or more major tasks. The major tasks and subtasks may be encoded as a type-length-value (TLV) message including major task type, major task length, and major task value for each major task and sub-task type, sub-task length, and sub-task value for each sub-task associated with a major task.

The message passing feature provides for multiple messages to be encapsulated into a single frame, wherein the size of the frame of data is optimized for the wire transfer protocol. The message passing feature provides for the message to be transmitted from a first Fibre Channel controller for a first networked device to a second Fibre Channel controller for a second networked device over a Fibre Channel. Either or both of the first networked storage device and the second network storage device may each include flash memory, or comprise a flashed-based caching appliance.

Referring now to FIG. 9A, an exemplary storage area network (SAN) system 900 is shown. The storage area network (SAN) system 900 is a subset of a local area network (LAN). The Ethernet switch and Ethernet cables to which the storage area network (SAN) system 900 are coupled are not shown in FIG. 9A (see the switch and cables of FIG. 1A, for example) because the one or more SAN messages 910 passed between network devices are not communicated over Ethernet cables through an Ethernet switch with Ethernet protocols. Communication of messages from a first networked device up to the Ethernet switch and back down to a second networked device over Ethernet cables is slow and undesirable with low latency storage network devices. In accordance with an aspect of the embodiments, the messages 910 are passed in-band within the local storage area network using the storage area network communication protocol. Normally used for data, the messages 910 are passed in-band by the adapter cards over the storage area network cables coupling the servers to the storage network devices. In one embodiment for example, the storage area network cables are optical fiber cables and the storage area network communication protocol is a Fibre Channel communication protocol.

The storage area network (SAN) system 900 includes low latency storage devices such as local flash based cache within a server or a remote flash based cache provided by a networked storage device (e.g., flash appliances 908A and 908B) having a flashed based memory. The storage area network (SAN) system 900 may include a plurality of servers, such as a master server 112M and one or more slave servers 112S, each of which may include a local flash based cache (FBC) memory.

With the lower cost of flash memory capacity over DRAM memory, flash based cache memory can have a greater capacity than DRAM based cache memory for the same costs. Flash memory may also be included in the networked storage devices, such as the tiered arrays 904A-904B and the flash appliances 908A-908B. Either or both flash appliances 908A-908B may function as a remote centralized flash based cache memory (FBC) that are separate from the servers 112M-112S.

The server 112M is a master server because it controls and maintains the storage area network. The server 112M can be de-designated as the master server to a slave server and a different server (e.g., server 112S) can be assigned to be the master server within the storage area network.

The master server 112M generates a number of storage area network (SAN) messages 910 that are passed within the storage area network system 900 to provide additional functionality and optimization. For example, passing one or more SAN messages 910, in-band within the storage area network may be used to provide additional functionality and optimization such as protected writes, cache prefills, improved virtual machine migration, read auto copy (caching auto-copy), and/or cache invalidate messages for synchronizing flash based cache or other low latency type of storage devices.

The storage area network one or more SAN messages 910 generally utilize a task-length-value (TLV) structure to consolidate one or more major-tasks and associated sub-tasks encapsulated together into a single message. Multiple messages may be encapsulated together so that a combined group of messages are communicated together using a single transmission. A message 910 may be broadcast/multicast out to all networked storage devices and slave servers from the master server. This can be advantageous in synchronizing the data in a plurality of flash based caches to have the same data stored therein. The master server may control a cache table and a SAN routing table to ensure that all cache controllers (slaves) that process storage requests for cache in each networked storage device in the storage area network are synchronized with the master server. The cache table and the SAN routing table in each may be synchronized the master server as well as the data in the cache.

Figure 9B:
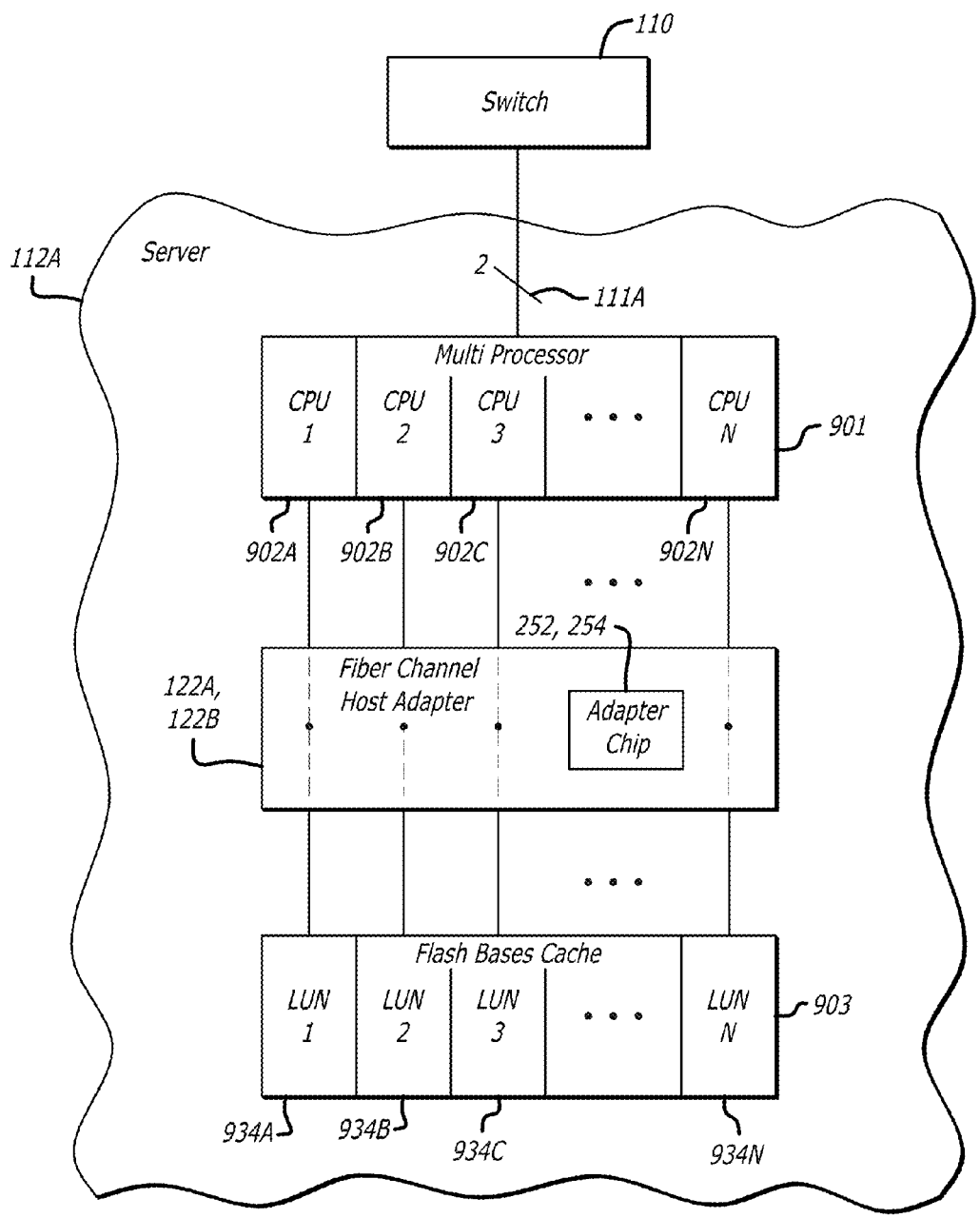
FIG. 9B illustrates a functional block diagram of a server with Fibre Channel adapter card with adapter integrated circuit employing aspects of the embodiments for communication over Fibre Channel to the normal storage requests based on the LUN number.

Referring now to FIG. 9B, a functional block diagram of portions of a server 112A (a storage initiator) are shown. The server 112A is connected to a switch 110 via Ethernet cables 111A. The switch 110 allows data to be communicated between one or more local servers and one or more remote clients, such as shown in FIG. 1A. The server 112A includes a multiprocessor 901, a Fibre Channel host adapter (FCHA) 122A, 122B, and a flash based cache 903 coupled together as shown. The multiprocessor 901 is coupled to the Fibre Channel host adapter 122A-122B and to the flash-based cache storage device 903, by a backplane structure within the server.

The multiprocessor 901 includes a plurality of central processor unit cores CPU1 to/through CPUN (902A-902N). The multiprocessor 901 can communicates data with the one or more network storage devices, servers and flash appliances within the storage area network for the execution of the one or more SAN messages 910 and instructions/tasks therein. The one or more SAN messages 910 and its instructions/tasks therein can be processed by any of the one or more CPU cores 902A-902N within the multiprocessor 901. The one or more SAN messages 910 may generally provide a to-do list for a network storage device having flash memory based storage capacity or other type of low latency storage.

The total available memory capacity in the flash-based cache storage device 903 can be divided into a plurality of logical units, LUN1 to LUNN (904A904N). The logical units 904A-904N of the cache storage device 903 may be allocated to CPU cores 902A-902N for the management of the memory based on specific volume allocations to the CPU cores 902A-902N.

The Fibre Channel host adapter 122A, 122B includes an adapter chip 252,254 to couple to and between the CPU cores 902A-902N of the multiprocessor 901 and LUNs 934A-934N of the flash-based cache storage device 903. The adapter chip 252,254 includes software and hardware to provide cache management of the flash-based cache storage device 903. One or more SAN messages 910 can be passed from one CPU core 902A-902N to another through the Fibre Channel host adapter 122A,122B and the adapter chip 252,254. One CPU core, such as CPU core 902A, may be designated as the master server to generate the one or more SAN messages 910. One or more of the other CPU cores 902B-902N may be designated as a slave server to execute the one or more SAN messages 910 and the sub-tasks/instructions therein.

Figure 9C:
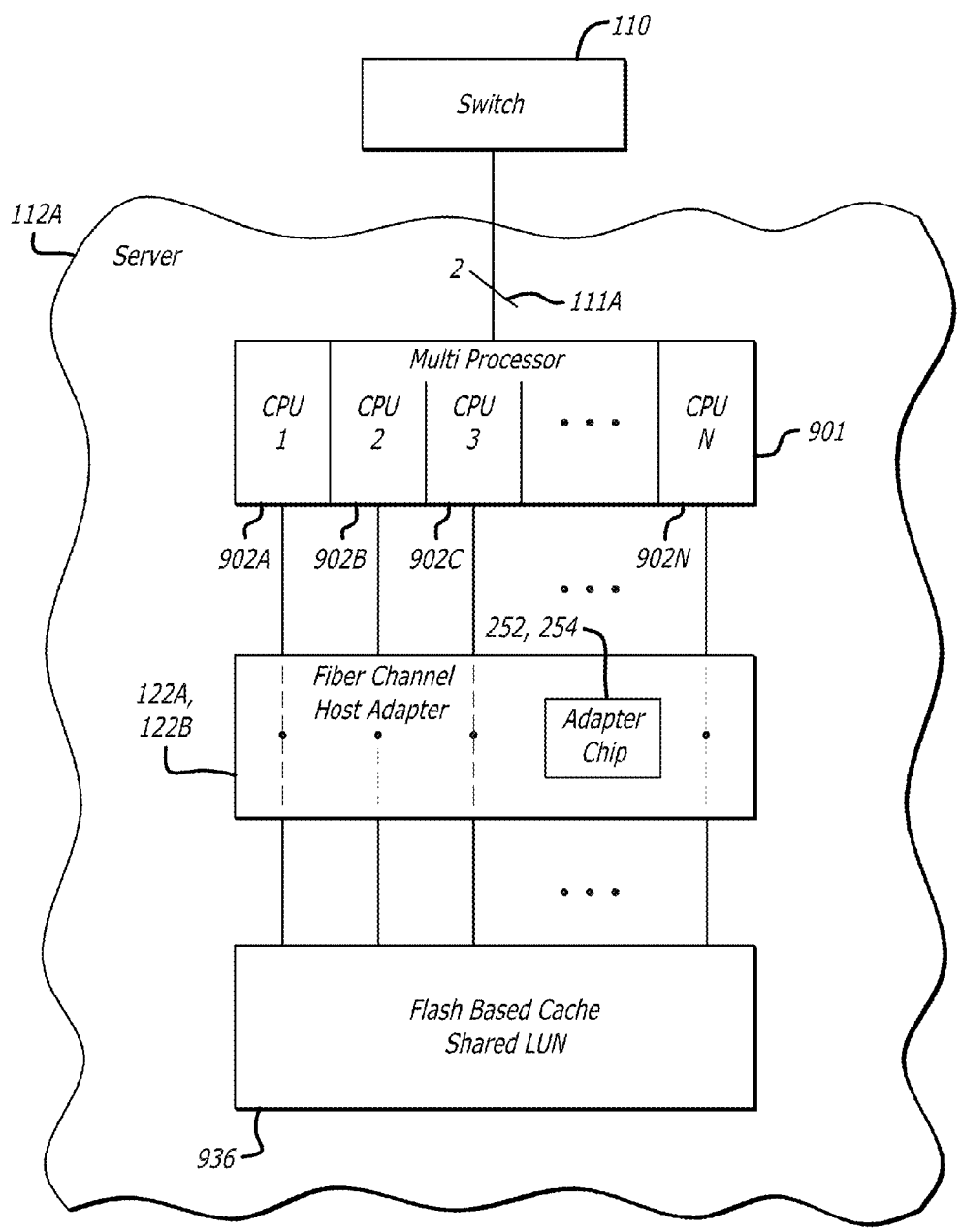
FIG. 9C illustrates a functional block diagram of a server with a Fibre Channel adapter card in communication with a flashed based cache memory having a shared LUN.

Referring now to FIG. 9C, a functional block diagram of a server 112A (a storage initiator) is shown. The server 112A includes a multiprocessor 901, a host adapter 122A,122B, and a shared cache memory 936. The shared cache memory 936 has a single shared LUN that can be referenced by the processors 902A-902N of the multiprocessor 901.

The shared cache memory 936 is a flash memory based cache memory with low latency in accordance with one aspect of the embodiments. The shared cache memory 936 may be duplicated or mirrored in one or more servers, such as a slave server. An update to the master shared cache memory 936 in a master server is then synchronized with slave cache memory in the local SAN by passing the one or more SAN messages 910 over the cables and through the host adapters in the local SAN.

The host adapter 122A,122B is a Fibre Channel host adapter in accordance with some embodiments. The host adapter 122A-122B includes an adapter chip 252,254. The adapter chip 252,254 is further described herein.

The multiprocessor 901 includes a plurality of CPU cores 902A-902N in some implementations. One or more of the CPU cores may be designated as a virtual server within the server 112A and provide a designated functionality such as email, fax, or phone service, for example. One of the CPU cores 902A-902N, such as core 902A, may be designated as the master server. The processor core designated as the master server may provide management and control of the shared flash based cache 936 for the local SAN, for example. A CPU core designated as the master server may be used to generate the one or more SAN messages 910 that are passed over the local SAN, for example.

Referring now to FIGS. 10A-10D, a plurality of different types of storage area network (SAN) messages 910A-910D are shown that may be passed over a storage area network.

Figure 10A:
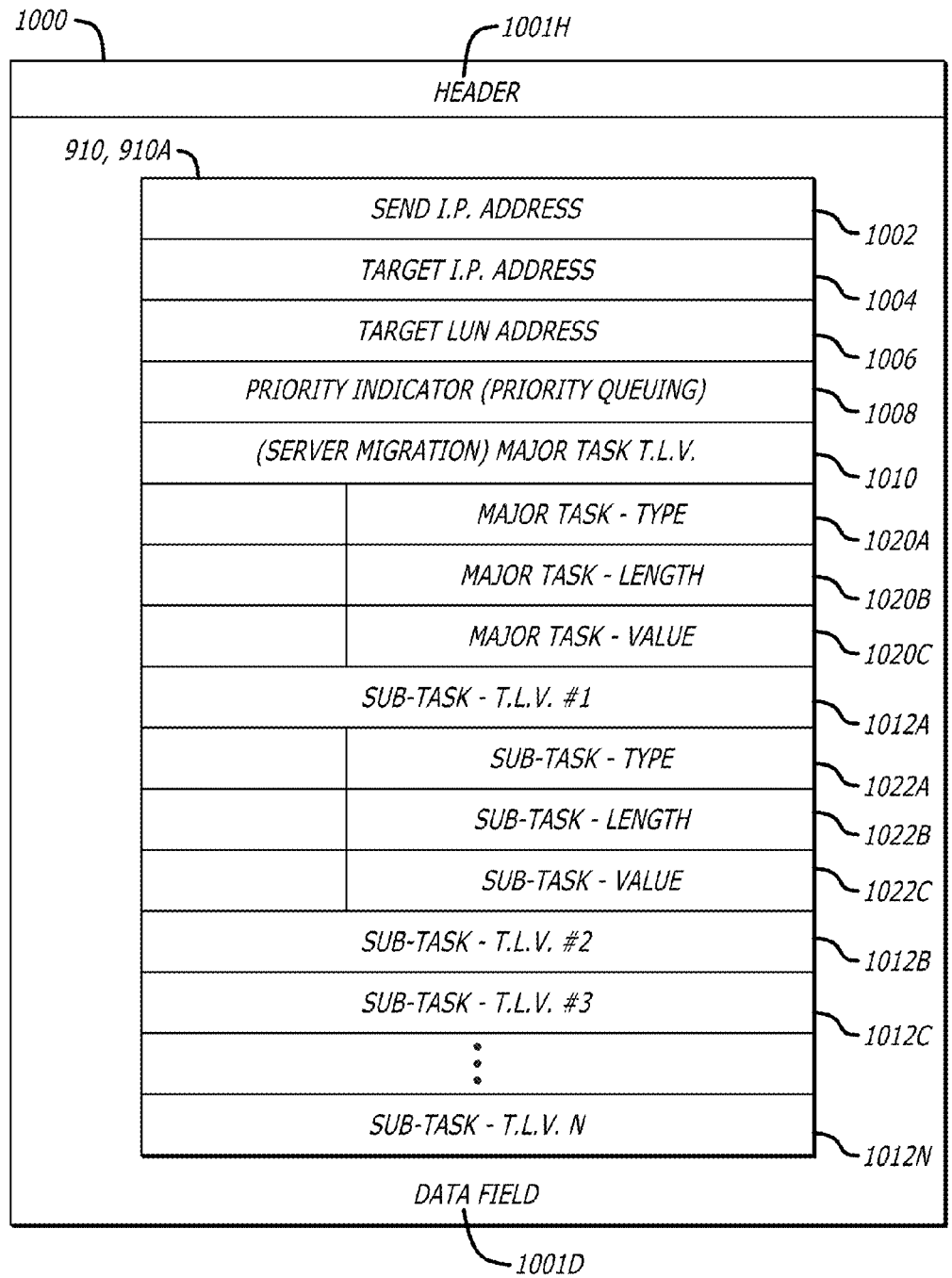
FIGS. 10A-10D are diagrams of exemplary TLV messages that can be passed in-band from one networked device to another.

In FIG. 10A, a diagram of an exemplary storage area network (SAN) message 910A encapsulated within the frame 1000 is shown. The SAN message 910A includes a major task 1010 and associated subtasks for performing server migration operation so that a server may be migrated from one to another, for example.

Figure 10B:
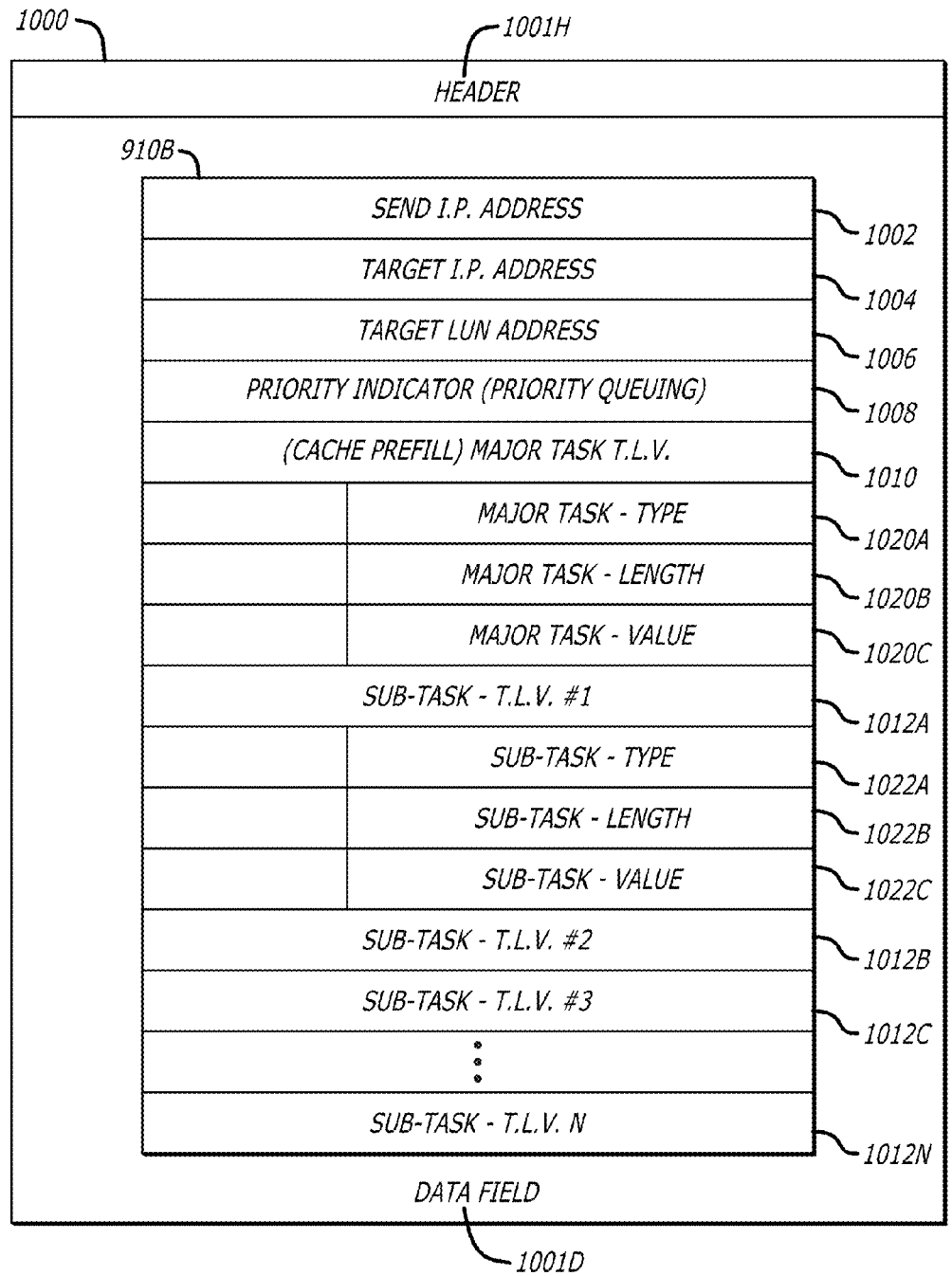

In FIG. 10B, a diagram of an exemplary storage area network (SAN) message 910B encapsulated within the frame 1000 is shown. The SAN message 910B includes a major task 1010 and associated subtasks for performing a cache prefill operation so that a cache memory may be migrated from one device to another, for example.

Figure 10C:
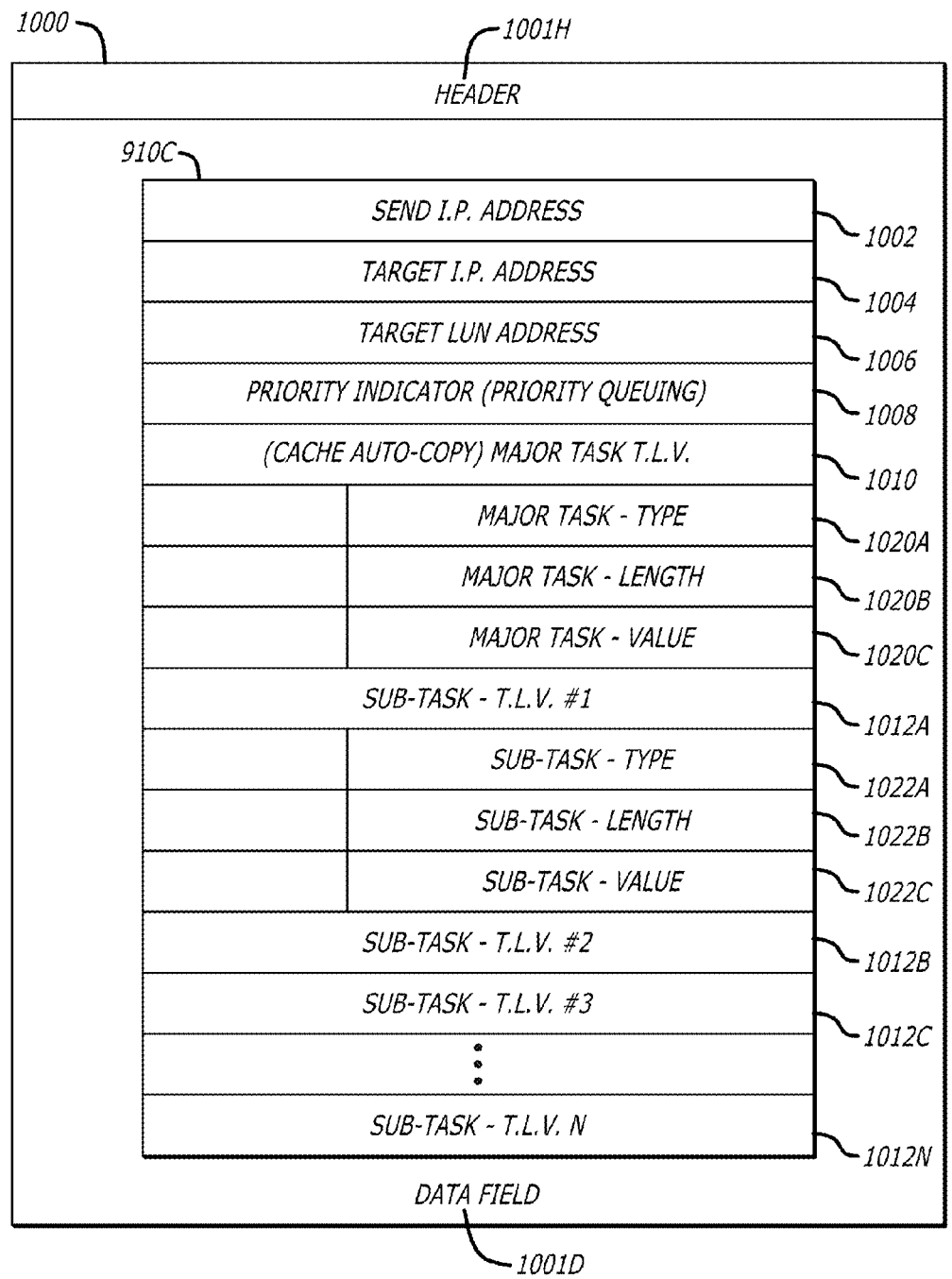

In FIG. 10C, a diagram of an exemplary storage area network (SAN) message 910C encapsulated within the frame 1000 is shown. The SAN message 910C includes a major task 1010 and associated subtasks for performing a cache auto copy operation (also referred to as a read auto copy) so that a plurality of cache memory devices may be synchronized together, for example.

Figure 10D:
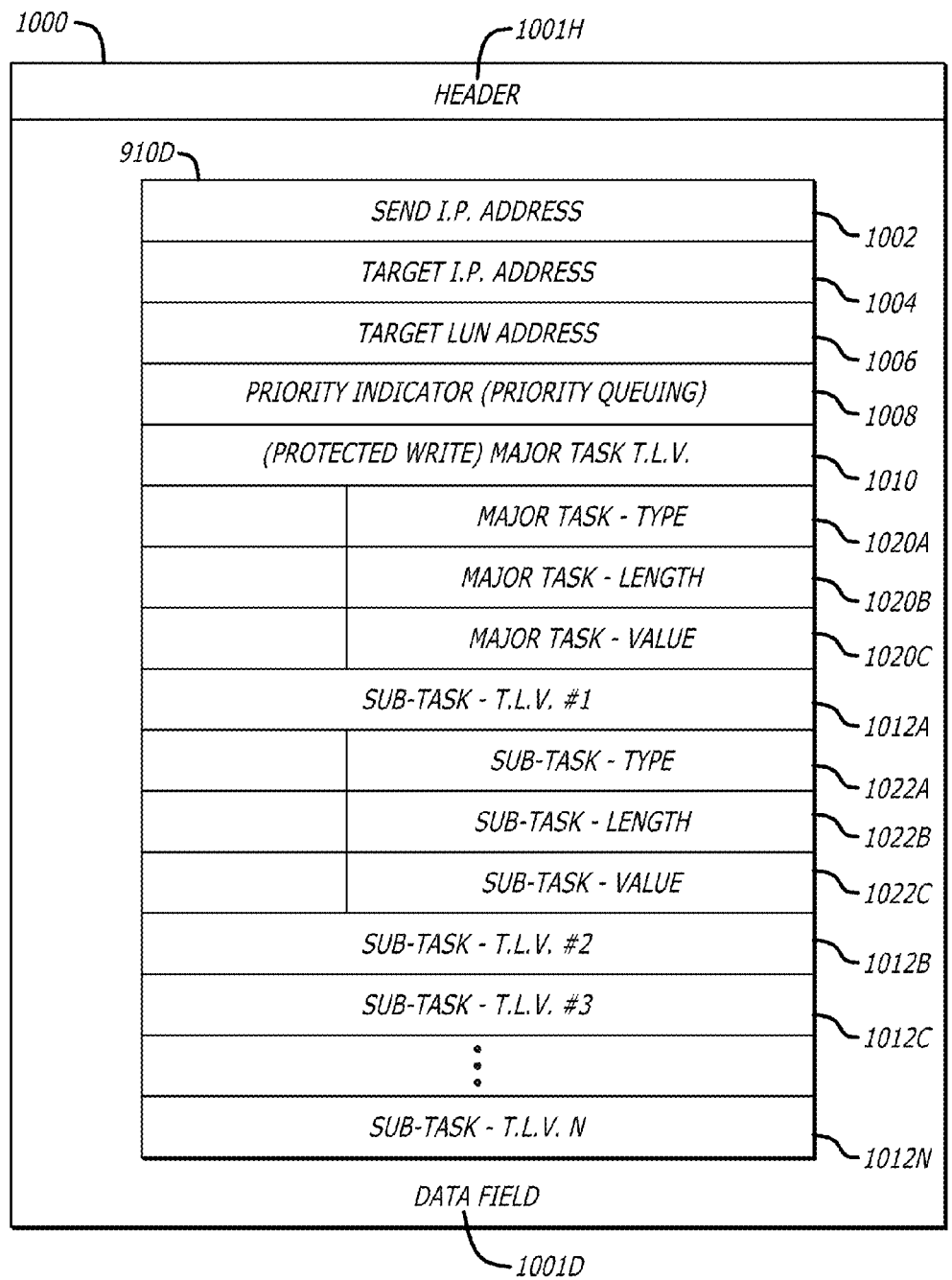

In FIG. 10D, a diagram of an exemplary storage area network (SAN) message 910D encapsulated within the frame 1000 is shown. The SAN message 910D includes a major task 1010 and associated subtasks for performing a protected write operation so that data is not overwritten by other devices, for example.

The various types of SAN messages 910A-910D may generally be referred to herein as SAN message 910 or SAN messages 910.

Each SAN message 910 is encapsulated within a frame 1000. The frame 1000 includes a header 1001H and a data field 1001D. The SAN message 910 is included as part of the data field 1001D of the frame 1000.

The one or more SAN messages 910 are often stored in a storage device (e.g., buffer memory 1104 in FIG. 11) before they are encapsulated and communicated by a master server into the storage area network. Before they are executed by a CPU within a slave server, the one or more SAN messages 910 are also often stored in a storage device (e.g., buffer memory 1104 in FIG. 11). When passed from one network device to another, the one or more SAN messages 910 are communicated in-band between the networked devices.

The one or more SAN messages 910 comprise a plurality of data fields that can be temporarily stored like a table in a storage device. The plurality of data fields in the one or more SAN messages 910 includes one or more major task elements 1010 and one or more sub-task elements 1012A-1012N associated with each of the one or more major task elements 1010. The one or more major task elements 1010 may be encoded as a type-length-value (TLV) message with TLV elements including major task type 1020A major task length 1020B, and major task value 1020C for each major task. Each of the subtask elements 1012A-1012N may be similarly encoded as a type-length-value (TLV) message with TLV elements including sub-task type 1022A, sub-task length 1022B, and sub-task value 1022C for each sub-task associated with a major task.

The one or more SAN messages 910 may further include a sender IP address 1002, a target IP address 1004, a target LUN address or number 1006, and a priority indicator 1008. The priority indicator 1008 indicates whether the message should be treated with high priority through the local SAN or normal priority as discussed herein. If high priority is indicated by the priority indicator 1008, the one or more SAN messages 910 are passed using high priority queues. The sender IP address 1002 is the IP address of the server, networked storage device, or other network device that generates the message. The target IP address 1004 is the internet protocol (IP) address of the server, networked storage device, or other network device for which the one or more SAN messages 910 are intended to be received. The target IP address 1004 may indicate a broadcast message that is intended for all other servers, networked storage devices, or other network devices within the local SAN. The target LUN address or number 1006, if available, indicates the logical unit number (LUN) of a storage device of the networked storage device associated with the target IP address 1004.

In response to the communication protocol used in communicating the one or more SAN messages 910 within the storage area network, the one or more SAN messages 910 may be inserted into a data element 1001D of a routing instruction message frame 1000. The routing message frame 1000 may further include a header 1001H in response to the communication protocol. The routing message frame 1000, including the one or more SAN messages 910, may be transmitted by a master server and received by each slave server and each storage network device within the storage area network.

Referring now to FIG. 15, an exemplary communication method that communicates messages between networked devices in a local storage area network is now described. As shown in FIG. 9A for example, networked devices may each include a Fibre Channel adapter card 122A-122B,124A-124E, including an integrated circuit and software/firmware driver, to pass SAN messages 910 between each other. The exemplary communication method of SAN messages begins at process block 1500 and goes to process block 1502.

At process block 1502, the SAN message 910 is formed as a type-length-value TLV message including a plurality of data fields representing one or major tasks and one or more sub tasks associated with each of the one or more major tasks. The major task may include a major task type, a major task length, and a major task value. The one or more sub tasks may each include a sub task type, a sub task length, and a sub task value. The process goes to process block 1504.

At process block 1504, a communication link is established between a first networked device and a second networked device in the local storage area network. The first networked device may be a master server that generated the one or more SAN messages 910 and initiates the establishment of the communication link. The second networked device within the local storage area network may be a slave server, a tiered array, a flash appliance, or a storage array. The first networked device may include or be in communication with a first flash based memory. The second networked device may include or be in communication with a second flash based memory. Alternatively, the first networked device and the second networked device may share the same flash based cache memory. The first networked device and/or the second networked device may be one or more servers with resident cache memory therein, a storage array with flash memory, or a flashed based caching appliance with flash memory.

The communication link for SAN messages is an in-band communication link over which data may also be communicated using a storage area network protocol. For example, the message is communicated in-band between the first networked device and the second networked device using a Fibre Channel common transport (FCCT) protocol. If Ethernet cables are used to physically couple devices in the storage area network together, the SAN message may be communicated in-band between the first networked device and the second networked device using a Fibre Channel over Ethernet (FCOE) protocol, for example. After the communication link is established, the process then goes to process block 1506.

At process block 1506, the one or more SAN messages 910 are transmitted from the first networked device to the second networked device. The one or more SAN messages 910, prior to transmission, may be stored in a storage device in the first networked device, such as a buffer memory in a first host adapter card. The one or more SAN messages 910, after receipt, may be stored in a storage device in the second networked device, such as a buffer memory in a first host adapter card, prior to its execution. The process may then go to process block 1508.

At process block 1508, in response to receiving the one or more SAN messages 910, the second networked storage device may transmit an acknowledgment message (message received indicator) back to the first networked device indicating that the one or more SAN messages 910 were received.

At process block 1510, the communication link between the second networked device and the first networked device may be retired such that the first networked device is released to execute other tasks. The first networked device may be a master server that can then execute further management and control function within the local storage area network.

At process block 1512, in response to the one or more SAN messages 910 and the major task and associated sub tasks, the tasks within the one or more SAN messages 910 are executed with a processor in the second networked device to support local storage area network functionality. Exemplary SAN messages 910B-910D are shown in FIGS. 10B-10D to provide such local storage area network functionality. The process may then go to process block 1514.

At process block 1514, the plurality of tasks in the one or more SAN messages 910 have been completed by the second networked device. In response to the tasks being completed, the second networked device may establish a second communication link between the first networked device and the second networked device after the first was retired.

At process block 1516, in response to the tasks being completed, the second networked device may transmit a task complete response to the first networked device.

At process block 1599, the second communication link between the second networked device and the first networked device may be retired such that each is released to execute other tasks. The process may be repeated for each of the one or more SAN messages 910 that are communicated through the local storage area network.

Figure 11:
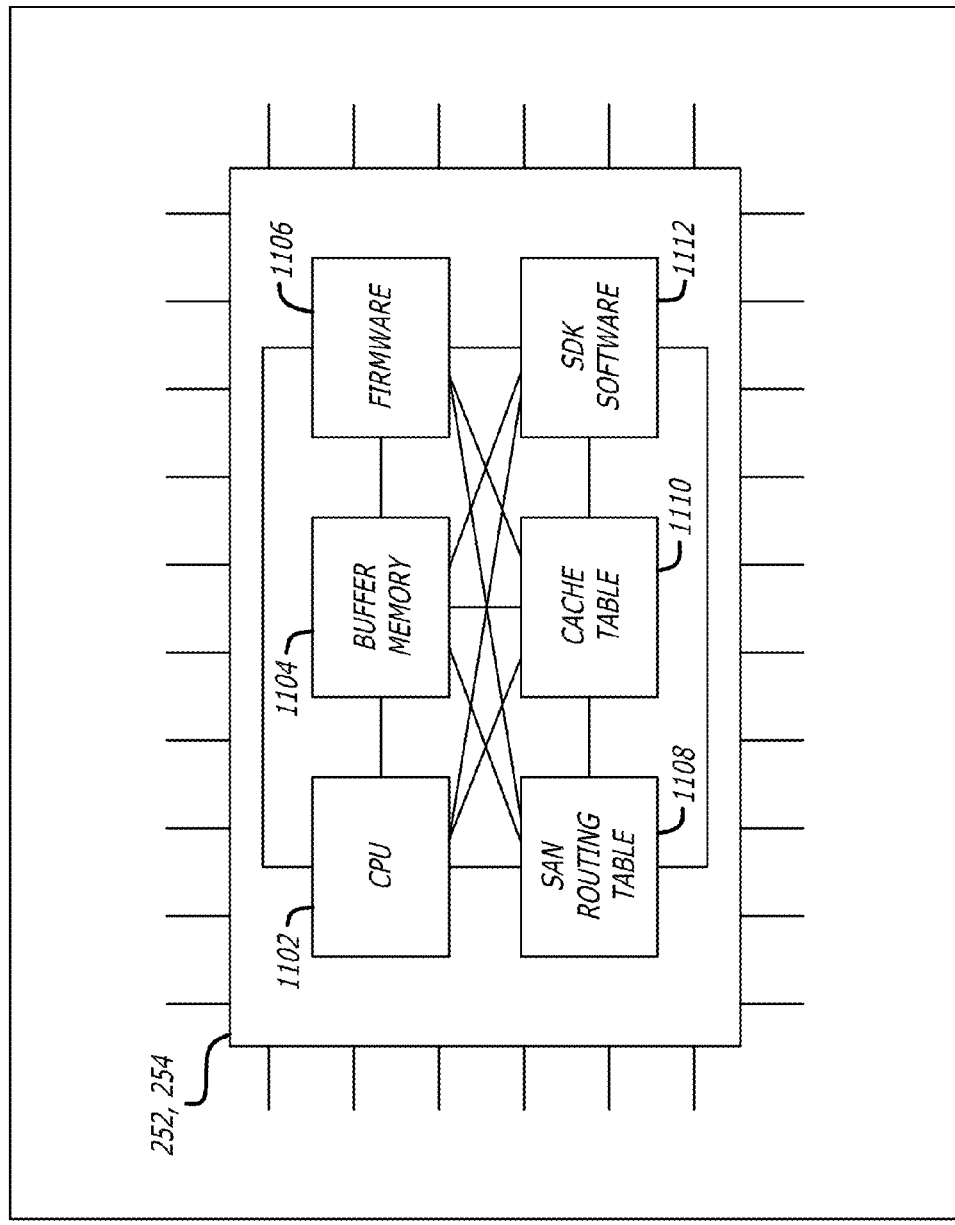
FIG. 11 illustrates a functional block diagram of an adapter card with adapter integrated circuits for communication over Fibre Channel with optimizations for the cache routing table and main routing table.

Referring now to FIG. 11, a functional block diagram of a Fibre Channel adapter integrated circuit 252,254 is illustrated. The Fibre Channel adapter integrated circuit 252,254 is included as part of the Fibre Channel host adapter cards 122,122' and the Fibre Channel cards 124,124' shown in FIGS. 2H-2I. The Fibre Channel adapter integrated circuit 252,254 facilitates the control and execution of the SAN messages.

The Fibre Channel adapter integrated circuit 252,254 includes a central processing unit (CPU) 1102 and a buffer memory 1104. The integrated circuit 252,254 may further include operational firmware 1106, a storage area network (SAN) routing table 1108, a cache table 1110, and/or a software development kit (SDK) 1112.

The storage area network (SAN) routing table 1108 and/or the cache table 1110 are stored in a storage device, such as a memory of the circuit 252,254. The routing table 1108 and/or the cache table 1110 may be stored in the buffer memory 1104 of the integrated circuit 252,254 shown in FIG. 11, for example.

The storage area network (SAN) routing table 1108 may be used by a master server to identify the networked devices within a local storage area network. The cache table 1110 may be used by the master server to manage a centralized low latency cache memory.

The operational firmware 1106 provides instructions for the CPU 1102 to provide basic functionality of the Fibre Channel host adapters 252, 254. The software development kit (SDK) 1112 facilities the end-user coding of the software instructions of a software driver to facilitate aspects of the embodiments. The buffer memory 1104 is used to buffer data and messages that are communication over the local storage area network. The CPU 1102 executes instructions of the one or more SAN messages 910, utilizing the firmware 1106, and any associated software driver required for the execution within the operational structure of the SDK 1112.

The CPU in the master server 112 forms the one or more SAN messages 910 and transmits them from one networked device, via the Fibre Channel adapter 252, 254 to another networked device to manage and control the storage area network of the server. The Fibre Channel adapter integrated circuit 252,254 processes the one or more SAN messages 910 when received for execution of the instructions or commands therein by a CPU, such as CPU 1102. The Fibre Channel adapter integrated circuit 252,254 manages and processes various storage requests within the local storage area network via a communications structure utilizing an IP address, a memory address, and a LUN number as registered in the SAN routing table 1108 and/or the cache table 1110.

As discussed herein, a master server 112M may be designated within the local storage area network to manage and control the local storage area network and other networked devices therein. The Fibre Channel adapter integrated circuit 252,254 and the one or more SAN messages 910 passed within the local storage area network, allow the designation of a master server 112M while others are designated as slaves.

The Fibre Channel adapter integrated circuit 252,254 and the one or more SAN messages 910 passed within the local storage area network, further allow the designation of a master cache memory while other cache memories are designated as slave cache memory. The data in slave cache memory are maintained in a synchronous method with the data in the master cache memory by use of the cache table 1110 and/or the SAN routing table 1108. The master cache memory may be internal to the master server or externally provided by a first flash memory appliance. Similarly, slave cache memory may in internal to one or more slave servers or externally provided by a second flash memory appliance.

The Fibre Channel adapter integrated circuit 252,254 associated with the master server may be designated as a master controller to maintain a master cache table and a master SAN routing table. Copies of the master cache table and the master SAN routing table may be maintained in the slave server 112S as a slave cache table and a slave SAN routing table. The Fibre Channel adapter integrated circuit 252,254 associated with a slave server may be designated as a slave controller under the control of the master. The slave controllers in the slave server and the networked storage devices recognize the master controller. The master controller provides management of both the cache tables and the SAN routing tables in the master server, slave servers, and slave storage devices. The master slave relationship provides for continuous updates to the SAN routing tables and cache tables to maintain a unified mapping to all entries in a unified flash based cache memory across networked devices or a central flash based cache memory in a single networked storage device.

Figure 12:
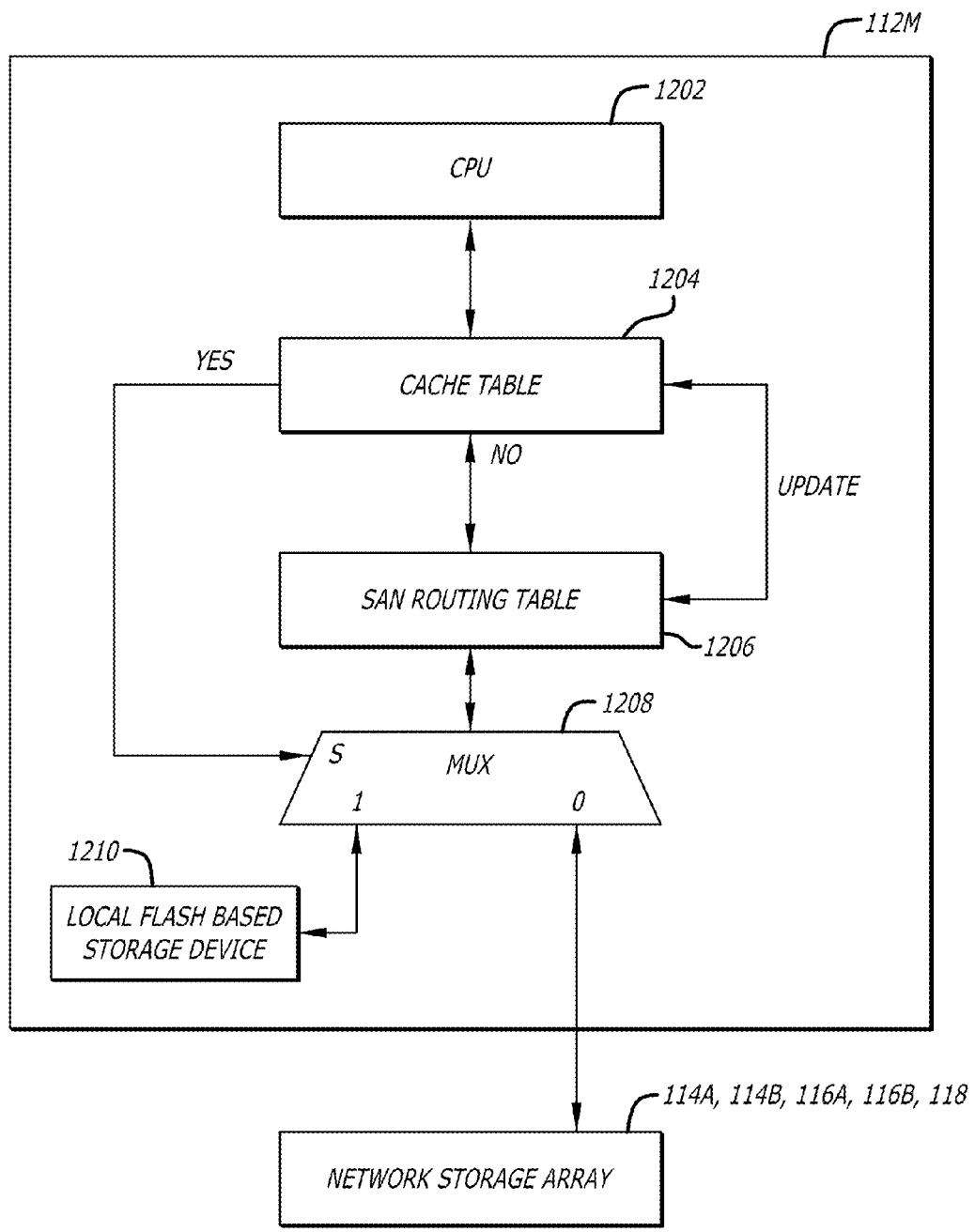
FIG. 12 illustrates a functional block diagram of the transmission of storage requests by the storage initiator through the cache routing table and main muting table onto the wire/cable of the storage area network.

Referring now to FIG. 12, a functional block diagram of portions of a master server 112M and its master controller is illustrated, such as one of the servers 112A,112B illustrated in FIGS. 1A-1C and host adapter 122A,122B with integrated circuit 252,254. The one or more SAN messages 910 and the data may be bi-directionally passed between the master server 112M (storage requests with addresses and control signals are unidirectionally passed) to another networked device in the local storage area network, such as a storage array 114A-114B, 166A-116B,118. The master server 112M includes a flash based storage device 1210 that provides a local flash cache memory that may be formed of a plurality of electrically erasable programmable read only memory (EEPROM) devices or a solid state drive (SSD). Data may be bi-directionally passed between the CPU 1202 and (storage requests with addresses and control signals are unidirectionally passed) to the flash based storage device 1210.

A read or write storage request, in one or more SAN messages 910 or otherwise, may originate from the CPU 1202. The storage request at least includes an address that is to be communicated to the cache table 1204 to determine if the address is pointing to locations in the local cache 1210 that may store valid data. The address of the storage request is checked against the memory addresses stored in the cache table to determine if the storage request can be satisfied with the local flash based cache storage device 1210 or if the storage request is associated with a location not found in the local flash based cache storage device 1210.

If the storage request is associated with the local flash based cache storage device 1210 the data needs to be valid and not dirty due to the data being changed or overwritten by another storage request. If the cache table 1204 indicates the data to be accessed is valid and stored in the flash-based storage device 1210, then the storage requests is to be satisfied with the flash-based storage device 1210. If the storage request is not associated with the local flash based cache storage device 1210, then the storage requests is to be satisfied outside the master server 112M, by the storage array 114A,114B,116A,116B,118.

The cache table 1204 can indicate by a select control signal that the storage request is to be satisfied with the local flash-based cache storage device 1210 or an external device. The select control signal may be coupled to a select input of a bidirectional two to one bus multiplexer 1208 to interface to the local flash-based cache storage device 1210 or the external storage array 114A,114B,116A,116B,118. If the storage request is to be satisfied with the local flash-based cache storage device 1210, function arbitration logic sends the request to the flash-based storage device 1210 for execution. The data in response to the storage request may be processed through the 2 to 1 bus multiplexer 1208 with the local flash-based cache storage device 1210. If the storage request is to be satisfied with an external device, the data/storage resource is not internal, but external to the master server 112M. The function arbitration logic sends the storage request to an external device for execution. The SAN routing table 1206 and/or cache table 1204 may be used to determine what external device 114A,114B,116A,116B,118 is to be used to process the storage request. The IP address and LUN number may be determined from the table and associated with the address for the storage request. The data may be processed through the 2-1 bus multiplexer 1208 with the storage request to the selected network storage device for execution.

When the storage request is executed and not found in the cache, the networked storage device sends a copy of the retrieved data for storage into the flash-based cache memory device 1210. The cache table 1204 and SAN routing table 1206 in the master server may be updated with the memory address, LUN number, and IP address of the network storage device that may have stored a write request that was not previously in the cache. If a write request updates a memory location in the cache, an invalid or dirty bit is set to indicate that there is a difference between the cache and the network storage device. The master server broadcasts one or more SAN messages 910 to synchronize the duplicate slave caches to avoid any other server writing data into the updated memory location associated with a LUN and storage device.

If a slave server writes data to a slave cache that mirrors the master cache 1210, the master cache 1210 needs to be updated and the cache table updated. Similarly with a centralized cache, if a slave server writes data to the master cache 1210, the cache table needs updating. In each case, an update message with a memory address, LUN number, and IP address are sent to the cache table 1204 to update a line therein.

If a new server is introduced to the local storage area network or if a server is taken offline, the SAN routing table 1206 is updated to add a new server or delete the server being taken offline. The IP address, LUN numbers, and memory map of memory locations of a new server may be added to the SAN routing table 1206. Similarly, a server or networked storage device taken offline may have its IP address, LUN numbers, and memory map, if any, removed from the SAN routing table.

Referring now to FIG. 9B and FIGS. 13A-13B, an exemplary diagram of a Fibre Channel cache table 1300 is shown that may be stored in memory as the cache table 1110, 1204 as depicted in FIGS. 11-12. The cache table 1300 stores recently used mapped memory addresses and IP addresses (collectively referred to as routing entries) for storage requests of data in a fast and convenient hash lookup table. Each line in the cache table is preferably associated with data currently stored in a low latency cache memory (e.g., a local flash based cache memory or a remote flash based cache memory). If data in cache memory is updated, the lines or entries into the cache table may remain in the cache table associated with data previously stored in cache memory, but indicated as being invalid (I) due to change. When the cache memory nears its full capacity, lines in the cache table may be removed so that cache memory capacity can be recovered and overwritten. For storage requests, the cache table is typically consulted before the SAN routing table to determine if the data is within the cache memory.

As shown in FIG. 9B, a server 112A has a cache memory 903 with a plurality of cache LUNs 934A-934N allocating memory capacity to a plurality of CPU cores 902A-902N. For each line or row, the exemplary cache table 1300 illustrated in FIGS. 13A-13B may include a source IP address 1302, a destination IP address 1304, a cache LUN number 1306, a SAN memory address 1312, and a valid/dirty/modify bit 1314. The table 1300 may further include a master server memory address 1308 and a slave server memory address 1310, if so designated, where the cached data may be stored. If so, the cache table 1300 in a master server may be transferred to a slave server by using one or more SAN messages 910 passed over the local SAN.

If the data is not in the cache memory 903 to satisfy a read storage request, the server processing the read request looks to the networked storage device for the data using the SAN IP address from the SAN routing table and the SAN memory address 1312 from the cache table. If a write storage request, where the data is not in the cache memory 903, the server processing the write request will write the data into both the cache memory 903 at a master memory address 1308 and/or slave memory address 1310 and the networked storage device using a SAN IP address from the SAN routing table and a SAN memory address 1312 associated with a storage device within the networked storage device.

In each of the referenced addresses depicted in the table there are cross-references of an address to the corresponding LUN numbers LUN1,LUN2,LUN3 through LUNN associated with cache memory. The cross references may indicate the path to where data may be stored or retrieved during execution of a SAN message at various storage resources. The source IP address 1302 may indicate the source of one or more SAN messages 910 while the destination IP address in the same row may indicate the destination of the one or more SAN messages 910. The master memory address 1308 may indicate where data is stored in cache memory of a master server. The slave memory address 1310 may indicate where data is stored in cache memory of a slave server. The SAN memory address 1312 may indicate where data is stored in a networked storage device associated with the destination IP address.

A common memory address may be used to ease the cross reference to memory locations of each networked device. A prefix numbering system may be used to allow the use of the common memory address for each storage device. The assigned device prefix of the address indicates where the actual record of the message resides in each of the various networked storage resources.

At the end of each row of the cache table 1300, there is a modify/dirty/valid value 1314 of either V for valid (e.g., one bit; or alternatively a zero bit) or I for invalid (e.g., zero bit; or alternatively a one bit). The valid value may be used to indicate if the page or blocks of data in cache memory pointed to by the row in the table have been modified by a CPU but not written back to the networked storage device. In FIG. 13A for example, the valid value is indicate in row 1316A as being valid V. In FIG. 13B for example, the valid value 1314 indicated in row 1316B has been changed indicating invalid I data in the cache memory. The valid value 1314 facilitates cache memory control as to whether data can be accessed from cache memory or from a storage device within a networked storage array.

The cache table 300 may be stored in a storage device such as buffer memory 1104 shown in FIG. 11, for example. If one or more SAN messages 910 are to be routed over the local storage area network, a SAN routing table may be consulted for the proper IP addresses and LUN of a given storage area network SAN address.

Referring now to FIG. 14, an exemplary Fibre Channel SAN routing table 1400 is shown. The SAN routing table 1400 stores routing entries for each LUN of each networked device within the local storage area network. To that end, the SAN routing table 1400 may include a server IP address 1402, a storage device IP address 1404, the LUN number 1406 and a SAN memory address or address range 1412 for each LUN. For example, consider entries 1401 et seq. A first storage device having an IP address of IPADD3 has a plurality of LUNs numbering from LUN1-LUNN. This storage device is coupled to a server having an IP address of IPADD1. As another example, consider entries 1402 et seq. A second storage device having an IP address of IPADD4 has a plurality of LUNs numbering from LUN1-LUNN. This storage device is coupled to a server having an IP address of IPADD2.

The SAN address 1412 for each LUN may have a starting address MEM1C indexed by a prefix. The use of a unique prefix numbering system provides for the use of a common memory address by each component where the assigned unique prefix of the address indicates where the actual data resides in each of the various storage resources.

Each LUN may be associated with portions of memory in a master server, a slave server, and/or a dedicated cache memory. The SAN routing table may provide a memory map of sorts cross referencing the SAN memory address 1412 with a master memory address 1408 and/or a slave memory address 1410. If a dedicated storage device, such as a cache memory, an additional column may be used indicating the memory address therein.

The cross referenced addresses depicted in the table, provide the address to the corresponding storage device that resides on the network and the storage resources that are available. The SAN routing table may be stored in a storage device, such as the buffer memory 1104 shown in FIG. 11.

Messages may be passed within the local storage area network to provide functional aspects that can optimize the storage network, including protected writes, cache prefills, improved virtual machine migration, and read auto copy.

Protected writes solve the problems involved with shared access to the same logical unit by multiple servers. The multiple servers share a logical unit, a shared LUN that may be a flash-based cache memory. If a first server writes data to the shared LUN, and the second server has a previous version of that data stored in its cache, the second server's cache is now stale. Without a protected write feature, there is a risk that corrupted data on the second server may be used. The method and apparatus for protected writes sends a cache invalidate message from the first server to the second server before allowing the write to go through. This ensures that data corruption does not occur when a shared LUN is used between multiple servers.

Cache prefill involves using a message passing mechanism to provide hints to a caching device (referred to as cache hints) that are based on some prior knowledge of that device's behavior. The cache hints are in the form of a reference to read data into the cache memory. The cache hints do not push the data into the cache memory. The data can be read into the cache memory in response to the cache hints.

Improved virtual machine migration uses cache hints to quickly warm up a cache memory. This cache hints can be used to migrate a virtual machine from one physical server to another. Since cache hints are provided for reference, without actual data movement, virtual machine migration can quickly occur.

Read auto copy is a feature of the host-based or storage initiator adapter card. Read auto copy is directed at network-resident appliances that perform a caching function, also referred to as a cache appliance. The read-auto copy may be initiated or commanded by the caching software and or hardware. The read-auto copy feature automatically forwards read data to a cache appliance. The read-auto copy feature reduces the number of commands or instructions that are typically used to store data into a cache appliance. For example, the read-auto copy feature may save a step of sending a write command from a host server or storage initiator.

The foregoing features offload various functionality in a storage area network from the end-point devices. This can improve the overall functionality of a storage area network, particularly one that includes low latency storage devices, such as those that are flash memory based.

Cache Pre-Fill

The cache prefill feature involves using a message passing mechanism to provide hints (also referred to as cache hints) to a cache memory device. The cache hints are based on some prior knowledge of storing data into a similar cache memory device. The cache hints are provided in the form of a reference, instead of actually pushing the cached data itself into the cache memory device. Cache prefill facilitates the rapid accessibility and utilization of a new slave server in a storage area network without waiting for its cache memory device to be filled with cache data. The actual data, based on a cache routing table and the cache hints is imported from the networked storage array and stored into the cache memory device (e.g. a flash-based cache memory) of the new slave server over a lengthier timeframe. The CPU in the slave server can execute storage requests and retrieve data after receiving the cache hints and the cache table without having to communicate out-of-band in the networked storage array to complete the storage requests. The storage requests are processed by the slave server's CPU, based on the master cache table received from the master server, and can be satisfied with the data from the master cache memory in the master server.

Figure 16A:
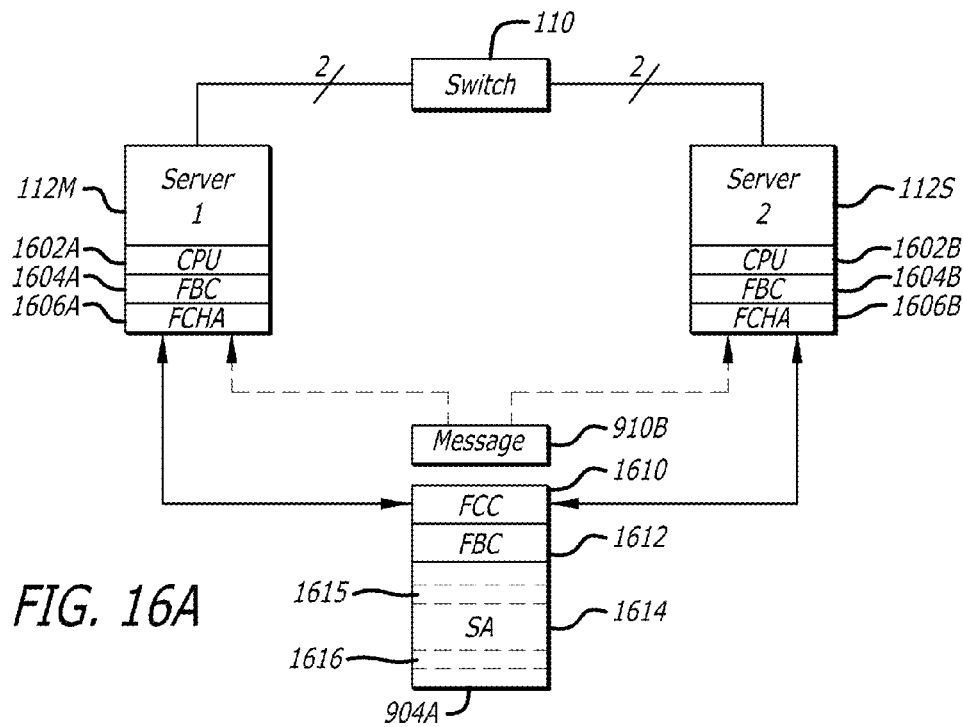
FIG. 16A illustrate a functional block diagram of a portion of a data center configured for fibre channel connectivity incorporating aspects of the invention.

Referring now to FIG. 16A, a functional block diagram of a local storage area network is shown. The storage area network includes a master server 112M, a slave server 112S, a switch 110, and a storage array 904A coupled together. The storage array 904A has a plurality of logical units (LUNs) for data storage, including a LUN 1615 allocated to the master server 112M, referred to as a master LUN 1615, and a LUN 1616 allocated to the slave server 112S, referred to as a slave LUN 1616.

The slave server 112S may be newly introduced into the storage area network and it is desirable to prefill its cache 1604B so that it can be started up more quickly to serve clients. The slave server 112S receives SAN messages with cache hints, including a master cache table, from the master server 112M to generate a slave cache table. The cache prefill SAN message also instructs the slave server to access data from a master LUN to begin filling its slave cache memory and its associated slave LUN. The cache hints that are provided from the master server are in the form of reference instead of the actual cache data that is stored in the master cache memory (flash based cache (FBC) 1604A). With a cash prefill message (SAN message 910B), the master server 112M initializes or warms up the slave cache memory (and a portion of a slave LUN) without having to actually push or write the cache data itself to the slave server 112S. With the slave cache memory filled, the slave server continues to read and copy data from the master LUN and write the copied data into a slave LUN.

The slave server 112S can process storage requests as needed using SAN messages to write data into its slave cache and slave LUN as the data is accessed by storage requests in response to client requests. Eventually, the slave cache memory mirrors the master cache memory. Similarly, the slave LUN eventually mirrors the master LUN so that the slave server can operate independently to process data storage requests of the master server, with only periodic synchronization of the master and slave LUNs and master and slave caches, such as at night each day when the servers may have less utilization. Cache prefill is advantageous in that the slave server can be started up and utilized more quickly to server clients.

The storage area network (SAN) message 910B is a cache prefill message such as shown and described with reference to FIG. 10B. The SAN message 910B is generated in the master server 112M by a processor, such as CPU 1602A or the CPU 1102 in the adapter circuit 252,254 of the fiber channel host adapter 1606A shown in FIG. 11. The processor reads a master cache table in the master server to generate the hints in the SAN message 910B that can be used to reconstruct the master cache memory (flash based cache (FBC) 1604A). The hints may be the subtask instructions of the SAN message. Instructions are compiled into the SAN message 910B including those containing the master cache table in the master server 112M. The SAN message 910B, a data field, is then appended with a header 1001H, such as shown in FIG. 10B.

The SAN message 910B is communicated in-band over the storage area network from the master server 112M to the slave server 112S. The fibre channel host adapter (FCHA) 1606A of the master server sends the SAN message 910B over the fibre channel to the FCHA 1606B of the slave server 112S. The SAN message 910B is then processed by the slave server 112S.

A processor in the slave server 112S, such as CPU 1602B or CPU 1102 in the adapter circuit 252,254 of the fiber channel host adapter 1606B, processes the SAN message 910B containing the master cache table. The master cache table is loaded into a portion of memory of the slave server 112S, such as a portion of the slave cache memory (FBC 1604B) to become a slave cache table. With the slave cache table, the slave server is prefilled and can begin to read data from the master cache memory into the slave cache memory to begin filling it with data associated with the cache lines in the slave cache table.

In the mean time, with the slave cache table mirroring the master cache table, the slave server can also process storage requests (retrieval requests) for software applications and client computers. Until the slave cache memory 1604B mirrors the master cache memory 1604A, storage requests executed by the slave server 112S may be satisfied with data, in order, initially from the slave cache memory, if available; secondly from the master cache memory, if available; or from the master LUN 1615 in the storage array 904A. If the desired data is unavailable in the slave cache memory, a SAN message 910B may be used to route a storage request to the fibre channel adapter 1606A and the master cache memory (e.g., FBC 1604A) of the master server 112M for execution of the storage request. If the desired data is unavailable in both the slave cache memory and the master cache memory, a SAN message 910B may be used to route a storage request to the storage array 904A for execution of the storage request into the master LUN 1615. Thus, the slave and master cache tables can provide an indication of data location to determine where to send the SAN message 910B.

While data is being accessed from the master cache 1604A or the master LUN 1615 in the storage array 904A by the slave server 112S in response to a storage request, the actual data is also being written into the slave cache memory 1604B to continue to fill it, as well as the slave LUN 1616. For example, while the FBC 1604B of slave server 112S downloads the actual data from the master LUN 1615 in the storage array 904A through the fibre channel controller 1610 and the fiber channel host bus adapter FCHA 1606B into the slave server 112S to satisfy a storage request for a software application, the data is also written into the slave cache memory 1604B and the slave LUN 1616 on storage array 904A for future utilization by the slave CPU 1602B and slave server.

With the slave cache table, the slave server 112S continues to fill its slave cache memory FBC 1604B with data from the master cache memory FBC 1604A until it is loaded with data mirroring that referenced by the master cache table, so that the master cache table and slave cache table are synchronized. Once the slave cache memory 1604B mirrors the master cache memory, they are synchronized, and the CPU 1602B of the slave server 112S can execute and locally process storage retrieval requests against its own resident slave cache memory FBC 1604B, without the need to remotely look to the master cache memory of the master server for data. However, if data is not in the slave cache memory 1604B and the slave LUN 1616 does not mirror the master LUN 1615, the slave server may still execute storage requests with the master LUN 1615 associated with the master server.

In an alternate embodiment, the networked storage array 904A may include its own resident or local cache memory FBC 1612. This local cache memory FBC 1612 may be utilized for cache memory synchronization of all networked resident devices such as the cache memory 1604A of the master server 112M and the cache memory 1604B of the slave server 112S. Instead of sending messages in-band to the master server 112M to synchronize its cache memory, the slave server 112S sends messages 910B in-band over the in-band communication link to the fibre channel adapter 1610 of the networked storage array 904A and its resident cache memory 1612. If the data is not in the cache memory 1612 of the networked storage array 904A, the media of the storage array 1614 may be used to satisfy a storage request.

Figure 16B:
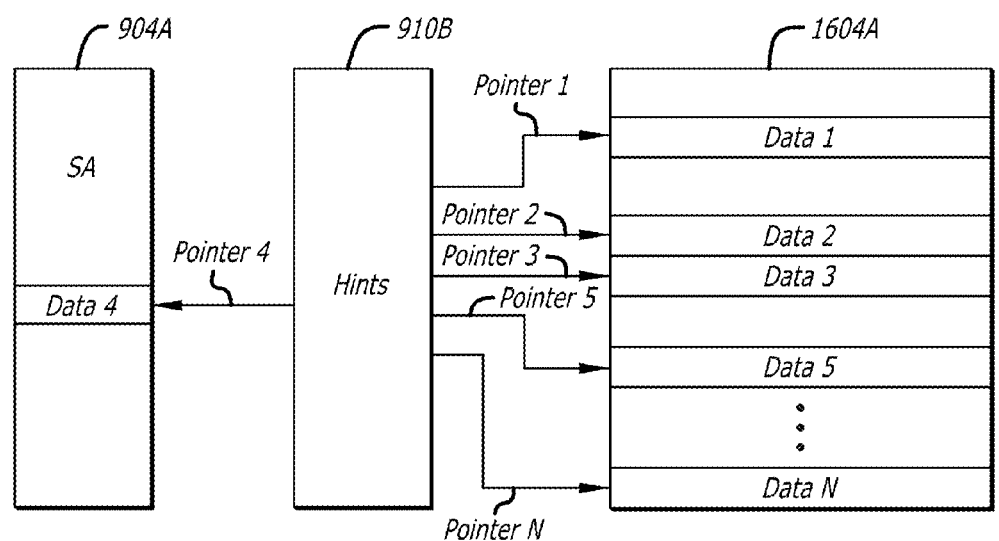
FIG. 16B illustrates a functional Mock diagram of the storage location hints from the SAN message indicating the resource to access for the retrieval of the requested data

Referring now to FIG. 16B, a block diagram illustrates how hints in a SAN message 910B are associated with the master cache table (so much so that it can be said the master cache table is in the message) and relay it to the slave server 112S. The message hints are pointers (Pointer 1 through Pointer N) to access data from the appropriate resource (e.g., master cache memory or storage area network device) within the storage area network.

For example, the hints of the SAN message 910B indicates with Pointer 1, Pointer 2, Pointer 3, and Pointer 5 through Pointer N that Data 1, Data 2, Data 3, and Data 5 through Data N are respectively available in the master cache memory FBC 1604A. Pointer 1, Pointer 2, Pointer 3, and Pointer 5 through Pointer N are generated by the processor (such as CPU 1602B) reading the hints so that the slave server can access the data from the master cache memory FBC 1604A, if requested or to fill its own cache memory.

The hints in the SAN message may also indicate with one or more pointers, such as Pointer 4, recently accessed data that is not within the master cache memory, data that may have been overwritten such that a cache line is dirty. For example, a consider a hint in the SAN message 910B indicates that data 4 is available from the networked storage array 904A and not the master cache memory 1604A. Pointer 4 is generated by a processor (such as CPU 1602B) reading the hint to access the data from the storage array 904A and not the master cache memory 1604A. In this case, the slave server generates a storage retrieval request in a SAN message for data in the one or more networked storage devices and not the master cache memory. The SAN message may be sent to the fibre channel host adapter 1606A of the master server 112M for processing, if the requested data is indicated as being available in one or more networked storage devices.

The slave cache memory may be initially synchronized to the master cache memory before the slave and master LUNs are synchronized due to size or capacity differences. After the master and slave cache memories are synchronized, the slave server 112S continues to store data into its own logical unit number (LUN) of storage associated with a storage array, such as the slave LUN 1616 in the storage array 904A. The slave server 112S may be assigned a logical unit number (LUN) 1616 in the total storage 1614 provided by a storage array to process the SAN messages 910B and the hints therein that are received in band from the master server 112M. The slave server 112S begins setting up its own database in the LUN on the storage array, for example, to use with a software application.

FIGS. 16C, 16D and 16E illustrate a hierarchy and processing sequence of storing data associated with the slave server 112S. Data is initially received by the fibre channel host adapter 1606B of the slave server and temporarily stored in its memory. The data is then stored the slave cache memory 1604B and associated with the cache table, while at the same time the data is stored in the slave LUN 1616 of the storage array 904A. FIGS. 16C, 16D and 16E further illustrate the progression or stages of a new slave server 112S as it receives the message hints from the master server 112M to download data into its own LUN of storage 1616 in the storage 1614 provided by the storage array. If storage requests by client computers and software applications are not being processed by the slave server to bring data to it, data is copied and downloaded from the master LUN 1615 associated with the master server 112M and written into the slave LUN 1616 associated with the slave server 112S until data is mirrored so they are synchronized.

In FIG. 16C, the slave LUN 1616 is an empty storage volume 1616A. A SAN message 910B is received pointing to data in the master LUN of the storage array associated with the master server from where data can be copied and downloaded into the slave LUN.

The SAN message 910B is transmitted and received in-band by the slave server 112S from the master server 112M providing the master cache table (the hints). This SAN message hints provides for the temporary location of the data available in the FBC 1604A on the master sever 112M while also providing for the LUN address from where to download the actual data from the networked storage array 904A. The message from the master server 112M is received by the FCHA 1606B. The SAN message 910B is processed and can be executed with the FBC 1604B and the slave LUN 1616. The temporary instructions for data retrieval for cache memory are contained in the SAN message hints 910B, as are the actual download instructions for the data from the networked storage array. In FIG. 16C, the slave server 112S is waiting for the transfer of data that is to be stored into the slave LUN 1616 to which it is associated.

In FIG. 16D, data transfer is in process with data read from the master cache and/or master LUN 1615 being written into the slave cache memory 1604B and the slave LUN 1616 associated with the slave server 112S. The slave LUN 1616 has a limited amount of data and is in a partially filled LUN state 1616B so it is not yet ready to be used to process and fulfill storage requests. The slave server 112S is restricted from processing storage requests with the slave LUN 1616 in a partially filled LUN state 1616B. Once filled to mirror the master cache memory, request for data at the slave server outside the slave cache memory is to be satisfied with the master LUN 1615 until the copying of data from master LUN 1615 to the slave LUN 1616 is completed.

Until the slave cache mirrors the master cache, the slave server 112S is still relying on the hints in the SAN message 910B to request data from the master server 112M cache memory and/or master LUN. While the download is in progress to the slave LUN 1616 and the resident slave cache memory FBC 1604B, the slave LUN 1616 is not used for any storage retrieval requests until the download from the networked storage array is complete.

Initially data is copied from the master LUN or master cache memory and written into both the slave cache memory and the slave LUN and associated with the slave cache table. After the slave cache memory is filled, an amount of data 1618 exists in the slave LUN 1616 associated with the slave cache memory 1604B. Without further user or client storage requests, the slave cache memory may not be updated. However, it is desirable to fully mirror data in the master LUN 1615 with data in the slave LUN 1616 to completely bring up the slave server to full execution status. Accordingly, the download of data continues with data being read and copied from the master LUN and written into slave LUN in the networked storage array.

In FIG. 16E, the data transfer into the slave LUN 1616 is completed. The slave LUN 1616 mirrors the master LUN 1615 and is in a mirrored LUN state 1616C. All of the requested data has been successfully downloaded into the slave cache memory in the new slave server 112S and into the slave LUN 1616 of the storage array associated with the new slave server. The slave server 112S transmits a SAN message to the master server 112M that the data download is completed. The SAN message to the master server may further indicate that the slave cache table has been verified and synchronized with the master cache table of the master server. Data in the master LUN may change during the download into the slave LUN. In this case, the master server 112M may send update SAN messages for the slave server to update some of the data stored in the slave LUN so that it mirrors the master LUN so they are substantially synchronized. A synchronized SAN message may be sent to the master server indicating that the slave server is ready to fully join the local area network and operate using its own slave LUN 1616.

Once the data download is complete and the ready SAN messages have been transmitted, received and acknowledged by the master server 112M, data stored in and associated with the new slave server 112S is ready for use. The slave server 112S can join with the master server and the other networked devices in the local area network to satisfy storage requests from clients associated with the new slave server 112S.

Referring now to FIGS. 17A-17B, an exemplary communication method that communicates SAN messages between one or more servers in a local storage area network to perform cache prefill of a new server is now described. The one or more servers each include a fibre channel adapter card and an integrated circuit to pass SAN messages 910B, between the master server and the one or more slave servers.

The cache prefill method begins at functional block 1700 and goes to functional block 1702.

At block 1702, a SAN message 910B, a cache prefill message, is formed by one or more instructions with hints to represent the master cache table of the master server. The master cache table points to the data stored in the master cache memory and the master LUN in one or more storage arrays of the network. With a cache prefill SAN message generated, the process can then go to process block 1704.

At block 1704, one or more in-band communication links are established between the master server and one or more slave servers in the local storage area network. The fiber channel host adapters in each are used to set up and tear down the in-band communication links between the master server and the one or more slave servers. The master server that generated the SAN message 910B initiates the establishment of the one or more in-band communication links with the one or more slave servers within the local storage area network. Through the fiber channel host adapters and the in band communication link, the master server may also be coupled in communication with the cache memory of one or more of the slave servers.

The one or more in-band communication links over which messages are to be communicated are also communication links over which data may be communicated using a storage area network protocol. For example, a SAN message is communicated in-band between the master server and the one or more slave servers using one or more in-band communication links and the fibre channel common transport (FCCT) protocol. If Ethernet cables are used to physically connect devices in the storage area network together, the message may be communicated over the one or more in-band communication links between the master server and the one or more slave servers using a fibre channel over Ethernet (FCOE) protocol, for example. After the one or more in-band communication links are established, the process may then go to process block 1706.

At process block 1706, the cache prefill SAN message 910B is transmitted from the master server to the one or more slave servers over the one or more in-band communication links that have been established. Prior to transmission, the cache prefill SAN message 910B may be stored in a storage device in the master server, such as a buffer memory in a fibre channel host adapter card. After receipt by a slave server and prior to its execution, the SAN message 910B may also be stored in a storage device, such as a buffer memory in a fibre channel host adapter card. With cache prefill SAN message transmitted from the master server to the one or more slave servers, the process may then go to block 1708.

At process block 1708, in response to receiving the SAN message 910B, the one or more slave servers may each transmit an acknowledgment SAN message (message received indicator) back over the one or more in-band communication links to the master server. The acknowledgment SAN message indicates that the cache prefill SAN message 910B was received by a slave server.

At process block 1710, the one or more first in-band communication links between the master server and the one or more slave servers may be retired. With the initial one or more first in-band communication links being tore down, resources of the master server are released to execute other tasks. For example, the master server can then execute further management and control function within the local storage area network using the fiber channel host adapter.

At process block 1712, in response to receiving the cache prefill SAN message 910B, the one or more instructions within the SAN message 910B are executed with a processor in the one or more slave servers. When executed, the one or more instructions within the SAN message generate one or more slave cache tables pointing to data in the one or more storage arrays and/or master cache memory. Exemplary SAN messages 910B-910D are shown in FIGS. 10B-10D to provide such local storage area network functionality. After forming the slave cache tables to point to data, the process may then go to block 1714, so that the slave cache memory and slave LUNs associated with the one or more slave servers may begin to be populated with data.

At process block 1714, one or more second in-band communication links are established between the one or more slave servers and the master server in the local storage area network. In this case, each slave server may establish the second in-band communication links to the master server in order to inform the master server that the generation of the slave cache table in the give slave server is completed. With the slave cache table, a slave server may begin to support client computers and software applications that make storage requests for data using some resources of the master server, such as the master cache memory and the master LUN. The master server may assign users to the slave server to process their requests, all the while the slave server tries to fill its cache memory and its slave LUN to mirror that of the master server. The process may then go to block 1716.

At process block 1716, in response to completion of the initial cache prefill SAN message 910B, each the one or more slave servers may transmit a completed SAN message to the master server over the one or more second in-band communication links. The completed SAN message indicates that the plurality of tasks in the initial cache prefill SAN message 910B has been completed by a slave server. The process may then go to block 1718.

At process block 1718, each of the one or more slave servers may generate an ordered list of storage requests to acquire data from the master LUN 1615 in a storage array to fill each of their slave cache memories. The ordered list of storage requests may be packed into a SAN message. The process may then go to block 1720.

At process block 1720, the one or more slave servers may transmit the SAM message with the ordered list of storage requests over the one or more second in-band communication links to the one or more storage arrays. The process may then go to block 1722.

At process block 1722, in response to receiving the SAN message with the ordered list of storage requests from the one or more slave servers over the one or more second in-band communication links, the one or more storage arrays may execute the ordered list of storage requests from the one or more storage arrays to fill the one or more slave cache memories associated with the one or more slave servers. The process may then go to block 1724.

At process block 1724, in response to the ordered list of storage requests from the one or more slave servers, after executing read or fetch requests, the one or more storage arrays may transmit the data in order from the one or more storage arrays to the one or more slave cache memories over the in-band communication link. The storage arrays may continue executing storage requests and continue transmitting data to the slave cache memories until full. The process may then go to block 1726.

At process block 1726, in response to receiving the requested data from the one or more storage arrays, the one or more slave servers execute one or more write commands to begin filling the one or more slave cache memories with data. The slave servers may continue to execute write commands until the slave cache memory is full or there is no additional data received that is to be stored. The process may then go to block 1728.

At process block 1728, in response to the slave cache memory being full or no additional data being expected, each of the one or more slave servers may transmit a tasks completed SAN message to the master server over the one or more second in-band communication links. The process may then go to block 1730.

At process block 1730, the one or more second in-band communication links between the master server and the one or more slave servers may be retired such that the resources of the master server can be released to execute other tasks. The process may then go to block 1732.

At process block 1732, the slave cache memory and/or slave cache table in each slave server may need updating due to data changes in the master cache memory and master cache table. The master server may generate an update cache SAN message 910B including one or more instructions with hints with updates to make to the slave cache table and slave cache memory. The hints may be new pointers in the updated master cache table that point to data stored in the updated master cache memory and in the one or more storage arrays. The process then goes to process block 1734.

At process block 1734, the master server may establish one or more in-band communication links between the one or more slave servers and the master server in the local storage area network. The process may then go to block 1736.

At process block 1736, the update cache SAN message 910B is transmitted from the master server to the one or more slave servers over the in-band communication links. The process may then go to block 1738.

At process block 1738, a comparison may be made between the updated master cache table and each current slave cache tables to detect changes in the data stored in the one or more slave cache memories. The process may then go to block 1740.

At process block 1740, each slave server may generate storage requests to acquire the updated data, if any, from the one or more storage arrays. These storage requests are to update each of the one or more slave cache memories associated with the one or more slave servers with the updated data. The storage requests may bundled together and transmitted using a SAN message to the storage arrays over in band communication links. Alternatively, the storage requests may be transmitted one my one using the storage protocol over the storage communication links. The process may then go to block 1742.

At process block 1742, the one or more storage arrays execute the storage requests to read and obtain updated data. The one or more storage arrays transmit the updated data to the one or more slave servers to update the one or more slave cache memories. The one or more storage arrays may continue to execute storage requests to obtain the updated data and transmit the updated data to the slave servers for storage into their respective slave cache memories to synchronize them with the master cache memory. The process then goes to block 1744.

At process block 1744, each of the one or more slave servers receives the updated data and writes the updated data into their respective slave cache memories. Each slave server may continue to receive and write the updated data into their respective cache memory until the storage requests for the updated data are completed. The process may then go to block 1746.

At process block 1746, in response to completing the update to their slave cache memories, each one of the one or more slave servers may transmit a tasks completed message using a SAN message to the master server over the one or more third in-band communication links. The task compete message indicates to the master server that the one or more slave cache memories are in synch with the master cache memory. The process may then go to block 1799.

At process block 1799, the one or more third in-band communication links between the one or more slave servers and the master server may be retired such that each is released to execute other tasks.

In a similar fashion, additional SAN messages may be used to continue generating storage requests to read data from the master LUN, transmit it to the slave server, and write data into the slave LUN. Until the slave LUN mirrors the master LUN, the slave LUN is avoided when fulfilling storage requests.

When the slave server has its slave LUN in synch, it may directly execute storage requests into its LUN in the storage array to satisfy storage requests. The data may be read from the LUN of the storage array and written into the slave cache memory to update it. However, the master cache and other slave cache memories may be out of data synchronization as a result.

SAN messages may be used to update the master cache memory and other slave cache memories as well as the master LUN and the other slave LUNs. A SAN message may be generated that includes one or more instructions with hints associated with the update to the slave cache memory. This SAN message may be transmitted from the slave server to the master server over an in-band communication link. Upon receipt, the master cache table may be updated in the master server in response to the hints in the SAN message.

A SAN message may be used to indicate an out of synch condition between the slave cache memory and the master cache memory due to the update to the slave cache memory. A cache invalidate SAN message may be generated so that storage requests are not executed with the slave cache memories. The cache invalidate SAN message may be transmitted from the master server to the one or more slave servers. Until they are synchronized accesses to the one or more slave cache memories in response to storage requests may be avoided. The storage requests may instead be executed into the LUNs in the one or more storage arrays, in response to the cache invalidate SAN message.

CONCLUSION

When implemented in software, the elements of the embodiments are essentially the code segments or instructions to perform the functional tasks described herein. The code segments or instructions are executable by a processor, such as processor 201 of FIG. 2G for example. The code segments or instructions can be stored in a storage device or a processor readable storage medium, such as memory 205 of FIG. 2G, awaiting execution by the processor. The processor readable storage medium may include any medium that can store information. Examples of the processor readable storage medium include an electronic circuit, a semiconductor memory device, a read only memory (ROM), a flash memory, an erasable programmable read only memory (EPROM), a floppy diskette, a CD-ROM, an optical disk, and a hard disk. The code segments or instructions may also be downloaded via computer networks such as the Internet, Intranet, etc. into the processor readable storage medium.

While certain exemplary embodiments have been described and shown in the accompanying drawings, it is to be understood that such embodiments are merely illustrative of and not restrictive since various other modifications may occur to those ordinarily skilled in the art. For example, certain features that are described in this specification in the context of separate implementations may also be implemented in combination in a single implementation. Conversely, various features that are described in the context of a single implementation may also be implemented in multiple implementations, separately or in sub-combination. Moreover, although features may be described as acting in certain combinations and even initially claimed as such, one or more features from a claimed combination may in some cases be excised from the combination, and the claimed combination may be directed to a sub-combination or variations of a sub-combination. Accordingly, the claimed invention is limited only by the patented claims.

What is claimed is:

1. A method for prefilling data into a cache memory based on historical data to reduce warm up time of a flash based cache memory, the method comprising:
   determining in a local storage network of a plurality of servers that a first server associated with a flash based cache memory is no longer operational and requires replacement;
   replacing the first server with a second server;
   upon startup of the second server, employing a cache prefill mechanism to generate hints in a cache knowledgeable networked device for a flash based cache memory associated with the second server, wherein the hints are a form of reference to find data instead of pushing data into the flash based cache memory; and
   receiving the hints into the second server to know how to build the flash based cache memory associated with the second server, wherein the hints are references to frequently accessed blocks of data in the first server based on historical data, the hints including starting addresses and block lengths.

2. The method of claim 1, further comprising:
   generating a list of pre-fill operations indicating an order to fill the flash based cache memory in the second server in response to the hints;
   from the second server, transmitting an order of a plurality of standard operations to the cache knowledgeable networked device in response to the list of prefill operations;
   executing the plurality of read operations in the cache knowledgeable networked device as a background operation instead of a foreground operation, wherein the plurality of read operations access data in order in the cache knowledgeable networked device;
   transmitting the accessed data in order from the cache knowledgeable networked device to the second server to load in order the flash based cache memory device therein.

3. The method of claim 1, wherein a third server has prior knowledge of historical behavior of the first server to provide the hints to the second server.

4. The method of claim 2, wherein the list of pre-fill operations, indicating an order to fill the flash based cache memory in the second server, is included in a type-length-value (TLV) message.

5. The method of claim 3, wherein
   the historical behavior is a plurality of storage request for the same data by a plurality of clients.

6. A method of prefilling data into cache memory within a local storage area network, the method comprising:
   generating a first storage area network message (SAN) including one or more instructions with hints to form a master cache table pointing to data stored in a master cache memory and in one or more storage arrays, wherein the hints are references to frequently accessed blocks of data in the first server based on historical data, the hints including starting addresses and block lengths;
   establishing one or more first in-band communication links between a master server and one or more slave servers in the local storage area network;
   transmitting the first SAN message from the master server to the one or more slave servers over the one or more first in-band communication links;
   executing, with a processor, the one or more instructions in the first SAN message to generate one or more slave cache tables pointing to data in the one or more storage arrays.

7. The method of claim 6, further comprising:
   in response to receiving the first SAN message, transmitting an acknowledgment message from the one or more slave servers to the master server over the one or more first in-band communication links indicating that the first SAN message was received by the one or more slave servers; and
   retiring the one or more first in-band communication links between the master server and the one or more slave servers such that the master server is released to execute other tasks.

8. The method of claim 6, further comprising:
   generating an ordered list of storage requests to acquire the data in one or more storage arrays to fill one or more slave cache memories associated with the one or more slave servers;
   transmitting the ordered list of storage requests to the one or more storage arrays;
   executing the ordered list of storage requests; and
   transmitting the data in order to the one or more slave memory servers in response to the ordered lists of storage requests.

9. The method of claim 6, further comprising:
writing the transmitted data into one or more slave cache memories associated with the one or more slave servers to begin filing the one or more slave cache memories with data.

10. The method of claim 9, wherein the plurality of tasks in the SAN message have been completed by the one or more slave servers and the method further comprises:
establishing one or more second in-band communication links between the one or more slave servers and the master server; and
in response to the tasks being completed, transmitting a task complete response over the one or more second in-band communication links from the one or more slave servers to the master server.

11. The method of claim 10, further comprising:
generating a second SAN message including one or more instructions with hints to form an updated master cache table pointing to data stored in the master cache memory and in the one or more storage arrays;
transmitting the second SAN message from the master server to the one or more slave servers over the one or more second in-band communication links;
comparing the updated master cache table with each of the one or more slave cache tables to detect changes in data stored in the one or more slave cache memories.

12. The method of claim 11, further comprising:
generating storage requests to acquire data from one or more storage arrays to update the one or more slave cache memories associated with the one or more slave servers;
transmitting the storage requests to the one or more storage arrays;
executing the storage requests to fetch update data;
transmitting the update data to the one or more slave cache memories in response to the storage requests; and
writing the update data into one or more slave cache memories associated with the one or more slave servers to fill the one or more slave cache memories with data such that the one or more slave cache memories are synchronized with the master cache memory.

13. The method of claim 12, further comprising:
transmitting a complete message from the one or more slave servers to the master server to indicate that the one or more slave cache memories are in synch with the master cache memory.

14. The method of claim 13, further comprising:
retire the one or more in-band communication links.

15. The method of claim 13, further comprising:
reading data from a storage array and writing the data to update a first slave cache memory by a first slave server;
generating a third SAN message including one or more instructions with hints associated with the update to the first slave cache memory;
transmitting the third SAN message from the first slave server to the master server over a first in-band communication link; and
updating the master cache table in response to the hints in the third SAN message.

16. The method of claim 15, further comprising:
generating a cache invalidate SAN message;
transmitting the cache invalidate SAN message from the master server to the one or more slave servers; and
avoiding accesses to the one or more slave cache memories and executing one or more storage requests with the one or more storage arrays in response to the cache invalidate SAN message.

17. A local storage network system comprising:
a master server including a master processor to execute instructions to serve a first plurality of clients with data stored in the local storage network system;
a master cache memory associated with the master server, the master cache memory storing a master copy portion of the data stored in the local storage network system;
a slave server including a slave processor to execute instructions to serve a second plurality of clients with data stored in the local storage network system;
a slave cache memory associated with the slave server, the slave cache memory storing a slave copy portion of the data stored in the local storage network system synchronized to the master cache memory associated with the master server;
one or more fibre channel host controllers coupled between the master processor and the slave processor, each of the one or more fibre channel host controllers including a control processor
to generate a first SAN message including one or more instructions with hints to form a master cache table pointing to master copy portion of data stored in the master cache memory and in the local storage network system, wherein the hints are references to frequently accessed blocks of data in the first server based on historical data, the hints including starting addresses and block lengths;
establish a communication link between the master server and the slave server;
communicate in-band the first SAN message from the master server to the slave server using the communication link; and
execute the one or more instructions in the first SAN message to generate a slave cache table pointing to a master copy portion of data stored in the local storage network system.

18. The system of claim 17, wherein the control processor in at least one of the one or more fibre channel host controllers executes one or more instructions to
generate an ordered list of storage requests to acquire a slave copy portion of data from the local storage network system in response to the slave cache table;
transmit the ordered list of storage requests into the local storage network system;
receive data in response to the ordered list of storage requests; and
write the data into the slave cache memory to begin to duplicate the master cache memory.

19. The system of claim 18, wherein the control processor in at least one of the one or more fibre channel host controllers further executes one or more instructions to
transmit a complete SAN message from the slave server to the master server after writing the data into the slave cache memory in response to the ordered list of storage requests.

* * * * *